United States Patent
Xiao et al.

(10) Patent No.: US 12,473,571 B2
(45) Date of Patent: Nov. 18, 2025

(54) EXPRESSION CASSETTE FOR EXPRESSING GENE COMPRISING OVERLAPPING OPEN READING FRAMES IN INSECT CELL AND APPLICATION THEREOF

(71) Applicant: GENEVOYAGER (WUHAN) CO., LTD., Hubei (CN)

(72) Inventors: He Xiao, Hubei (CN); Xiaobin He, Hubei (CN); Gang Huang, Hubei (CN); Ying Hu, Hubei (CN); Xing Pan, Hubei (CN); He Huang, Hubei (CN); Liang Du, Hubei (CN); Mengdie Wang, Hubei (CN)

(73) Assignee: GENVEOYAGER (WUHAN) CO., LTD., Hubei (CN)

( * ) Notice: Subject to any disclaimer, the term of this patent is extended or adjusted under 35 U.S.C. 154(b) by 0 days.

(21) Appl. No.: 18/016,866

(22) PCT Filed: Sep. 27, 2021

(86) PCT No.: PCT/CN2021/120828
§ 371 (c)(1),
(2) Date: Jan. 19, 2023

(87) PCT Pub. No.: WO2023/039936
PCT Pub. Date: Mar. 23, 2023

(65) Prior Publication Data
US 2024/0247282 A1    Jul. 25, 2024

(30) Foreign Application Priority Data
Sep. 18, 2021 (CN) .......................... 202111105263.5

(51) Int. Cl.
*C12N 15/86* (2006.01)
*C12N 7/00* (2006.01)

(52) U.S. Cl.
CPC .............. *C12N 15/86* (2013.01); *C12N 7/00* (2013.01); *C12N 2710/14043* (2013.01); *C12N 2750/14122* (2013.01); *C12N 2750/14152* (2013.01); *C12N 2800/105* (2013.01); *C12N 2830/42* (2013.01)

(58) Field of Classification Search
CPC .................................................. C12N 15/86
See application file for complete search history.

(56) References Cited

U.S. PATENT DOCUMENTS

| 8,945,918 B2 | 2/2015 | Chen |
| 2009/0183269 A1 | 7/2009 | Alphey |
| 2010/0233685 A1 | 9/2010 | Stoilov et al. |

FOREIGN PATENT DOCUMENTS

| CN | 101522903 | 9/2009 |
| CN | 102007209 | 4/2011 |
| CN | 103849629 | 6/2014 |
| CN | 106544325 | 3/2017 |
| CN | 111183225 | 5/2020 |
| CN | 112280801 | 1/2021 |
| CN | 112553257 | 3/2021 |
| CN | 113166731 | 7/2021 |
| WO | 2008024998 | 2/2008 |

OTHER PUBLICATIONS

Chen. Mol Ther. May 2008;16(5):924-30. doi: 10.1038/mt.2008.35. Epub Mar. 18, 2008. PMID: 18388928. (Year: 2008).*
Chen H. (2008, Molecular Cell Therapy, vol. 16(5), pp. 924-930) (Year: 2008).*
"International Search Report (Form PCT/ISA/210) of PCT/CN2021/120828," mailed on Jun. 15, 2022, pp. 1-7.
"Written Opinion of the International Searching Authority (Form PCT/ISA/237) of PCT/CN2021/120828," mailed on Jun. 15, 2022, pp. 1-4.
Chen, Haifeng; "Intron splicing-mediated expression of AAV Rep and Cap genes and production of AAV vectors in insect cells." Mol Ther., vol. 16, No. 5, May 2008, pp. 924-930.
Seppo Ylä-Herttuala, "Endgame: glybera finally recommended for approval as the first gene therapy drug in the European union," Mol Ther., vol. 20, No. 10, Oct. 2012, pp. 1831-1832.
Martin R. Hodge et al., "Splicing of a Yeast Intron Containing an Unusual 5' Junction Sequence", Molecular and cellular biology, vol. 9, No. 6, Jun. 1989, pp. 2765-2770.
Marilyn Kozak, "Pushing the limits of the scanning mechanism for initiation of translation", Gene, vol. 299, Issues 1-2, Oct. 16, 2002, pp. 1-34.

* cited by examiner

*Primary Examiner* — Anoop K Singh
*Assistant Examiner* — David A Montanari
(74) *Attorney, Agent, or Firm* — JCIPRNET

(57) ABSTRACT

The disclosure discloses an expression cassette for expressing a gene including overlapping open reading frames in an insect cell and an application thereof. The expression cassette includes from 5' to 3' and operably linked: a promoter capable of driving transcription in the insect cell; an artificially constructed sequence; the overlapping open reading frames missing only a first translation start codon; wherein the artificially constructed sequence includes a native or engineered intron with splicing activity in the insect cell, the intron includes ATG or the intron is located between any two adjacent nucleotides in ATG. A recombinant adeno-associated virus vector including the expression cassette of the disclosure regulates relative expressions of VP1, VP2, and VP3 proteins, and relative expressions of Rep78 and Rep52 proteins by using a designed intron sequence and through an intron splicing function for large-scale production of rAAV.

20 Claims, 14 Drawing Sheets
Specification includes a Sequence Listing.

```
                        SEQUENCE LISTING

<160> NUMBER OF SEQ ID NOS: 39

<210> SEQ ID NO 1
<211> LENGTH: 110
<212> TYPE: DNA
<213> ORGANISM: Artificial Sequence
<220> FEATURE:
<223> OTHER INFORMATION: Synthetic construct

<400> SEQUENCE: 1
gacctttaat tcaacccaac acaatatatt atagttaaat aagaattatt atcaaatcat        60
ttgtatatta attaaaatac tatactgtaa attacatttt atttacaatc                  110

<210> SEQ ID NO 2
<211> LENGTH: 137
<212> TYPE: DNA
<213> ORGANISM: Artificial Sequence
<220> FEATURE:
<223> OTHER INFORMATION: Synthetic construct

<400> SEQUENCE: 2
gtaagtattc attgtaaatc tgatattatt tgtattatta tacctaccta atttgcagtg        60
cagataaata tgccggattt atcgtgttcg ccattagggc agtatattct cattcttcct       120
tttccttttt ttttcag                                                     137

<210> SEQ ID NO 3
<211> LENGTH: 108
<212> TYPE: DNA
<213> ORGANISM: Artificial Sequence
<220> FEATURE:
<223> OTHER INFORMATION: Synthetic construct

<400> SEQUENCE: 3
gtaagtatcg ataactttgt tttctttcac atttacaact ccgacataca aattcaggta        60
```

```
tggcccatta cggcagtata aattcgttca ttttggatat tgtttcag        108

<210> SEQ ID NO 4
<211> LENGTH: 110
<212> TYPE: DNA
<213> ORGANISM: Artificial Sequence
<220> FEATURE:
<223> OTHER INFORMATION: Synthetic construct

<400> SEQUENCE: 4
gtatcgataa ctttgttttc tttcacatct acaacgccga cgccgccatg gccatcgtgt    60
tcgccattag ggcagtatat tctcattctt ccttttcctt ttttttttcag            110

<210> SEQ ID NO 5
<211> LENGTH: 179
<212> TYPE: DNA
<213> ORGANISM: Artificial Sequence
<220> FEATURE:
<223> OTHER INFORMATION: Synthetic construct

<400> SEQUENCE: 5
gtaagtattc attgtaaatc tgatattatt tgtattatta tacctaccta atttgcagtg    60
cagataaata tgccggatgg taattttatt actgtttggt ccataaacac ttgtttacca   120
tttccttttt tacaagtttt aatatgttct gcatatataa acattatgt attttgcag    179

<210> SEQ ID NO 6
<211> LENGTH: 54
<212> TYPE: DNA
<213> ORGANISM: Thosea asigna virus

<400> SEQUENCE: 6
gaagggcggg gaagcctcct aacctgcggt gacgttgagg aaaatccggg tcca          54

<210> SEQ ID NO 7
<211> LENGTH: 2211
<212> TYPE: DNA
<213> ORGANISM: Artificial Sequence
<220> FEATURE:
<223> OTHER INFORMATION: Cap ORF

<400> SEQUENCE: 7
atggctgccg acggttatct acccgattgg ctcgaggaca accttagtga aggaattcgc    60
gagtggtggg ctttgaaacc tggagcccct caacccaagg caaatcaaca acatcaagac   120
aacgctcgag gtcttgtgct tccgggttac aaataccttg acccggcaa cggactcgac    180 aaggggagc cggtcaacgc agcagacgcg gcggccctcg agcacgacaa ggcctacgac    240
cagcagctca aggccggaga caacccgtac ctcaagtaca accacgccga cgccgagttc    300
caggagcggc tcaaagaaga tacgtctttt gggggcaacc tcgggcgagc agtcttccag    360
gccaaaaaga ggcttcttga acctcttggt ctggttgagg aagcggctaa gacggctcct    420
ggaaagaaga ggcctgtaga gcagtctcct caggaaccgg actcctccgc gggtattggc    480
aaatcgggtg cacagcccgc taaaaagaga ctcaatttcg gtcagactgg cgacacagag    540
tcagtcccag accctcaacc aatcggagaa cctcccgcag ccccctcagg tgtgggatct    600
cttacaatgg cttcaggtgg tggcgcacca gtggcagaca taacgaagg tgccgatgga    660 gtgggtagtt cctcgggaaa ttggcattgc gattcccaat ggctggggga cagagtcatc    720
accaccagca cccgaacctg ggccctgccc acctacaaca atcacctcta caagcaaatc    780
```

| | |
|---|---:|
| tccaacagca catctggagg atcttcaaat gacaacgcct acttcggcta cagcacccc | 840 |
| tgggggtatt ttgacttcaa cagattccac tgccacttct caccacgtga ctggcagcga | 900 |
| ctcatcaaca caactgggga ttccggcct aagcgactca acttcaagct cttcaacatt | 960 |
| caggtcaaag aggttacgga caacaatgga gtcaagacca tcgccaataa ccttaccagc | 1020 |
| acggtccagg tcttcacgga ctcagactat cagctcccgt acgtgctcgg tcggctcac | 1080 |
| gagggctgcc tcccgccgtt cccagcggac gttttcatga ttcctcagta cgggtatctg | 1140 |
| acgcttaatg atggaagcca ggccgtgggt cgttcgtcct tttactgcct ggaatatttc | 1200 |
| ccgtcgcaaa tgctaagaac gggtaacaac ttccagttca gctacgagtt tgagaacgta | 1260 |
| cctttccata gcagctacgc tcacagccaa agcctggacc gactaatgaa tccactcatc | 1320 |
| gaccaatact tgtactatct ctcaaagact attaacggtt ctggacagaa tcaacaaacg | 1380 |
| ctaaaattca gtgtggccgg acccagcaac atggctgtcc agggaagaaa ctacatacct | 1440 |
| ggacccagct accgcaaaca acgtgtctca accactgtga ctcaaaacaa caacagcgaa | 1500 |
| tttgcttggc ctggagcttc ttcttgggct ctcaatggac gtaatagctt gatgaatcct | 1560 |
| ggacctgcta tggccagcca caaagaagga gaggaccgtt tctttccttt gtctggatct | 1620 |
| ttaattttgg caaacaaggg aactggaaga gacaacgtgg atgcggacaa agtcatgata | 1680 |
| accaacgaag aagaaattaa aactactaac ccggtagcaa cggagtccta tggacaagtg | 1740 |
| gccacaaacc accagagtgc ccaagcacag gcgcagaccg gctgggttca aaaccaagga | 1800 |
| atacttccgg gtatggtttg caggacagag atgtgtacc tgcaaggacc catttgggcc | 1860 |
| aaaattcctc acacggacgg caactttcac ccttctccgc tgatgggagg gtttggaatg | 1920 |
| aagcacccgc ctcctcagat cctcatcaaa acacacctg tacctgcgga tcctccaacg | 1980 |
| gccttcaaca aggacaagct gaactctttc atcacccagt attctactgg ccaagtcagc | 2040 |
| gtggagatcg agtgggagct gcagaaggaa acagcaagc gctggaaccc ggagatccag | 2100 |
| tacacttcca actattacaa gtctaataat gttgaatttg ctgttaatac tgaaggtgta | 2160 |
| tatagtgaac cccgccccat tggcaccaga tacctgactc gtaatctgta a | 2211 |

<210> SEQ ID NO 8
<211> LENGTH: 2566
<212> TYPE: DNA
<213> ORGANISM: Artificial Sequence
<220> FEATURE:
<223> OTHER INFORMATION: Cap gene expression cassette

<400> SEQUENCE: 8

| | |
|---|---:|
| gacctttaat tcaacccaac acaatatatt atagttaaat aagaattatt atcaaatcat | 60 |
| ttgtatatta attaaaatac tatactgtaa attacatttt atttacaatc actcgacgaa | 120 |
| gacttgatca cccgggtagg acaaggtaag tattcattgt aaatctgata ttatttgtat | 180 |
| tattataccct acctaatttg cagtgcagat aaatatgccg gatttatcgt gttcgccatt | 240 |
| agggcagtat attctcattc ttccttttcc ttttttttc aggttcacct tcaacggctc | 300 |
| gggagaaggg cggggaagcc tcctaacctg cggtgacgtt gaggaaaatc cgggtccagc | 360 |
| tgccgacggt tatctacccg attggctcga ggacaacctt agtgaaggaa ttcgcgagtg | 420 |
| gtgggctttg aaacctggag cccctcaacc caaggcaaat caacaacatc aagacaacgc | 480 |
| tcgaggtctt gtgcttccgg gttacaaata ccttggaccc ggcaacggac tcgacaaggg | 540 |
| ggagccggtc aacgcagcag acgcggcggc cctcgagcac acaaggcct acgaccagca | 600 |
| gctcaaggcc ggagacaacc cgtacctcaa gtacaaccac gccgacgccg agttccagga | 660 |

```
gcggctcaaa gaagatacgt cttttggggg caacctcggg cgagcagtct tccaggccaa    720
aaagaggctt cttgaacctc ttggtctggt tgaggaagcg gctaagacgg ctcctggaaa    780
gaagaggcct gtagagcagt ctcctcagga accggactcc tccgcgggta ttggcaaatc    840
gggtgcacag cccgctaaaa agagactcaa tttcggtcag actggcgaca cagagtcagt    900
cccagaccct caaccaatcg gagaacctcc cgcagccccc tcaggtgtgg gatctcttac    960
aatggcttca ggtggtggcg caccagtggc agacaataac gaaggtgccg atggagtggg    1020
tagttcctcg ggaaattggc attgcgattc ccaatggctg ggggacagag tcatcaccac    1080
cagcacccga acctgggccc tgcccaccta caacaatcac ctctacaagc aaatctccaa    1140
cagcacatct ggaggatctt caaatgacaa cgcctacttc ggctacagca ccccctgggg    1200 gtatttgac ttcaacagat tccactgcca cttctcacca cgtgactggc agcgactcat    1260
caacaacaac tggggattcc ggcctaagcg actcaacttc aagctcttca acattcaggt    1320
caaagaggtt acgacaaca atggagtcaa gaccatcgcc aataaccta ccagcacggt    1380 ccaggtcttc acggactcag actatcagct cccgtacgtg ctcgggtcgg ctcacgaggg    1440
ctgcctcccg ccgttcccag cggacgtttt catgattcct cagtacgggt atctgacgct    1500
taatgatgga agccaggccg tgggtcgttc gtccttttac tgcctggaat atttcccgtc    1560
gcaaatgcta agaacgggta acaacttcca gttcagctac gagtttgaga cgtacctttt    1620
ccatagcagc tacgctcaca gccaaagcct ggaccgacta atgaatccac tcatcgacca    1680
atacttgtac tatctctcaa agactattaa cggttctgga cagaatcaac aaacgctaaa    1740
attcagtgtg gccggaccca gcaacatggc tgtccaggga agaaactaca tacctggacc    1800
cagctaccga caacaacgtg tctcaaccac tgtgactcaa aacaacaaca gcgaatttgc    1860
ttggcctgga gcttcttctt gggctctcaa tggacgtaat agcttgatga atcctggacc    1920
tgctatggcc agccacaaag aaggagagga ccgtttctt cctttgtctg gatctttaat    1980
ttttggcaaa caaggaactg aagagacaa cgtggatgcg gacaaagtca tgataaccaa    2040
cgaagaagaa attaaaacta ctaacccggt agcaacggag tcctatggac aagtggccac    2100
aaaccaccag agtgcccaag cacaggcgca gaccggctgg gttcaaaacc aaggaatact    2160
tccgggtatg gtttggcagg acagagatgt gtacctgcaa ggacccattt gggccaaaat    2220
tcctcacacg gacggcaact ttcacccttc tccgctgatg ggagggtttg aatgaagca    2280 cccgcctcct cagatcctca tcaaaaacac acctgtacct gcggatcctc aacggccttt    2340
caacaaggac aagctgaact cttcatcac ccagtattct actggccaag tcagcgtgga    2400
gatcgagtgg gagctgcaga aggaaaacag caagcgctgg aacccggaga tccagtacac    2460
ttccaactat acaagtcta ataatgttga atttgctgtt aatactgaag gtgtatatag    2520
tgaaccccgc ccattggca ccagatacct gactcgtaat ctgtaa                   2566
```

<210> SEQ ID NO 9
<211> LENGTH: 2529
<212> TYPE: DNA
<213> ORGANISM: Artificial Sequence
<220> FEATURE:
<223> OTHER INFORMATION: Cap gene expression cassette

<400> SEQUENCE: 9

```
gacctttaat tcaacccaac acaatatatt atagttaaat aagaattatt atcaaatcat     60
ttgtatatta attaaaatac tatactgtaa attacatttt atttacaatc actcgacgaa    120
```

-continued

```
gacttgatca cccgggcagc aggtaagtat cgataacttt gttttctttc acatttacaa    180
ctccgacata caaattcagg tatggcccat tacggcagta taaattcgtt cattttggat    240
attgtttcag ttgcaagtgg ctcgggagaa gggcgtggaa gcctcctaac ctgcggtgac    300
gttgaggaaa atccgggtcc agctgccgac ggttatcttc ccgattggct cgaggacaac    360
cttagtgaag gaattcgcga gtggtgggct ttgaaacctg gagcccctca acccaaggca    420
aatcaacaac atcaagacaa cgctcgaggt cttgtgcttc cgggttacaa ataccttgga    480
cccggcaacg gactcgacaa gggggagccg gtcaacgcag cagacgcggc ggccctcgag    540
cacgacaagg cctacgacca gcagctcaag gccggagaca cccgtacct caagtacaac     600
cacgccgacg ccgagttcca ggagcggctc aaagaagata cgtcttttgg gggcaacctc    660
gggcgagcag tcttccaggc caaaaagagg cttcttgaac ctcttggtct ggttgaggaa    720
gcggctaaga cggctcctgg aaagaagagg cctgtagagc agtctcctca ggaaccggac    780
tcctccgcgg gtattggcaa atcggtgca cagcccgcta aaaagagact caatttcggt     840
cagactggcg acacagagtc agtcccgac cctcaaccaa tcggagaacc tcccgcagcc     900
ccctcaggtg tgggatctct tacaatggct tcaggtggtg gcgcaccagt ggcagacaat    960
aacgaaggtc ccgatgagt gggtagttcc tcgggaaatt ggcattgcga ttcccaatgg    1020
ctgggggaca gagtcatcac caccagcacc cgaacctggg ccctgcccac ctacaacaat   1080
cacctctaca agcaaatctc caacagcaca tctggaggat cttcaaatga caacgcctac   1140
ttcggctaca gcaccccctg ggggtatttt gacttcaaca gattccactg ccacttctca   1200
ccacgtgact ggcagcgact catcaacaac aactggggat tccggcctaa gcgactcaac   1260
ttcaagctct tcaacattca ggtcaaagag gttacggaca acaatggagt caagaccatc   1320
gccaataacc ttaccagcac ggtccaggtc ttcacggact cagactatca gctcccgtac   1380
gtgctcgggt cggctcacga gggctgcctc ccgccgttcc cagcggacgt tttcatgatt   1440
cctcagtacg gtatctgac gcttaatgat ggaagccagg ccgtgggtcg ttcgtccttt    1500
tactgcctgg aatatttccc gtcgcaaatg ctaagaacgg gtaacaactt ccagttcagc   1560
tacgagtttg agaacgtacc tttccatagc agctacgctc acagccaaag cctggaccga   1620
ctaatgaatc cactcatcga ccaatacttg tactatctct caaagactat taacggttct   1680
ggacagaatc aacaaacgct aaaattcagt gtggccggac ccagcaacat ggctgtccag   1740
ggaagaaact acatacctgg acccagctac cgacaacaac gtgtctcaac cactgtgact   1800
caaaacaaca cagcgaatt tgcttggcct ggagcttctt ctttgggctct caatggacgt    1860
aatagcttga tgaatcctgg acctgctatg gccagccaca agaaggaga ggaccgttttc   1920
tttcctttgt ctggatctttt aattttttggc aaacaaggaa ctggaagaga caacgtggat   1980
gcggacaaag tcatgataac caacgaagaa gaaattaaaa ctactaaccc ggtagcaacg   2040
gagtcctatg gacaagtggc cacaaaccac cagagtgccc aagcacaggc gcagaccggc   2100
tgggttcaaa accaaggaat acttccgggt atggtttggc aggacagaga tgtgtacctg   2160
caaggaccca tttgggccaa aattcctcac acggacggca actttcaccc ttctccgctg   2220
atgggagggt ttggaatgaa gcacccgcct cctcagatcc tcatcaaaaa cacacctgta   2280
cctgcggatc ctccaacggc cttcaacaag gacaagctga actcttttcat cacccagtat   2340
tctactggcc aagtcagcgt ggagatcgag tgggagctgc agaaggaaaa cagcaagcgc   2400
tggaacccgg agatccagta cacttccaac tattacaagt ctaataatgt tgaatttgct   2460
gttaatactg aaggtgtata tagtgaaccc cgccccattg gcaccagata cctgactcgt   2520
``` aatctgtaa 2529

<210> SEQ ID NO 10
<211> LENGTH: 2527
<212> TYPE: DNA
<213> ORGANISM: Artificial Sequence
<220> FEATURE:
<223> OTHER INFORMATION: Cap gene expression cassette

<400> SEQUENCE: 10

| | | | | | |
|---|---|---|---|---|---|
| gacctttaat | tcaacccaac | acaatatatt | atagttaaat | aagaattatt | atcaaatcat | 60 |
| ttgtatatta | attaaaatac | tatactgtaa | attacatttt | atttacaatc | actcgacgaa | 120 |
| gacttgatca | cccgggcagg | taagtatcga | taactttgtt | ttctttcaca | tctacaacgc | 180 |
| cgacgccgcc | atggccatcg | tgttcgccat | tagggcagta | tattctcatt | cttccttttc | 240 |
| cttttttttt | caggttggct | cgggagaagg | gcggggaagc | ctcctaacct | gcggtgacgt | 300 |
| tgaggaaaat | ccgggtccag | ctgccgacgg | ttatctaccc | gattggctcg | aggacaacct | 360 |
| tagtgaagga | attcgcgagt | ggtgggcttt | gaaacctgga | gcccctcaac | ccaaggcaaa | 420 |
| tcaacaacat | caagacaacg | ctcgaggtct | tgtgcttccg | ggttacaaat | accttggacc | 480 |
| cggcaacgga | ctcgacaagg | gggagccggt | caacgcagca | gacgcggcgg | ccctcgagca | 540 |
| cgacaaggcc | tacgaccagc | agctcaaggc | cggagacaac | ccgtacctca | agtacaacca | 600 |
| cgccgacgcc | gagttccagg | agcggctcaa | agaagatacg | tcttttgggg | gcaacctcgg | 660 |
| gcgagcagtc | ttccaggcca | aaaagaggct | tcttgaacct | cttggtctgg | ttgaggaagc | 720 |
| ggctaagacg | gctcctggaa | agaagaggcc | tgtagagcag | tctcctcagg | aaccggactc | 780 |
| ctccgcgggt | attggcaaat | cgggtgcaca | gcccgctaaa | aagagactca | atttcggtca | 840 |
| gactggcgac | acagagtcag | tcccagaccc | tcaaccaatc | ggagaacctc | ccgcagcccc | 900 |
| ctcaggtgtg | ggatctctta | caatggcttc | aggtggtggc | gcaccagtgg | cagacaataa | 960 |
| cgaaggtgcc | gatggagtgg | gtagttcctc | gggaaattgg | cattgcgatt | cccaatggct | 1020 |
| gggggacaga | gtcatcacca | ccagcacccg | aacctgggcc | ctgcccacct | acaacaatca | 1080 |
| cctctacaag | caaatctcca | acagcacatc | tggaggatct | tcaaatgaca | acgcctactt | 1140 |
| cggctacagc | accccctggg | ggtattttga | cttcaacaga | ttccactgcc | acttctcacc | 1200 |
| acgtgactgg | cagcgactca | tcaacaacaa | ctggggattc | cggcctaagc | gactcaactt | 1260 |
| caagctcttc | aacattcagg | tcaaagaggt | tacggacaac | aatggagtca | agaccatcgc | 1320 |
| caataacctt | accagcacgg | tccaggtctt | cacggactca | gactatcagc | tcccgtacgt | 1380 |
| gctcgggtcg | gctcacgagg | gctgcctccc | gccgttccca | gcggacgttt | tcatgattcc | 1440 |
| tcagtacggg | tatctgacgc | ttaatgatgg | aagccaggcc | gtgggtcgtt | cgtcctttta | 1500 |
| ctgcctggaa | tatttcccgt | cgcaaatgct | aagaacgggt | aacaacttcc | agttcagcta | 1560 |
| cgagtttgag | aacgtacctt | tccatagcag | ctacgctcac | agccaaagcc | tggaccgact | 1620 |
| aatgaatcca | ctcatcgacc | aatacttgta | ctatctctca | aagactatta | acggttctgg | 1680 |
| acagaatcaa | caaacgctaa | aattcagtgt | ggccggaccc | agcaacatgg | ctgtccaggg | 1740 |
| aagaaactac | atacctggac | ccagctaccg | acaacaacgt | gtctcaacca | ctgtgactca | 1800 |
| aaacaacaac | agcgaatttg | cttggcctgg | agcttcttct | tgggctctca | atggacgtaa | 1860 |
| tagcttgatg | aatcctggac | ctgctatggc | cagccacaaa | gaaggagagg | ccgtttctct | 1920 |
| tccttttgtct | ggatctttaa | tttttggcaa | acaaggaact | ggaagagaca | acgtggatgc | 1980 |

| | |
|---|---:|
| ggacaaagtc atgataacca acgaagaaga aattaaaact actaacccgg tagcaacgga | 2040 |
| gtcctatgga caagtggcca caaccacca gagtgcccaa gcacaggcgc agaccggctg | 2100 |
| ggttcaaaac caaggaatac ttccgggtat ggtttggcag gacagagatg tgtacctgca | 2160 |
| aggacccatt tgggccaaaa ttcctcacac ggacggcaac tttcacccctt ctccgctgat | 2220 |
| gggagggttt ggaatgaagc acccgcctcc tcagatcctc atcaaaaaca cacctgtacc | 2280 |
| tgcggatcct ccaacggcct tcaacaagga caagctgaac tctttcatca cccagtattc | 2340 |
| tactggccaa gtcagcgtgg agatcgagtg ggagctgcag aaggaaaaca gcaagcgctg | 2400 |
| gaacccggag atccagtaca cttccaacta ttacaagtct aataatgttg aatttgctgt | 2460 |
| taatactgaa ggtgtatata gtgaaccccg ccccattggc accagatacc tgactcgtaa | 2520 |
| tctgtaa | 2527 |

<210> SEQ ID NO 11
<211> LENGTH: 2605
<212> TYPE: DNA
<213> ORGANISM: Artificial Sequence
<220> FEATURE:
<223> OTHER INFORMATION: Cap gene expression cassette

<400> SEQUENCE: 11

| | |
|---|---:|
| gacctttaat tcaacccaac acaatatatt atagttaaat aagaattatt atcaaatcat | 60 |
| ttgtatatta attaaaatac tatactgtaa attacatttt atttacaatc actcgacgaa | 120 |
| gacttgatca cccgggtagg acaaggtaag tattcattgt aaatctgata ttatttgtat | 180 |
| tattatacct acctaatttg cagtgcagat aaatatgccg gatggtaatt ttattactgt | 240 |
| ttggtccata aacacttgtt taccatttcc tttttttacaa gttttaatat gttctgcata | 300 |
| tataaaacat tatgtatttt gcagcacctt caacggctcg ggagaagggc ggggaagcct | 360 |
| cctaacctgc ggtgacgttg aggaaaatcc gggtccagct gccgacggtt atctacccga | 420 |
| ttggctcgag gacaaccttta gtgaaggaat tcgcgagtgg tgggctttga aacctggagc | 480 |
| ccctcaaccc aaggcaaatc aacaacatca agacaacgct cgaggtcttg tgcttccggg | 540 |
| ttacaaatac cttggacccg gcaacggact cgacaagggg gagccggtca acgcagcaga | 600 |
| cgcggcggcc ctcgagcacg acaaggccta cgaccagcag ctcaaggccg agacaacccc | 660 |
| gtacctcaag tacaaccacg ccgacgccga gttccaggag cggctcaaag aagatacgtc | 720 |
| ttttgggggc aacctcgggc gagcagtctt ccaggccaaa aagaggcttc ttgaacctct | 780 |
| tggtctggtt gaggaagcgg ctaagacggc tcctggaaag aagaggcctg tagagcagtc | 840 |
| tcctcaggaa ccggactcct ccgcgggtat tggcaaatcg ggtgcacagc ccgctaaaaa | 900 |
| gagactcaat ttcggtcaga ctggcgacac agagtcagtc ccagacccctc aaccaatcgg | 960 |
| agaacctccc gcagcccct caggtgtggg atctcttaca atggcttcag gtggtggcgc | 1020 |
| accagtggca gacaataacg aaggtgccga tggagtgggt agttcctcgg gaaattggca | 1080 |
| ttgcgattcc caatggctgg ggacagagt catcaccacc agcacccgaa cctgggccct | 1140 |
| gcccacctac aacaatcacc tctacaagca atctccaac agcacatctg gaggatcttc | 1200 |
| aaatgacaac gcctacttcg gctacagcac ccctgggggg tattttgact caacagatt | 1260 |
| ccactgccac ttctcaccac gtgactggca gcgactcatc aacaacaact ggggattccg | 1320 |
| gcctaagcga ctcaacttca agctcttcaa cattcaggtc aaagaggtta cggacaacaa | 1380 |
| tggagtcaag accatcgcca ataacctac cagcacggtc caggtcttca cggactcaga | 1440 |
| ctatcagctc ccgtacgtgc tcgggtcggc tcacgagggc tgcctcccgc cgttcccagc | 1500 |

```
ggacgttttc atgattcctc agtacgggta tctgacgctt aatgatgaaa gccaggccgt    1560
gggtcgttcg tcctttact gcctggaata tttcccgtcg caaatgctaa gaacgggtaa    1620
caacttccag ttcagctacg agtttgagaa cgtacctttc catagcagct acgctcacag    1680
ccaaagcctg gaccgactaa tgaatccact catcgaccaa tacttgtact atctctcaaa    1740
gactattaac ggttctggac agaatcaaca aacgctaaaa ttcagtgtgg ccggacccag    1800
caacatggct gtccagggaa gaaactacat acctggaccc agctaccgac aacaacgtgt    1860
ctcaaccact gtgactcaaa caacaacag cgaatttgct tggcctggag cttcttcttg     1920
ggctctcaat ggacgtaata gcttgatgaa tcctggaccc gctatggcca ccacaaaga    1980 aggagaggac cgtttctttc ctttgtctgg atctttaatt tttggcaaac aaggaactgg    2040
aagagacaac gtggatgcgg acaaagtcat gataaccaac gaagaagaaa ttaaaactac    2100
taacccggta gcaacggagt cctatggaca agtggccaca aaccaccaga gtgcccaagc    2160
acaggcgcag accggctggg ttcaaaacca aggaatactt ccgggtatgg tttggcagga    2220
cagagatgtg tacctgcaag gacccatttg gccaaaaatt cctcacacgg acggcaactt    2280
tcacccttct ccgctgatgg gagggtttgg aatgaagcac ccgcctcctc agatcctcat    2340
caaaaacaca cctgtacctg cggatcctcc aacggccttc aacaaggaca gctgaactc    2400 tttcatcacc cagtattcta ctggccaagt cagcgtggag atcgagtggg agctgcagaa    2460
ggaaaacagc aagcgctgga acccggagat ccagtacact tccaactatt acaagtctaa    2520
taatgttgaa tttgctgtta atactgaagg tgtatatagt gaaccccgcc ccattggcac    2580 cagataccctg actcgtaatc tgtaa                                          2605

<210> SEQ ID NO 12
<211> LENGTH: 92
<212> TYPE: DNA
<213> ORGANISM: Artificial Sequence
<220> FEATURE:
<223> OTHER INFORMATION: Synthetic construct

<400> SEQUENCE: 12
atcatggaga taattaaaat gataaccatc tcgcaaataa ataagtattt tactgttttc    60
gtaacagttt tgtaataaaa aaacctataa at                                  92

<210> SEQ ID NO 13
<211> LENGTH: 1863
<212> TYPE: DNA
<213> ORGANISM: Artificial Sequence
<220> FEATURE:
<223> OTHER INFORMATION: Rep ORF

<400> SEQUENCE: 13
atggggtttt acgagattgt gattaaggtc cccagcgacc ttgacgggca tctgcccggc    60
atttctgaca gctttgtgaa ctgggtggcc gagaaggagt gggagttgcc gccagattct    120
gacttggatc tgaatctgat tgagcaggca ccctgaccg tggccgagaa gctgcagcgc    180
gactttctga cggagtggcg ccgtgtgagt aaggccccgg aggccctttt ctttgtgcaa    240
tttgagaagg agagagcta cttccactta cacgtgctcg tggaaccac cggggtgaaa    300 tccttagttt tgggacgttt cctgagtcag attcgcgaaa aactgattca gagaatttac    360
cgcgggatcg agccgacttt gccaaactgg ttcgcggtca caagaccag aaacggcgcc    420 ggaggcggga acaaggtggt ggacgagtgc tacatcccca attacttgct ccccaaaacc    480
```

```
cagcctgagc tccagtgggc gtggactaat ttagaacagt atttaagcgc ctgtttgaat      540
ctcacggagc gtaaacggtt ggtggcgcag catctgacgc acgtgtcgca gacgcaggag      600
cagaacaaag agaatcagaa tcccaattct gacgcgccgg tgatcagatc aaaaacttca      660
gccaggtaca tggagctggt cgggtggctc gtggacaagg ggattacctc ggagaagcag      720
tggatccagg aggaccaggc ctcatacatc tccttcaatg cggcctccaa ctcgcggtcc      780
caaatcaagg ctgccttgga caatgcggga aagattatga gcctgactaa aaccgccccc      840
gactacctgg tgggccagca gcccgtggag gacatttcca gcaatcggat ttataaaatt      900
ttggaactaa acgggtacga tccccaatat gcggcttccg tctttctggg atgggccacg      960
aaaaagttcg gcaagaggaa caccatctgg ctgtttgggc ctgcaactac cgggaagacc     1020
aacatcgcgg aggccatagc ccacactgtg cccttctacg ggtgcgtaaa ctggaccaat     1080
gagaactttc ccttcaacga ctgtgtcgac aagatggtga tctggtggga ggaggggaag     1140
atgaccgcca aggtcgtgga gtcggccaaa gccattctcg gaggaagcaa ggtgcgcgtg     1200
gaccagaaat gcaagtcctc ggcccagata gacccgactc ccgtgatcgt cacctccaac     1260
accaacatgt gcgccgtgat tgacgggaac tcaacgacct tcgaacacca gcagccgttg     1320
caagaccgga tgttcaaatt tgaactcacc cgccgtctgg atcatgactt tgggaaggtc     1380
accaagcagg aagtcaaaga cttttttcgg tgggcaaagg atcacgtggt tgaggtggag     1440
catgaattct acgtcaaaaa gggtggagcc aagaaaagac cgcccccag tgacgcagat      1500 ataagtgagc ccaaacgggt gcgcgagtca gttgcgcagc catcgacgtc agacgcggaa     1560
gcttcgatca actacgcaga caggtaccaa aacaaatgtt ctcgtcacgt gggcatgaat     1620
ctgatgctgt ttccctgcag acaatgcgag agaatgaatc agaattcaaa tatctgcttc     1680
actcacggac agaaagactg tttagagtgc tttcccgtgt cagaatctca acccgttttct     1740 gtcgtcaaaa aggcgtatca gaaactgtgc tacattcatc atatcatggg aaaggtgcca     1800
gacgcttgca ctgcctgcga tctggtcaat gtggatttgg atgactgcat ctttgaacaa     1860
taa                                                                   1863
```

<210> SEQ ID NO 14  
<211> LENGTH: 2255  
<212> TYPE: DNA  
<213> ORGANISM: Artificial Sequence  
<220> FEATURE:  
<223> OTHER INFORMATION: Rep gene expression cassette

<400> SEQUENCE: 14

```
atcatggaga taattaaaat gataaccatc tcgcaaataa ataagtattt tactgttttc       60
gtaacagttt tgtaataaaa aaacctataa atattccgga ttattcatac cgtcccacca      120
tcgggcgcgg atcctaggac aaggtaagta tgcattgtaa atgtgatatt atgtgtatta      180
ttatacctac ctaatttgca gtgcagataa atatgccgga tggtaatttt attactgttt      240
ggtccataaa cacttgttta ccatttcctt ttttacaagt tttaatatgt tctgcatata      300
taaaacatta tgtattttgc agcaccttca acggctcggg agaagggcgg ggaagcctcc      360
taacctgcgg tgacgttgag gaaaatccgg gtccagggtt ttacgagatt gtgattaagg      420
tccccagcga ccttgacggg catctgcccg gcatttctga cagctttgtg aactgggtgg      480
ccgagaagga gtgggagttg ccgccagatt ctgacttgga tctgaatctg attgagcagg      540
cacccctgac cgtggccgag aagctgcagc gcgactttct gacggagtgg cgccgtgtga     600
gtaaggcccc ggaggccctt ttctttgtgc aatttgagaa gggagagagc tacttccact      660
```

```
tacacgtgct cgtggaaacc accggggtga atccttagt tttgggacgt ttcctgagtc    720
agattcgcga aaaactgatt cagagaattt accgcgggat cgagccgact ttgccaaact    780 ggttcgcgt cacaaagacc agaaacggcg ccggaggcgg gaacaaggtg gtggacgagt    840
gctacatccc caattacttg ctccccaaaa cccagcctga gctccagtgg gcgtggacta    900
atttagaaca gtatttaagc gcctgtttga atctcacgga gcgtaaacgg ttggtggcgc    960
agcatctgac gcacgtgtcg cagacgcagg agcagaacaa agagaatcag aatcccaatt   1020
ctgacgcgcc ggtgatcaga tcaaaaactt cagccaggta catggagctg gtcgggtggc   1080
tcgtggacaa ggggattacc tcggagaagc agtggatcca ggaggaccag gcctcataca   1140
tctccttcaa tgcggcctcc aactcgcggt cccaaatcaa ggctgccttg acaatgcgg    1200 gaaagattat gagcctgact aaaaccgccc ccgactacct ggtgggccag cagcccgtgg   1260
aggacatttc cagcaatcgg atttataaaa ttttggaact aaacgggtac gatccccaat   1320
atgcggcttc cgtcttctg ggatgggcca cgaaaaagtt cggcaagagg aacaccatct    1380
ggctgtttgg gcctgcaact accgggaaga ccaacatcgc ggaggccata gcccacactg   1440
tgcccttcta cgggtgcgta aactggacca atgagaactt tcccttcaac gactgtgtcg   1500
acaagatggt gatctggtgg gaggagggga agatgaccgc caaggtcgtg gagtcggcca   1560
aagccattct cggaggaagc aaggtgcgcg tggaccagaa atgcaagtcc tcggcccaga   1620
tagacccgac tcccgtgatc gtcacctcca acaccaacat gtgcgccgtg attgacggga   1680
actcaacgac cttcgaacac cagcagccgt gcaagaccg gatgttcaaa tttgaactca    1740
cccgccgtct ggatcatgac tttgggaagg tcaccaagca ggaagtcaaa gacttttcc    1800 ggtgggcaaa ggatcacgtg gttgaggtgg agcatgaatt ctacgtcaaa aagggtggag   1860
ccaagaaaag acccgccccc agtgacgcag atataagtga gcccaaacgg gtgcgcgagt   1920
cagttgcgca gccatcgacg tcagacgcgg aagcttcgat caactacgca gacaggtacc   1980
aaaacaaatg ttctcgtcac gtgggcatga atctgatgct gtttccctgc agacaatgcg   2040
agagaatgaa tcagaattca aatatctgct tcactcacgg acagaaagac tgtttagagt   2100
gctttcccgt gtcagaatct caacccgttt ctgtcgtcaa aaaggcgtat cagaaactgt   2160
gctacattca tcatatcatg ggaaaggtgc cagacgcttg cactgcctgc gatctggtca   2220
atgtggattt ggatgactgc atctttgaac aataa                              2255

<210> SEQ ID NO 15
<211> LENGTH: 226
<212> TYPE: DNA
<213> ORGANISM: Artificial Sequence
<220> FEATURE:
<223> OTHER INFORMATION: Synthetic construct

<400> SEQUENCE: 15
gtaagtatcg ataactttgt tttctttcac atttacaact ccgacataca aatgccgcca     60
tggtaagtat tcattgtaaa tctgatatta tttgtattat tatacctacc taatttgcag    120
tgcagggtaa ttttattact gtttggtcca taaacacttg tttaccattt cctttttttac   180 aagttttaat attttctgca tatataaaac attatttatt ttgcag                   226

<210> SEQ ID NO 16
<211> LENGTH: 226
<212> TYPE: DNA
<213> ORGANISM: Artificial Sequence
<220> FEATURE:
```

<223> OTHER INFORMATION: Synthetic construct

<400> SEQUENCE: 16

```
gtaagtattc attgtaaatc tgatattatt tgtattatta tacctaccta atttgcagtg    60
caggccgcca tggtaagtat cgataacttt gttttctttc acatttacaa ctccgacata   120
caaattgtaa ttttattact gtttggtcca taaacacttg tttaccattt ccttttttac   180
aagttttaat attttctgca tatataaaac attatttatt ttgcag                  226
```

<210> SEQ ID NO 17
<211> LENGTH: 2605
<212> TYPE: DNA
<213> ORGANISM: Artificial Sequence
<220> FEATURE:
<223> OTHER INFORMATION: Cap gene expression cassette

<400> SEQUENCE: 17

```
gacctttaat tcaacccaac acaatatatt atagttaaat aagaattatt atcaaatcat    60
ttgtatatta attaaaatac tatactgtaa attcattttt atttacaatc actcgacgaa   120
gacttgatca cccgggtagg acaaggtaag tattcattgt aaatctgata ttatttgtat   180
tattatacct acctaatttg cagtgcagat aaatatgccg gatggtaatt ttattactgt   240
ttggtccata aacacttgtt taccatttcc tttttttacaa gttttaatat gttctgcata   300
tataaaacat tatgtatttt gcagcacctt caacggctcg ggagaagggc ggggaagcct   360
cctaacctgc ggtgacgttg aggaaaatcc gggtccagct gccgacggtt atctacccga   420
ttggctcgag gacaaccttg tgaaggaatc tcgcgagtgg tgggctttga acctggagc    480
ccctcaaccc aaggcaaatc aacaacatca agacaacgct cgaggtcttg tgcttccggg   540
ttacaaatac cttggacccg gcaacggact cgacaagggg gagccggtca acgcagcaga   600
cgcggcggcc ctcgagcacg acaaggccta cgaccagcag ctcaaggccg agacaacccc   660
gtacctcaag tacaaccacg ccgacgccga gttccaggag cggctcaaag aagatacgtc   720
ttttgggggc aacctcgggc gagcagtctt ccaggccaaa aagaggcttc ttgaacctct   780
tggtctggtt gaggaagcgg ctaagacggc tcctggaaag aagaggcctg tagagcagtc   840
tcctcaggaa ccggactcct ccgcgggtat tgcaaatcg ggtgcacagc ccgctaaaaa    900
gagactcaat ttcggtcaga ctggcgacac agagtcagtc ccagaccctc aaccaatcgg   960
agaacctccc gcagccccct caggtgtggg atctcttaca atggcttcag gtggtggcgc  1020
accagtggca gacaataacg aaggtgccga tggagtgggt agttcctcgg gaaattggca  1080
ttgcgattcc aatggctggg ggacagagt catcaccacc agcacccgaa cctgggccct   1140
gcccacctac aacaatcacc tctacaagca aatctccaac agcacatctg gaggatcttc  1200
aaatgacaac gcctacttcg gctacagcac ccctgggggt tattttgact caacagatt   1260
ccactgccac ttctcaccac gtgactggca gcgactcatc aacaacaact ggggattccg  1320
gcctaagcga ctcaacttca gctcttcaa cattcaggtc aaagaggtta cggacaacaa  1380
tggagtcaag accatcgcca ataaccttac cagcacggtc caggtcttca cggactcaga  1440
ctatcagctc ccgtacgtgc tcgggtcggc tcacgagggc tgcctcccgc cgttcccagc  1500
ggacgttttc atgattcctc agtacgggta tctgacgctt aatgatggaa gccaggccgt  1560
gggtcgttcg tcctttact gcctggaata tttcccgtcg caaatgctaa gaacgggtaa  1620
caacttccag ttcagctacg agtttgagaa cgtaccttc catagcagct acgctcacag  1680
ccaaagcctg gaccgactaa tgaatccact catcgaccaa tacttgtact atctctcaaa  1740
```

```
gactattaac ggttctggac agaatcaaca aacgctaaaa ttcagtgtgg ccggacccag   1800
caacatggct gtccagggaa gaaactacat acctggaccc agctaccgac aacaacgtgt   1860
ctcaaccact gtgactcaaa acaacaacag cgaatttgct tggcctggag cttcttcttg   1920
ggctctcaat ggacgtaata gcttgatgaa tcctggacct gctatggcca gccacaaaga   1980
aggagaggac cgtttctttc ctttgtctgg atctttaatt tttggcaaac aaggaactgg   2040
aagagacaac gtggatgcgg acaaagtcat gataaccaac gaagaagaaa ttaaaactac   2100
taacccggta gcaacggagt cctatggaca gtggccaca  aaccaccaga gtgcccaagc   2160
acaggcgcag accggctggg ttcaaaacca aggaatactt ccgggtatgg tttggcagga   2220
cagagatgtg tacctgcaag acccatttg  ggccaaaatt cctcacacgg acggcaactt   2280
tcacccttct ccgctgatgg gagggtttgg aatgaagcac ccgcctcctc agatcctcat   2340
caaaaacaca cctgtacctg cggatcctcc aacggccttc aacaaggaca gctgaactc    2400 tttcatcacc cagtattcta ctggccaagt cagcgtggag atcgagtggg agctgcagaa   2460
ggaaaacagc aagcgctgga acccggagat ccagtacact tccaactatt acaagtctaa   2520
taatgttgaa tttgctgtta atactgaagg tgtatatagt gaaccccgcc ccattggcac   2580
cagatacctg actcgtaatc tgtaa                                         2605
```

<210> SEQ ID NO 18
<211> LENGTH: 2499
<212> TYPE: DNA
<213> ORGANISM: Artificial Sequence
<220> FEATURE:
<223> OTHER INFORMATION: Cap gene expression cassette

<400> SEQUENCE: 18

```
gacctttaat tcaacccaac acaatatatt atagttaaat aagaattatt atcaaatcat    60
ttgtatatta attaaaatac tatactgtaa attacatttt atttacaatc actcgacgaa   120
gacttgatca cccgggtagc taaaggtatt tctttgactc taaaaacctt gacgactgtt   180
tcgccttgaa caaactaaat gaacccttta tgcaaacagc tgcccgtggg ctcgggagaa   240
gggcggggaa gcctcctaac ctgcggtgac gttgaggaaa tccgggtcc  agctgccgac   300 ggttatctac ccgattggct cgaggacaac cttagtgaag gaattcgcga gtggtgggct   360
ttgaaacctg gagcccctca acccaaggca aatcaacaac atcaagacaa cgctcgaggt   420
cttgtgcttc cgggttacaa ataccttgga cccggcaacg gactcgacaa ggggggagccg   480 gtcaacgcag cagacgcggc ggccctcgag cacgacaagg cctacgacca gcagctcaag   540
gccggagaca acccgtacct caagtacaac cacgccgacg ccgagttcca ggagcggctc   600
aaagaagata cgtcttttgg gggcaacctc ggcagcag   tcttccaggc caaaaagagg   660
cttcttgaac ctcttggtct ggttgaggaa gcggctaaga cggctcctgg aaagaagagg   720
cctgtagagc agtctcctca ggaaccggac tcctccgcgg gtattggcaa atcgggtgca   780
cagcccgcta aaaagagact caatttcggt cagactggcg acacagagtc agtcccagac   840
cctcaaccaa tcggagaacc tcccgcagcc ccctcaggtg tgggatctct tacaatggct   900
tcaggtggtg gcgcaccagt ggcagacaat aacgaaggtg ccgatggagt gggtagttcc   960
tcgggaaatt ggcattgcga ttcccaatgg ctgggggaca gagtcatcac caccagcacc  1020
cgaacctggg ccctgcccac ctacaacaat cacctctaca agcaaatctc caacagcaca  1080
tctggaggat cttcaaatga caacgcctac ttcggctaca gcacccctg  ggggtatttt  1140
```

```
gacttcaaca gattccactg ccacttctca ccacgtgact ggcagcgact catcaacaac   1200
aactggggat tccggcctaa gcgactcaac ttcaagctct tcaacattca ggtcaaagag   1260
gttacggaca caatggagt caagaccatc gccaataacc ttaccagcac ggtccaggtc    1320
ttcacggact cagactatca gctcccgtac gtgctcgggt cggctcacga gggctgcctc   1380
ccgccgttcc cagcggacgt tttcatgatt cctcagtacg ggtatctgac gcttaatgat   1440
ggaagccagg ccgtgggtcg ttcgtccttt tactgcctgg aatatttccc gtcgcaaatg   1500
ctaagaacgg gtaacaactt ccagttcagc tacgagtttg agaacgtacc tttccatagc   1560
agctacgctc acagccaaag cctggaccga ctaatgaatc cactcatcga ccaatacttg   1620
tactatctct caaagactat taacggttct ggacagaatc aacaaacgct aaaattcagt   1680
gtggccggac ccagcaacat ggctgtccag ggaagaaact acatacctgg acccagctac   1740
cgacaacaac gtgtctcaac cactgtgact caaaacaaca cagcgaatt tgcttggcct    1800 ggagcttctt cttgggctct caatggacgt aatagcttga tgaatcctgg acctgctatg   1860
gccagccaca aagaaggaga ggaccgtttc tttcctttgt ctggatcttt aattttttggc  1920 aaacaaggaa ctggaagaga caacgtggat gcggacaaag tcatgataac caacgaagaa   1980
gaaattaaaa ctactaaccc ggtagcaacg gagtcctatg acaagtggc cacaaaccac    2040 cagagtgccc aagcacaggc gcagaccggc tgggttcaaa accaaggaat acttccgggt   2100
atggtttggc aggacagaga tgtgtacctg caaggaccca tttgggccaa aattcctcac   2160
acggacggca actttcaccc ttctccgctg atgggagggt ttggaatgaa gcacccgcct   2220
cctcagatcc tcatcaaaaa cacacctgta cctgcggatc ctccaacggc cttcaacaag   2280
gacaagctga actctttcat cacccagtat tctactggcc aagtcagcgt ggagatcgag   2340
tgggagctgc agaaggaaaa cagcaagcgc tggaacccgg agatccagta cacttccaac   2400
tattacaagt ctaataatgt tgaatttgct gttaatactg aaggtgtata tagtgaaccc   2460
cgccccattg gcaccagata cctgactcgt aatctgtaa                          2499

<210> SEQ ID NO 19
<211> LENGTH: 2224
<212> TYPE: DNA
<213> ORGANISM: Artificial Sequence
<220> FEATURE:
<223> OTHER INFORMATION: Rep gene expression cassette

<400> SEQUENCE: 19
atcatggaga taattaaaat gataaccatc tcgcaaataa ataagtattt tactgttttc     60
gtaacagttt tgtaataaaa aaacctataa atattccgga ttattcatac cgtcccacca   120
tcgggcgcgg atccggacaa ggtaagtatt cattgtaaat ctgatattat ttgtattatt   180
atacctacct aatttgcagt gcaggccgcc atggtaagta tcgataactt tgttttcttt   240
cacatttaca actccgacat acaaattgta attttattac tgtttggtcc ataaacactt   300
gtttaccatt tccttttta caagttttaa tattttctgc atatataaaa cattatttat    360
tttgcagggg ttttacgaga ttgtgattaa ggtccccagc gaccttgacg ggcatctgcc   420
cggcatttct gacagctttg tgaactgggt ggccgagaag gagtgggagt gccgccaga    480 ttctgacttg gatctgaatc tgattgagca ggcacccctg accgtggccg agaagctgca   540
gcgcgacttt ctgacggagt ggcgccgtgt gagtaaggcc ccggaggccc ttttctttgt   600
gcaatttgag aagggagaga gctacttcca cttacacgtg ctcgtggaaa ccaccggggt   660 gaaatccta gttttgggac gtttcctgag tcagattcgc gaaaaactga ttcagagaat   720
```

-continued

```
ttaccgcggg atcgagccga ctttgccaaa ctggttcgcg gtcacaaaga ccagaaacgg    780
cgccggaggc gggaacaagg tggtggacga gtgctacatc cccaattact tgctccccaa    840
aacccagcct gagctccagt gggcgtggac taatttagaa cagtatttaa gcgcctgttt    900
gaatctcacg gagcgtaaac ggttggtggc gcagcatctg acgcacgtgt cgcagacgca    960
ggagcagaac aaagagaatc agaatcccaa ttctgacgcg ccggtgatca gatcaaaaac   1020
ttcagccagg tacatggagc tggtcgggtg gctcgtggac aagggattac cctcggagaa   1080
gcagtggatc caggaggacc aggcctcata catctccttc aatgcggcct ccaactcgcg   1140
gtcccaaatc aaggctgcct tggacaatgc gggaaagatt atgagcctga ctaaaaccgc   1200
ccccgactac ctggtgggcc agcagcccgt ggaggacatt ccagcaatc ggatttataa    1260 aattttggaa ctaaacgggt acgatcccca atatgcggct ccgtctttc tgggatgggc    1320 cacgaaaaag ttcggcaaga ggaacaccat ctggctgttt gggcctgcaa ctaccgggaa   1380
gaccaacatc gcggaggcca tagcccacac tgtgcccttc tacgggtgcg taaactggac   1440
caatgagaac tttcccttca cgactgtgt cgacaagatg gtgatctggt gggaggaggg    1500
gaagatgacc gccaaggtcg tggagtcggc caaagccatt ctcggaggaa gcaaggtgcg   1560
cgtggaccag aaatgcaagt cctcggccca gatagacccg actcccgtga tcgtcacctc   1620
caacaccaac atgtgcgccg tgattgacgg gaactcaacg accttcgaac cagcagcc     1680 gttgcaagac cggatgttca aatttgaact cacccgccgt ctggatcatg actttgggaa   1740
ggtcaccaag caggaagtca agacttttt ccggtgggca aaggatcacg tggttgaggt    1800
ggagcatgaa ttctacgtca aaaagggtgg agccaagaaa agacccgccc ccagtgacgc   1860
agatataagt gagcccaaac gggtgcgcga gtcagttgcg cagccatcga cgtcagacgc   1920
ggaagcttcg atcaactacg cagacaggta ccaaaacaaa tgttctcgtc acgtgggcat   1980
gaatctgatg ctgtttccct gcagacaatg cgagagaatg aatcagaatt caaatatctg   2040
cttcactcac ggacagaaag actgtttaga gtgctttccc gtgtcagaat ctcaacccgt   2100
ttctgtcgtc aaaaaggcgt atcagaaact gtgctacatt catcatatca tgggaaaggt   2160
gccagacgct tgcactgcct gcgatctggt caatgtggat ttggatgact gcatctttga   2220
acaa                                                                 2224
```

<210> SEQ ID NO 20
<211> LENGTH: 98
<212> TYPE: DNA
<213> ORGANISM: Artificial Sequence
<220> FEATURE:
<223> OTHER INFORMATION: Synthetic construct

<400> SEQUENCE: 20

```
gtaagtatcg ataactttgt tttctttcac atttacaact ccgacataca aatcccatta    60
cggcagtata aattcgttca ttttggatat tgtttcag                            98
```

<210> SEQ ID NO 21
<211> LENGTH: 108
<212> TYPE: DNA
<213> ORGANISM: Artificial Sequence
<220> FEATURE:
<223> OTHER INFORMATION: Synthetic construct

<400> SEQUENCE: 21

```
gtaagtattc attgtaaatc tgatattatt tgtattatta tacctaccta atttgcagtg    60
```

-continued

| | |
|---|---|
| cagcccatta cggcagtata aattcgttca ttttggatat tgtttcag | 108 |

<210> SEQ ID NO 22
<211> LENGTH: 2451
<212> TYPE: DNA
<213> ORGANISM: Artificial Sequence
<220> FEATURE:
<223> OTHER INFORMATION: Cap gene expression cassette

<400> SEQUENCE: 22

| | |
|---|---|
| gacctttaat tcaacccaac acaatatatt atagttaaat aagaattatt atcaaatcat | 60 |
| ttgtatatta attaaaatac tatactgtaa attacatttt atttacaatc actcgacgaa | 120 |
| gacttgatca cccgggtcag gtagtaagta tcgataactt tgttttcttt cacatttaca | 180 |
| actccgacat acaaatccca ttacggcagt ataaattcgt tcattttgga tattgtttca | 240 |
| gtggctgccg acggttatct acccgattgg ctcgaggaca accttagtga aggaattcgc | 300 |
| gagtggtggg cttgaaacc tggagcccct caacccaagg caaatcaaca acatcaagac | 360 |
| aacgctcgag gtcttgtgct tccgggttac aaataccttg acccggcaa cggactcgac | 420 |
| aaggggagc cggtcaacgc agcagacgcg gcggccctcg agcacgacaa ggcctacgac | 480 |
| cagcagctca aggccggaga caacccgtac ctcaagtaca accacgccga cgccgagttc | 540 |
| caggagcggc tcaaagaaga tacgtctttt gggggcaacc tcgggcgagc agtcttccag | 600 |
| gccaaaaaga ggcttcttga acctcttggt ctggttgagg aagcggctaa cggctcct | 660 |
| ggaaagaaga ggcctgtaga gcagtctcct caggaaccgg actcctccgc gggtattggc | 720 |
| aaatcgggtg cacagcccgc taaaaagaga ctcaatttcg gtcagactgg cgacacagag | 780 |
| tcagtcccag accctcaacc aatcggagaa cctcccgcag cccctcagg tgtgggatct | 840 |
| cttacaatgg cttcaggtgg tggcgcacca gtggcagaca taacgaagg tgccgatgga | 900 |
| gtgggtagtt cctcgggaaa ttggcattgc gattcccaat ggctggggga cagagtcatc | 960 |
| accaccagca cccgaacctg ggccctgccc acctacaaca atcacctcta caagcaaatc | 1020 |
| tccaacagca catctggagg atcttcaaat gacaacgcct acttcggcta cagcacccc | 1080 |
| tgggggtatt ttgacttcaa cagattccac tgccacttct caccacgtga ctggcagcga | 1140 |
| ctcatcaaca caactgggg attccggcct aagcgactca acttcaagct cttcaacatt | 1200 |
| caggtcaaag aggttacgga caacaatgga gtcaagacca cgccaataa ccttaccagc | 1260 |
| acggtccagg tcttcacgga ctcagactat cagctcccgt acgtgctcgg gtcggctcac | 1320 |
| gagggctgcc tcccgccgtt cccagcggac gttttcatga ttcctcagta cgggtatctg | 1380 |
| acgcttaatg atggaagcca ggccgtgggt cgttcgtcct tttactgcct ggaatatttc | 1440 |
| ccgtcgcaaa tgctaagaac gggtaacaac ttccagttca gctacgagtt tgagaacgta | 1500 |
| cctttccata gcagctacgc tcacagccaa agcctggacc gactaatgaa tccactcatc | 1560 |
| gaccaatact tgtactatct ctcaaagact attaacggtt ctggacagaa tcaacaaacg | 1620 |
| ctaaaattca gtgtggccgg acccagcaac atggctgtcc agggaagaaa ctacataccct | 1680 |
| ggacccagct accgacaaca acgtgtctca accactgtga ctcaaaacaa caacagcgaa | 1740 |
| tttgcttggc ctggagcttc ttcttgggct ctcaatggac gtaatagctt gatgaatcct | 1800 |
| ggacctgcta tggccagcca caagaagga gaggaccgtt tctttccttt gtctggatct | 1860 |
| ttaattttg gcaaacaagg aactggaaga gacaacgtgg atgcggacaa agtcatgata | 1920 |
| accaacgaag aagaaattaa aactactaac ccggtagcaa cggagtccta tggacaagtg | 1980 |
| gccacaaaacc accagagtgc ccaagcacag gcgcagaccg gctgggttca aaaccaagga | 2040 |

```
atacttccgg gtatggtttg gcaggacaga gatgtgtacc tgcaaggacc catttgggcc    2100
aaaattcctc acacggacgg caactttcac ccttctccgc tgatgggagg gtttggaatg    2160
aagcacccgc ctcctcagat cctcatcaaa acacacctg tacctgcgga tcctccaacg    2220
gccttcaaca aggacaagct gaactctttc atcacccagt attctactgg ccaagtcagc    2280
gtggagatcg agtgggagct gcagaaggaa acagcaagc gctggaaccc ggagatccag    2340
tacacttcca actattacaa gtctaataat gttgaatttg ctgttaatac tgaaggtgta    2400
tatagtgaac cccgccccat tggcaccaga tacctgactc gtaatctgta a             2451
```

<210> SEQ ID NO 23
<211> LENGTH: 2461
<212> TYPE: DNA
<213> ORGANISM: Artificial Sequence
<220> FEATURE:
<223> OTHER INFORMATION: Cap gene expression cassette

<400> SEQUENCE: 23

```
gacctttaat tcaacccaac acaatatatt atagttaaat aagaattatt atcaaatcat      60
ttgtatatta attaaaatac tatactgtaa attcactttt atttacaatc actcgacgaa     120
gacttgatca cccggggccg ccagtaagta ttcattgtaa atctgatatt atttgtatta     180
ttatacctac ctaatttgca gtgcagccca ttacggcagt ataaattcgt tcattttgga     240
tattgtttca gtggctgccg acggttatct acccgattgg ctcgaggaca accttagtga     300
aggaattcgc gagtggtggg ctttgaaacc tggagcccct caacccaagg caaatcaaca     360
acatcaagac aacgctcgag gtcttgtgct tccgggttac aaataccttg acccggcaa      420 cggactcgac aagggggagc cggtcaacgc agcagacgcg gcggccctcg agcacgacaa     480
ggcctacgac cagcagctca aggccggaga caacccgtac ctcaagtaca accacgccga     540
cgccgagttc caggagcggc tcaaagaaga tacgtctttt gggggcaacc tcgggcgagc     600
agtcttccag gccaaaaaga ggcttcttga acctcttggt ctggttgagg aagcggctaa     660
gacggctcct ggaaagaaga ggcctgtaga gcagtctcct caggaaccgg actcctccgc     720
gggtattggc aaatcgggtg cacagcccgc taaaaagaga ctcaatttcg gtcagactgg     780
cgacacagag tcagtcccag accctcaacc aatcggagaa cctcccgcag ccccctcagg     840
tgtgggatct cttacaatgg cttcaggtgg tggcgcacca gtggcagaca ataacgaagg     900
tgccgatgga gtgggtagtt cctcgggaaa ttggcattgc gattcccaat ggctggggga     960
cagagtcatc accaccagca cccgaacctg ggcctgccc acctacaaca atcacctcta    1020
caagcaaatc tccaacagca catctggagg atcttcaaat gacaacgcct acttcggcta    1080
cagcaccccc tgggggtatt ttgacttcaa cagattccac tgccacttct caccacgtga    1140
ctggcagcga ctcatcaaca caactgggg attccggcct aagcgactca acttcaagct    1200
cttcaacatt caggtcaaag aggttacgga caacaatgga gtcaagacca cgccaataa    1260 ccttaccagc acggtccagg tcttcacgga ctcagactat cagctcccgt acgtgctcgg    1320
gtcggctcac gagggctgcc tcccgccgtt cccagcggac gttttcatga ttcctcagta    1380
cgggtatctg acgcttaatg atggaagcca ggccgtgggt cgttcgtcct tttactgcct    1440
ggaatatttc ccgtcgcaaa tgctaagaac gggtaacaac ttccagttca gctacgagtt    1500
tgagaacgta cctttccata gcagctacgc tcacagccaa agcctggacc gactaatgaa    1560
tccactcatc gaccaatact tgtactatct ctcaaagact attaacggtt ctggacagaa    1620
```

| | |
|---|---:|
| tcaacaaacg ctaaaattca gtgtggccgg acccagcaac atggctgtcc agggaagaaa | 1680 |
| ctacatacct ggacccagct accgacaaca acgtgtctca accactgtga ctcaaaacaa | 1740 |
| caacagcgaa tttgcttggc ctggagcttc ttcttgggct ctcaatggac gtaatagctt | 1800 |
| gatgaatcct ggacctgcta tggccagcca caaagaagga gaggaccgtt tctttccttt | 1860 |
| gtctggatct ttaattttg gcaaacaagg aactggaaga dacaacgtgg atgcggacaa | 1920 |
| agtcatgata accaacgaag aagaaattaa aactactaac ccggtagcaa cggagtccta | 1980 |
| tggacaagtg ccacaaacc accagagtgc ccaagcacag gcgcagaccg gctgggttca | 2040 |
| aaaccaagga atacttccgg gtatggtttg gcaggacaga gatgtgtacc tgcaaggacc | 2100 |
| catttgggcc aaaattcctc acacggacgg caactttcac ccttctccgc tgatgggagg | 2160 |
| gtttggaatg aagcacccgc ctcctcagat cctcatcaaa aacacacctg tacctgcgga | 2220 |
| tcctccaacg gccttcaaca aggacaagct gaactctttc atcacccagt attctactgg | 2280 |
| ccaagtcagc gtggagatcg agtgggagct gcagaaggaa aacagcaagc gctggaaccc | 2340 |
| ggagatccag tacacttcca actattacaa gtctaataat gttgaatttg ctgttaatac | 2400 |
| tgaaggtgta tatagtgaac cccgccccat tggcaccaga tacctgactc gtaatctgta | 2460 |
| a | 2461 |

```
<210> SEQ ID NO 24
<211> LENGTH: 2111
<212> TYPE: DNA
<213> ORGANISM: Artificial Sequence
<220> FEATURE:
<223> OTHER INFORMATION: Rep gene expression cassette

<400> SEQUENCE: 24
```

| | |
|---|---:|
| atcatggaga taattaaaat gataaccatc tcgcaaataa ataagtattt tactgttttc | 60 |
| gtaacagttt tgtaataaaa aaacctataa atattccgga ttattcatac cgtcccacca | 120 |
| tcgggcgcgg atcctcaggt agtaagtatt cattgtaaat ctgatattat ttgtattatt | 180 |
| atacctacct aatttgcagt gcagcccatt acggcagtat aaaattcgtt attttggata | 240 |
| ttgtttcagt ggggttttac gagattgtga ttaaggtccc cagcgacctt gacgggcatc | 300 |
| tgcccggcat ttctgacagc tttgtgaact gggtggccga aaggagtgg gagttgccgc | 360 |
| cagattctga cttggatctg aatctgattg agcaggcacc cctgaccgtg ccgagaagc | 420 |
| tgcagcgcga cttctgacg gagtggcgcc gtgtgagtaa ggccccggag gccctttcct | 480 |
| ttgtgcaatt tgagaaggga gagagctact tccacttaca cgtgctcgtg aaaccaccg | 540 |
| gggtgaaatc cttagttttg ggacgttcc tgagtcagat tcgcgaaaaa ctgattcaga | 600 |
| gaatttaccg cgggatcgag ccgacttgc caaactggtt cgcggtcaca aagaccagaa | 660 |
| acggcgccgg aggcgggaac aaggtggtgg acgagtgcta catccccaat tacttgctcc | 720 |
| ccaaacccca gcctgagctc cagtgggcgt ggactaatt agaacagtat ttaagcgcct | 780 |
| gtttgaatct cacggagcgt aaacggttgg tggcgcagca tctgacgcac gtgtcgcaga | 840 |
| cgcaggagca gaacaaagag aatcagaatc ccaattctga cgcgccggtg atcagatcaa | 900 |
| aaacttcagc caggtacatg gagctggtcg ggtggctcgt ggacaagggg attacctcgg | 960 |
| agaagcagtg gatccaggag gaccaggcct catacatctc cttcaatgcg gcctccaact | 1020 |
| cgcggtccca aatcaaggct gccttggaca tgcgggaaa gattatgagc ctgactaaaa | 1080 |
| ccgcccccga ctacctggtg ggccagcagc ccgtggagga catttccagc aatcggattt | 1140 |
| ataaaatttt ggaactaaac gggtacgatc cccaatatgc ggcttccgtc tttctgggat | 1200 |

```
gggccacgaa aaagttcggc aagaggaaca ccatctggct gtttgggcct gcaactaccg    1260
ggaagaccaa catcgcggag gccatagccc acactgtgcc cttctacggg tgcgtaaact    1320
ggaccaatga aactttccc ttcaacgact gtgtcgacaa gatggtgatc tggtgggagg     1380
aggggaagat gaccgccaag gtcgtggagt cggccaaagc cattctcgga ggaagcaagg    1440
tgcgcgtgga ccagaaatgc aagtcctcgg cccagataga cccgactccc gtgatcgtca    1500
cctccaacac caacatgtgc gccgtgattg acgggaactc aacgaccttc gaacaccagc    1560
agccgttgca agaccggatg ttcaaatttg aactcacccg ccgtctggat catgactttg    1620
ggaaggtcac caagcaggaa gtcaaagact ttttccggtg ggcaaaggat cacgtggttg    1680
aggtggagca tgaattctac gtcaaaaagg gtggagccaa gaaaagaccc gcccccagtg    1740
acgcagatat aagtgagccc aaacgggtgc gcgagtcagt tgcgcagcca tcgacgtcag    1800
acgcggaagc ttcgatcaac tacgcagaca ggtaccaaaa caaatgttct cgtcacgtgg    1860
gcatgaatct gatgctgttt ccctgcagac aatgcgagaa aatgaatcag aattcaaata    1920
tctgcttcac tcacggacag aaagactgtt tagagtgctt tcccgtgtca gaatctcaac    1980
ccgtttctgt cgtcaaaaag gcgtatcaga aactgtgcta cattcatcat atcatgggaa    2040
aggtgccaga cgcttgcact gcctgcgatc tggtcaatgt ggatttggat gactgcatct    2100
ttgaacaata a                                                         2111
```

<210> SEQ ID NO 25
<211> LENGTH: 2048
<212> TYPE: DNA
<213> ORGANISM: Artificial Sequence
<220> FEATURE:
<223> OTHER INFORMATION: Cap gene expression cassette

<400> SEQUENCE: 25

```
atacggacct ttaattcaac ccaacacaat atattatagt taaataagaa ttattatcaa      60
atcatttgta tattaattaa aatactatac tgtaaattac atttattta caatcactcg      120 acgaagactt gatcacccgg ggctaagacg gctgccgacg gttatctacc cgattggctc      180
gaggacaacc ttagtgaagg aattcgcgag tggtgggctt tgaaccctgg agcccctcaa     240
cccaaggcaa atcaacaaca tcaagacaac gctcgaggtc ttgtgcttcc gggttacaaa    300
taccttggac ccggcaacgg actcgacaag ggggagccgg tcaacgcagc agacgcggcg     360
gccctcgagc acgacaaggc ctacgaccag cagctcaagg ccggagacaa cccgtacctc    420
aagtacaacc acgccgacgc cgagttccag gagcggctca agaagatac gtcttttggg     480 ggcaacctcg gcgagcagt cttccaggcc aaaaagaggc ttcttgaacc tcttggtctg     540
gttgaggaag cggctaagac ggctcctgga agaagaggc tgtagagca gtctcctcag      600 gaaccggact cctccgcggg tattggcaaa tcgggtgcac agcccgctaa aaagagactc    660
aatttcggtc agactggcga cacagagtca gtcccagacc ctcaaccaat cggagaacct    720
cccgcagccc cctcaggtgt gggatctctt acaatggctt caggtggtgg cgcaccagtg    780
gcagacaata acgaaggtgc cgatggagtg ggtagttcct cgggaaattg gcattgcgat    840
tcccaatggc tgggggacag agtcatcacc accagcaccc gaacctgggc cctgcccacc    900
tacaacaatc acctctacaa gcaaatctcc aacagcacat ctggaggatc ttcaaatgac    960
aacgcctact tcggctacag cacccctgg gggtattttg acttcaacag attccactgc    1020
cacttctcac cacgtgactg gcagcgactc atcaacaaca actgggggatt ccggcctaag    1080
```

```
cgactcaact tcaagctctt caacattcag gtcaaagagg ttacggacaa caatggagtc    1140
aagaccatcg ccaataacct taccagcacg gtccaggtct tcacggactc agactatcag    1200
ctcccgtacg tgctcgggtc ggctcacgag ggctgcctcc cgccgttccc agcggacgtt    1260
ttcatgattc ctcagtacgg gtatctgacg cttaatgatg gaagccaggc cgtgggtcgt    1320
tcgtcctttt actgcctgga atatttcccg tcgcaaatgc taagaacggg taacaacttc    1380
cagttcagct acgagtttga gaacgtacct ttccatagca gctacgctca cagccaaagc    1440
ctggaccgac taatgaatcc actcatcgac caatacttgt actatctctc aaagactatt    1500
aacggttctg gacagaatca acaaacgcta aaattcagtg tggccggacc cagcaacatg    1560
gctgtccagg gaagaaacta catacctgga cccagctacc gacaacaacg tgtctcaacc    1620
actgtgactc aaaacaacaa cagcgaattt gcttggcctg gagcttcttc ttgggctctc    1680
aatggacgta atagcttgat gaatcctgga cctgctatgg ccagccacaa agaaggagag    1740
gaccgtttct ttcctttgtc tggatcttta atttttggca acaaggaac tggaagagac    1800 aacgtggatg cggacaaagt catgataacc aacgaagaag aaattaaaac tactaacccg    1860
gtagcaacgg agtcctatgg acaagtggcc acaaaccacc agagtgccca agcacaggcg    1920
cagaccggct gggttcaaaa ccaaggaata cttccgggta tggtttggca ggacagagat    1980
gtgtacctgc aaggacccat ttgggccaaa attcctcaca cggacggcaa ctttcaccct    2040
tctccgct                                                             2048

<210> SEQ ID NO 26
<211> LENGTH: 4814
<212> TYPE: DNA
<213> ORGANISM: Artificial Sequence
<220> FEATURE:
<223> OTHER INFORMATION: ITR -GOI

<400> SEQUENCE: 26
cctgcaggca gctgcgcgct cgctcgctca ctgaggccgc ccgggcaaag cccgggcgtc      60
gggcgacctt tggtcgcccg gcctcagtga gcgagcgagc gcgcagagag ggagtggcca     120
actccatcac taggggttcc tgcggccgca cgcgccgccc gtcagtgggc agagcgcaca     180
tcgcccacag tccccgagaa gttggggggag gggtcggca attgaaccgg tgcctagaga     240
aggtggcgcg gggtaaactg ggaaagtgat gtcgtgtact ggctccgcct ttttcccgag     300
ggtgggggag aaccgtatat aagtgcagta gtcgccgtga acgttctttt tcgcaacggg     360
tttgccgcca gaacacgcgt aagggatccg ccaccatggt gagcaagggc gaggaggata     420
acatggccat catcaaggag ttcatgcgct tcaaggtgca catggagggc tccgtgaacg     480
gccacgagtt cgagatcgag ggcgagggcg agggccgccc ctacgagggc acccagaccg     540
ccaagctgaa ggtgaccaag ggtggccccc tgcccttcgc ctgggacatc ctgtcccctc     600
agttcatgta cggctccaag gcctacgtga agcaccccgc cgacatcccc gactacttga     660
agctgtcctt ccccgagggc ttcaagtggg agcgcgtgat gaacttcgag gacggcggcg     720
tggtgaccgt gacccaggac tcctccctgc aggacggcga gttcatctac aaggtgaagc     780
tgcgcggcac caacttcccc tccgacggcc ccgtaatgca gaagaagacc atgggctggg     840
aggcctcctc cgagcggatg taccccgagg acggcgccct gaagggcgag atcaagcaga     900
ggctgaagct gaaggacggc ggccactacg acgctgaggt caagaccacc tacaaggcca     960
agaagcccgt gcagctgccc ggcgcctaca acgtcaacat caagttggac atcacctccc    1020
acaacgagga ctacaccatc gtggaacagt acgaacgcgc cgagggccgc cactccaccg    1080
```

```
gcggcatgga cgagctgtac aagtaagaat tcgatatcaa gcttatcgat aatcaacctc    1140
tggattacaa aatttgtgaa agattgactg gtattcttaa ctatgttgct ccttttacgc    1200
tatgtggata cgctgcttta atgcctttgt atcatgctat tgcttcccgt atggctttca    1260
ttttctcctc cttgtataaa tcctggttgc tgtctcttta tgaggagttg tggcccgttg    1320
tcaggcaacg tggcgtggtg tgcactgtgt ttgctgacgc aacccccact ggttggggca    1380
ttgccaccac ctgtcagctc ctttccggga ctttcgcttt cccctccct attgccacgg    1440 cggaactcat cgccgcctgc cttgcccgct gctggacagg ggctcggctg ttgggcactg    1500
acaattccgt ggtgttgtcg gggaaatcat cgtccttttc ttggctgctc gcctgtgttg    1560
ccacctggat tctgcgcggg acgtccttct gctacgtccc ttcggccctc aatccagcgg    1620
accttccttc ccgcggcctg ctgccggctc tgcggcctct tccgcgtctt cgccttcgcc    1680
ctcagacgag tcggatctcc ctttgggccg cctccccgca tcgataccga gcgctgctcg    1740
agagatctac gggtggcatc cctgtgaccc ctccccagtg cctctcctgg ccctggaagt    1800
tgccactcca gtgcccacca gccttgtcct aataaaatta agttgcatca ttttgtctga    1860
ctaggtgtcc ttctataata ttatggggtg aggggggtg gtatgcagca aggggcaagt    1920
tgggaagaca acctgtaggg cctgcggggt ctattgggaa ccaagctgga gtgcagtggc    1980
acaatcttgg ctcactgcaa tctccgcctc ctgggttcaa gcgattctcc tgcctcagcc    2040
tcccgagttg ttgggattcc aggcatgcat gaccaggctc agctaatttt tgttttttg    2100 gtagagacgg ggtttcacca tattggccag gctggtctcc aactcctaat ctcaggtgat    2160
ctacccacct tggcctccca aattgctggg attacaggcg tgaaccactg ctcccttccc    2220
tgtccttctg attttgtagg taaccacgtg cggaccgagc ggccgcagga acccctagtg    2280
atggagttgg ccactccctc tctgcgcgct cgctcgctca ctgaggccgg gcgaccaaag    2340
gtcgcccgac gcccgggctt tgcccggcg ccctcagtga gcgagcgagc gcgcagctgc    2400
ctgcaggcct gcaggcagct gcgcgctcgc tcgctcactg aggccgcccg gcaaagccc    2460 gggcgtcggg cgacctttgg tcgcccggcc tcagtgagcg agcgagcgcg cagagaggga    2520
gtggccaact ccatcactag gggttcctgc ggccgcacgc gccgcccgtc agtgggcaga    2580
gcgcacatcg cccacagtcc ccgagaagtt ggggggaggg gtcggcaatt gaaccggtgc    2640
ctagagaagg tggcgcgggg taaactggga aagtgatgtc gtgtactggc tccgcctttt    2700
tcccgagggt gggggagaac cgtatataag tgcagtagtc gccgtgaacg ttcttttttcg    2760 caacgggttt gccgccagaa cacgcgtaag ggatccgcca ccatggtgag caagggcgag    2820
gaggataaca tggccatcat caaggagttc atgcgcttca aggtgcacat ggagggctcc    2880
gtgaacggcc acgagttcga gatcgagggc gaggcgagg ccgccccta cgagggcacc    2940 cagaccgcca agctgaaggt gaccaagggt ggccccctgc ccttcgcctg gacatcctg    3000 tcccctcagt tcatgtacgg ctccaaggcc tacgtgaagc accccgccga catccccgac    3060
tacttgaagc tgtccttccc cgagggcttc aagtgggagc gcgtgatgaa cttcgaggac    3120
ggcggcgtgg tgaccgtgac ccaggactcc tccctgcagg acggcgagtt catctacaag    3180
gtgaagctgc gcgcaccaa cttcccctcc gacggccccg taatgcagaa gaagaccatg    3240
ggctgggagg cctcctccga gcggatgtac cccgaggacg gcgccctgaa gggcgagatc    3300
aagcagaggc tgaagctgaa ggacggcggc cactacgacg ctgaggtcaa gaccacctac    3360
aaggccaaga agcccgtgca gctgcccggc gcctacaacg tcaacatcaa gttggacatc    3420
```

```
acctcccaca acgaggacta caccatcgtg gaacagtacg aacgcgccga gggccgccac   3480
tccaccggcg gcatggacga gctgtacaag taagaattcg atatcaagct tatcgataat   3540
caacctctgg attacaaaat ttgtgaaaga ttgactggta ttcttaacta tgttgctcct   3600
tttacgctat gtggatacgc tgctttaatg cctttgtatc atgctattgc ttcccgtatg   3660
gctttcattt tctcctcctt gtataaatcc tggttgctgt ctctttatga ggagttgtgg   3720
cccgttgtca ggcaacgtgg cgtggtgtgc actgtgtttg ctgacgcaac ccccactggt   3780
tggggcattg ccaccacctg tcagctcctt tccgggactt tcgctttccc cctccctatt   3840
gccacggcgg aactcatcgc cgcctgcctt gcccgctgct ggacaggggc tcggctgttg   3900
ggcactgaca attccgtggt gttgtcgggg aaatcatcgt cctttccttg gctgctcgcc   3960
tgtgttgcca cctggattct gcgcgggacg tccttctgct acgtcccttc ggccctcaat   4020
ccagcggacc ttccttcccg cggcctgctg ccggctctgc ggcctcttcc gcgtcttcgc   4080
cttcgccctc agacgagtcg gatctccctt gggccgcct ccccgcatcg ataccgagcg   4140
ctgctcgaga gatctacggg tggcatccct gtgacccctc ccagtgcct ctcctggccc   4200 tggaagttgc cactccagtg cccaccagcc ttgtcctaat aaaattaagt tgcatcattt   4260
tgtctgacta ggtgtccttc tataatatta tggggtggag ggggtggta tggagcaagg   4320 ggcaagttgg gaagacaacc tgtagggcct gcggggtcta ttgggaacca agctggagtg   4380
cagtggcaca atcttggctc actgcaatct ccgcctcctg ggttcaagcg attctcctgc   4440
ctcagcctcc cgagttgttg ggattccagg catgcatgac caggctcagc taattttttgt   4500 ttttttggta gagacggggt ttcaccatat tggccaggct ggtctccaac tcctaatctc   4560
aggtgatcta cccaccttgg cctcccaaat tgctgggatt acaggcgtga accactgctc   4620
ccttccctgt ccttctgatt ttgtaggtaa ccacgtgcgg accgagcggc cgcaggaacc   4680
cctagtgatg gagttggcca ctccctctct gcgcgctcgc tcgctcactg aggccgggcg   4740
accaaaggtc gcccgacgcc cgggctttgc ccgggcggcc tcagtgagcg agcgagcgcg   4800
cagctgcctg cagg                                                    4814
```

<210> SEQ ID NO 27
<211> LENGTH: 2602
<212> TYPE: DNA
<213> ORGANISM: Artificial Sequence
<220> FEATURE:
<223> OTHER INFORMATION: Cap gene expression cassette

<400> SEQUENCE: 27

```
gacctttaat tcaacccaac acaatatatt atagttaaat aagaattatt atcaaatcat    60
ttgtatatta attaaaatac tatactgtaa attacatttt atttacaatc actcgacgaa   120
gacttgatca cccgggtagg acaaggtaag tattcattgt aaatctgata ttatttgtat   180 tattataccct acctaatttg cagtgcagat aaatatgccg gatggtaatt ttattactgt   240
ttggtccata aacacttgtt taccatttcc tttttacaa gttttaatat gttctgcata   300
tataaaacat tatgtatttt gcagcacctt caacggctcg ggagaagggc ggggaagcct   360
cctaacctgc ggtgacgttg aggaaaatcc gggtccagct gccgacggtt atctacccga   420
ttggctcgag gacactctct ctgaaggaat aagacagtgg tggaagctca aacctggccc   480
accaccacca aagcccgcag agcggcataa ggacgacagc aggggtcttg tgcttcctgg   540
gtacaagtac ctcggaccct tcaacggact cgacaaggga gagccggtca acgaggcaga   600
cgccgcggcc ctcgagcacg acaaagccta cgaccggcag ctcgacagcg agacaaccc   660
```

```
gtacctcaag tacaaccacg ccgacgcgga gtttcaggag cgccttaaag aagatacgtc    720
ttttgggggc aacctcggac gagcagtctt ccaggcgaaa aagagggttc ttgaacctct    780
gggcctggtt gaggaacctg ttaagacggc tccgggaaaa aagaggccgg tagagcactc    840
tcctgtggag ccagactcct cctcgggaac cggaaaggcg ggccagcagc ctgcaagaaa    900
aagattgaat tttggtcaga ctggagacgc agactcagta cctgaccccc agcctctcgg    960
acagccacca gcagccccct ctggtctggg aactaatacg atggctacag gcagtggcgc   1020
accaatggca gacaataacg agggcgccga cggagtgggt aattcctcgg gaaattggca   1080
ttgcgattcc acatggatgg cgacagagt catcaccacc agcacccgaa cctgggccct   1140
gcccacctac aacaaccacc tctacaaaca aatttccagc caatcaggag cctcgaacga   1200
caatcactac tttggctaca gcacccttg ggggtatttt gacttcaaca gattccactg   1260 ccactttca ccacgtgact ggcaaagact catcaacaac aactggggat tccgacccaa   1320
gagactcaac ttcaagctct ttaacattca agtcaaagag gtcacgcaga atgacggtac   1380
gacgacgatt gccaataacc ttaccagcac ggttcaggtg tttactgact cggagtacca   1440
gctcccgtac gtcctcggct cggcgcatca aggatgcctc ccgccgttcc cagcagacgt   1500
cttcatggtg ccacagtatg gatacctcac cctgaacaac gggagtcagg cagtaggacg   1560
ctcttcattt tactgcctgg agtacttttcc ttctcagatg ctgcgtaccg gaaacaactt   1620
taccttcagc tacacttttg aggacgttcc tttccacagc agctacgctc acagccagag   1680
tctggaccgt ctcatgaatc ctctcatcga ccagtacctg tattacttga gcagaacaaa   1740
cactccaagt ggaaccacca cgcagtcaag gcttcagttt tctcaggccg gagcgagtga   1800
cattcgggac cagtctagga actggcttcc tggaccctgt taccgccagc agcgagtatc   1860
aaagacatct gcggataaca caacagtga atactcgtgg actggagcta ccaagtacca   1920
cctcaatggc agagactctc tggtgaatcc ggggccggcc atggcaagcc acaaggacga   1980
tgaagaaaag tttttcctc agagcggggt tctcatcttt gggaagcaag gctcagagaa   2040
aacaaatgtg gacattgaaa aggtcatgat tacagacgaa gaggaaatca ggacaaccaa   2100
tcccgtggct acggagcagt atggttctgt atctaccaac ctccagagag gcaacagaca   2160
agcagctacc gcagatgtca acacacaagg cgttcttcca ggcatggtct ggcaggacag   2220
agatgtgtac cttcaggggc ccatctggc aaagattcca cacacggacg gacatttca    2280 cccctctccc ctcatgggtg gattcggact aaacaccct cctccacaga ttctcatcaa   2340 gaacacccg gtacctgcga atccttcgac caccttcagt gcggcaaagt ttgcttcctt   2400
catcacacag tactccacgg acaggtcag cgtggagatc gagtgggagc tgcagaagga   2460
aaacagcaaa cgctggaatc ccgaaattca gtacacttcc aactacaaca gtctgttaa   2520 tgtggacttt actgtggaca ctaatggcgt gtattcagag cctcgcccca ttggcaccag   2580
atacctgact cgtaatctgt aa                                             2602

<210> SEQ ID NO 28
<211> LENGTH: 2574
<212> TYPE: DNA
<213> ORGANISM: Artificial Sequence
<220> FEATURE:
<223> OTHER INFORMATION: Cap gene expression cassette

<400> SEQUENCE: 28
gacctttaat tcaacccaac acaatatatt atagttaaat aagaattatt atcaaatcat     60
```

```
ttgtatatta attaaaatac tatactgtaa attacatttt atttacaatc actcgacgaa      120
gacttgatca cccgggggac aaggtaagta ttcattgtaa atctgatatt atttgtatta      180
ttatacctac ctaatttgca gtgcaggccg ccatggtaag tatcgataac tttgttttct      240
ttcacattta caactccgac atacaaattg taattttatt actgtttggt ccataaacac      300
ttgtttacca tttcctttt tacaagtttt aatattttct gcatatataa aacattattt      360
attttgcagg ctgccgacgg ttatctaccc gattggctcg aggacactct ctctgaagga      420
ataagacagt ggtggaagct caaacctggc ccaccaccac caaagcccgc agagcggcat      480
aaggacgaca gcagggggtct tgtgcttcct gggtacaagt acctcggacc cttcaacgga     540
ctcgacaagg gagagccggt caacgaggca gacgccgcgg ccctcgagca cgacaaagcc      600
tacgaccggc agctcgacag cggagacaac ccgtacctca gtacaaacca cgccgacgcg      660
gagtttcagg agcgccttaa agaagatacg tcttttgggg gcaacctcgg acgagcagtc      720
ttccaggcga aaagagggt tcttgaacct ctgggcctgg ttgaggaacc tgttaagacg      780
gctccgggaa aaagaggcc ggtagagcac tctcctgtgg agccagactc ctcctcggga      840
accggaaagg cgggccagca gcctgcaaga aaaagattga attttggtca gactggagac      900
gcagactcag tacctgaccc ccagcctctc ggacagccac cagcagcccc ctctggtctg      960
ggaactaata cgatggctac aggcagtggc gcaccaatgg cagacaataa cgagggcgcc     1020 gacgagtgg gtaattcctc gggaaattgg cattgcgatt ccacatggat gggcgacaga     1080
gtcatcacca ccagcacccg aacctgggcc ctgcccacct acaacaacca cctctacaaa     1140
caaatttcca gccaatcagg agcctcgaac gacaatcact actttggcta cagcacccct     1200
tgggggtatt ttgacttcaa cagattccac tgccactttt caccacgtga ctggcaaaga     1260
ctcatcaaca caactggggg attccgaccc aagagactca acttcaagct ctttaacatt     1320
caagtcaaag aggtcacgca gaatgacggt acgacgacga ttgccaataa ccttaccagc     1380
acggttcagt gtttactga ctcggagtac cagctcccgt acgtcctcgg ctcggcgcat     1440
caaggatgcc tcccgccgtt cccagcagac gtcttcatgg tgccacagta tggatacctc     1500
accctgaaca acgggagtca ggcagtagga cgctcttcat tttactgcct ggagtacttt     1560
ccttctcaga tgctgcgtac cggaaacaac tttaccttca gctacacttt tgaggacgtt      1620
cctttccaca gcagctacgc tcacagccag agtctggacc gtctcatgaa tcctctcatc      1680
gaccagtacc tgtattactt gagcagaaca aacactccaa gtggaaccac cacgcagtca      1740
aggcttcagt tttctcaggc cggagcgagt gacattcggg accagtctag gaactggctt      1800
cctggaccct gttaccgcca gcagcgagta tcaaagacat ctgcggataa caacaacagt      1860
gaatactcgt ggactggagc taccaagtac cacctcaatg gcagagactc tctggtgaat      1920
ccgggcccgg ccatggcaag ccacaaggac gatgaagaaa agttttttcc tcagagcggg      1980
gttctcatct ttgggaagca aggctcagag aaaacaaatg tggacattga aaaggtcatg      2040
attacagacg aagaggaaat caggacaacc aatcccgtgg ctacgagcag tatggttct      2100 gtatctacca acctccagag aggcaacaga caagcagcta ccgcagatgt caacacacaa      2160
ggcgttcttc caggcatggt ctggcaggac agagatgtgt accttcaggg gcccatctgg      2220
gcaaagattc cacacacgga cggacatttt caccccctctc ccctcatggg tggattcgga      2280
cttaaacacc ctcctccaca gattctcatc aagaacaccc cggtacctgc gaatccttcg      2340
accaccttca gtgcggcaaa gtttgcttcc ttcatcacac agtactccac gggacaggtc      2400
agcgtggaga tcgagtggga gctgcagaag gaaaacagca acgctggaa tcccgaaatt      2460
```

```
cagtacactt ccaactacaa caagtctgtt aatgtggact ttactgtgga cactaatggc    2520
gtgtattcag agcctcgccc cattggcacc agatacctga ctcgtaatct gtaa          2574

<210> SEQ ID NO 29
<211> LENGTH: 2448
<212> TYPE: DNA
<213> ORGANISM: Artificial Sequence
<220> FEATURE:
<223> OTHER INFORMATION: Cap gene expression cassette

<400> SEQUENCE: 29
gacctttaat tcaacccaac acaatatatt atagttaaat aagaattatt atcaaatcat      60
ttgtatatta attaaaatac tatactgtaa attacatttt atttacaatc actcgacgaa     120
gacttgatca cccgggtcag gtagtaagta tcgataactt tgttttcttt cacatttaca     180
actccgacat acaaatccca ttacggcagt ataaattcgt tcattttgga tattgtttca     240
gtggctgccg acggttatct acccgattgg ctcgaggaca ctctctctga aggaataaga     300
cagtggtgga agctcaaacc tggcccacca ccaccaaagc ccgcagagcg cataaggac     360 gacagcaggg tcttgtgct tcctgggtac aagtacctcg acccttcaa cggactcgac      420 aagggagagc cggtcaacga ggcagacgcc gcggccctcg agcacgacaa agcctacgac     480
cggcagctcg acagcggaga caacccgtac ctcaagtaca accacgccga cgcggagttt     540
caggagcgcc ttaaagaaga tacgtctttt gggggcaacc tcggacgagc agtcttccag     600
gcgaaaaaga gggttcttga acctctgggc ctggttgagg aacctgttaa gacggctccg     660
ggaaaaaaga ggccggtaga gcactctcct gtggagccag actcctcctc gggaaccgga     720
aaggcgggcc agcagcctgc aagaaaaaga ttgaattttg gtcagactgg agacgcagac     780
tcagtacctg accccagcc tctcggacag ccaccagcag cccctctgg tctgggaact      840 aatacgatgg ctacaggcag tggcgcacca atggcagaca taacgagg cgccgacgga       900 gtgggtaatt cctcgggaaa ttggcattgc gattccacat ggatgggcga cagagtcatc     960
accaccagca cccgaaccctg gccctgccc acctacaaca accacctcta caaacaaatt    1020
tccagccaat caggagcctc gaacgacaat cactactttg gctacagcac cccttgggg    1080 tattttgact tcaacagatt ccactgccac ttttcaccac gtgactggca aagactcatc    1140
aacaacaact ggggattccg acccaagaga ctcaacttca gctctttaa cattcaagtc    1200 aaagaggtca cgcagaatga cggtacgacg acgattgcca ataacttac cagcacggtt    1260 caggtgttta ctgactcgga gtaccagctc ccgtacgtcc tcggctcggc gcatcaagga    1320
tgcctcccgc cgttcccagc agacgtcttc atggtgccac agtatggata cctcacccctg   1380 aacaacggga gtcaggcagt aggacgctct tcattttact gcctggagta ctttccttct    1440
cagatgctgc gtaccggaaa caactttacc ttcagctaca cttttgagga cgttcctttc    1500
cacagcagct acgctcacag ccagagtctg gaccgtctca tgaatcctct catcgaccag    1560
tacctgtatt acttgagcag aacaaacact ccaagtggaa ccaccacgca gtcaaggctt    1620 cagtttctc aggccggagc gagtgacatt cgggaccagt ctaggaactg gcttcctgga    1680
ccctgttacc gccagcagcg agtatcaaag acatctgcgg ataacaacaa cagtgaatac    1740
tcgtggactg gagctaccaa gtaccacctc aatggcagag actctctggt gaatccgggc    1800
ccggccatgg caagccacaa ggacgatgaa gaaaagtttt tccctcagag cggggttctc    1860
atctttggga agcaaggctc agagaaaaca aatgtggaca ttgaaaaggt catgattaca    1920
```

| | |
|---|---|
| gacgaagagg aaatcaggac aaccaatccc gtggctacgg agcagtatgg ttctgtatct | 1980 |
| accaacctcc agagaggcaa cagacaagca gctaccgcag atgtcaacac acaaggcgtt | 2040 |
| cttccaggca tggtctggca ggacagagat gtgtaccttc aggggcccat ctgggcaaag | 2100 |
| attccacaca cggacggaca ttttcacccc tctcccctca tgggtggatt cggacttaaa | 2160 |
| caccctcctc acagattct catcaagaac accccggtac ctgcgaatcc ttcgaccacc | 2220 |
| ttcagtgcgg caaagtttgc ttccttcatc acacagtact ccacgggaca ggtcagcgtg | 2280 |
| gagatcgagt gggagctgca gaaggaaaac agcaaacgct ggaatcccga aattcagtac | 2340 |
| acttccaact acaacaagtc tgttaatgtg gactttactg tggacactaa tggcgtgtat | 2400 |
| tcagagcctc gccccattgg caccagatac ctgactcgta atctgtaa | 2448 |

<210> SEQ ID NO 30
<211> LENGTH: 2569
<212> TYPE: DNA
<213> ORGANISM: Artificial Sequence
<220> FEATURE:
<223> OTHER INFORMATION: Cap gene expression cassette

<400> SEQUENCE: 30

| | |
|---|---|
| gacctttaat tcaacccaac acaatatatt atagttaaat aagaattatt atcaaatcat | 60 |
| ttgtatatta attaaaatac tatactgtaa attacatttt atttacaatc actcgacgaa | 120 |
| gacttgatca cccgggtagg acaaggtaag tattcattgt aaatctgata ttatttgtat | 180 |
| tattataccct acctaatttg cagtgcagat aaatatgccg gatggtaatt ttattactgt | 240 |
| ttggtccata aacacttgtt taccattcc ttttttacaa gttttaatat gttctgcata | 300 |
| tataaaacat tatgtatttt gcagcacctt caacggctcg ggagaagggc ggggaagcct | 360 |
| cctaacctgc ggtgacgttg aggaaaatcc gggtccatct tttgttgatc acccacccga | 420 |
| ttggttggaa gaagttggtg aaggtcttcg cgagttttg ggccttgaag cgggcccacc | 480 |
| gaaaccaaaa cccaatcagc agcatcaaga tcaagcccgt ggtcttgtgc tgcctggtta | 540 |
| taactatctc ggacccggaa acggtctcga tcgaggagag cctgtcaaca gggcagacga | 600 |
| ggtcgcgcga gagcacgaca tctcgtacaa cgagcagctt gaggcgggag acaaccccta | 660 |
| cctcaagtac aaccacgcgg acgccgagtt tcaggagaag ctcgccgacg acacatcctt | 720 |
| cggggggaaac tcggaaaggg cagtcttca ggccaagaaa agggttctcg aaccttttgg | 780 |
| cctggttgaa gagggtgcta agacggcccc taccggaaag cggatagacg accactttcc | 840 |
| aaaaagaaag aaggctcgga ccgaagagga ctccaagcct tccacctcgt cagacgccga | 900 |
| agctggaccc agcggatccc agcagctgca atcccagcc caaccagcct caagtttggg | 960 |
| agctgataca atgtctgcgg gaggtggcgg cccattgggc gacaataacc aaggtgccga | 1020 |
| tggagtgggc aatgcctcgg gagattggca ttgcgattcc acgtggatgg gggacagagt | 1080 |
| cgtcaccaag tccacccgaa cctgggtgct gcccagctac aacaaccacc agtaccgaga | 1140 |
| gatcaaaagc ggctccgtcg acggaagcaa cgccaacgcc tactttggat acagcacccc | 1200 |
| ctggggggtac tttgacttta accgcttcca cagccactgg agcccccgag actggcaaag | 1260 |
| actcatcaac aactactggg gcttcagacc ccggtccctc agagtcaaaa tcttcaacat | 1320 |
| tcaagtcaaa gaggtcacgg tgcaggactc caccaccacc atcgccaaca acctcacctc | 1380 |
| caccgtccaa gtgtttacgg acgacgacta ccagctgccc tacgtcgtcg gcaacgggac | 1440 |
| cgagggatgc ctgccggcct tcctccgca ggtctttacg ctgccgcagt acggttacgc | 1500 |
| gacgctgaac cgcgacaaca cagaaaatcc caccgagagg agcagcttct tctgcctaga | 1560 |

```
gtactttccc agcaagatgc tgagaacggg caacaacttt gagtttacct acaactttga  1620
ggaggtgccc ttccactcca gcttcgctcc cagtcagaac ctcttcaagc tggccaaccc  1680
gctggtggac cagtacttgt accgcttcgt gagcacaaat aacactggcg gagtccagtt  1740
caacaagaac ctggccggga gatacgccaa cacctacaaa aactggttcc cggggcccat  1800
gggccgaacc cagggctgga acctgggctc cggggtcaac cgcgccagtg tcagcgcctt  1860
cgccacgacc aataggatgg agctcgaggg cgcgagttac caggtgcccc gcagccgaa   1920 cggcatgacc aacaacctcc agggcagcaa cacctatgcc ctggagaaca ctatgatctt  1980
caacagccag ccggcgaacc cgggcaccac cgccacgtac ctcgagggca catgctcat   2040 caccagcgag agcgagacgc agccggtgaa ccgcgtggcg tacaacgtcg gcgggcagat  2100
ggccaccaac aaccagagct ccaccactgc ccccgcgacc ggcacgtaca acctccagga  2160
aatcgtgccc ggcagcgtgt ggatggagag ggacgtgtac ctccaaggac ccatctgggc  2220
caagatccca gagacggggg cgcactttca cccctctccg gccatgggcg gattcggact  2280 caaacacccca ccgcccatga tgctcatcaa gaacacgcct gtgcccggaa atatcaccag  2340
cttctcggac gtgcccgtca gcagcttcat cacccagtac agcaccgggc aggtcaccgt  2400
ggagatggag tgggagctca agaaggaaaa ctccaagagg tggaacccag agatccagta  2460
cacaaacaac tacaacgacc cccagttttgt ggactttgcc ccggacagca ccggggaata  2520
cagaagcacc agacctatcg aacccgata ccttacccga ccccttaa                2569
```

`<210>` SEQ ID NO 31
`<211>` LENGTH: 2541
`<212>` TYPE: DNA
`<213>` ORGANISM: Artificial Sequence
`<220>` FEATURE:
`<223>` OTHER INFORMATION: Cap gene expression cassette

`<400>` SEQUENCE: 31

```
gacctttaat tcaacccaac acaatatatt atagttaaat aagaattatt atcaaatcat   60
ttgtatatta attaaaatac tatactgtaa attacatttt atttacaatc actcgacgaa  120
gacttgatca cccgggggac aaggtaagta ttcattgtaa atctgatatt atttgtatta  180
ttatacctac ctaatttgca gtgcaggccg ccatggtaag tatcgataac tttgtttct   240 ttcacattta caactccgac atacaaattg taatttatt actgtttggt ccataaacac   300
ttgtttacca tttcctttt tacaagtttt aatattttct gcatatataa aacattattt   360
attttgcagt cttttgttga tcacccaccc gattggttgg aagaagttgg tgaaggtctt   420
cgcgagtttt tgggccttga agcgggccca ccgaaaccaa acccaatca gcagcatcaa   480 gatcaagccc gtggtcttgt gctgcctggt tataactatc tcggaccgg aaacggtctc    540 gatcgaggag agcctgtcaa cagggcagac gaggtcgcgc gagagcacga catctcgtac   600
aacgagcagc ttgaggcggg agacaacccc tacctcaagt acaaccacgc ggacgccgag   660
tttcaggaga agctcgccga cgacacatcc ttcggggaa acctcggaaa ggcagtcttt   720
caggccaaga aaagggttct cgaacctttt ggcctggttg aagagggtgc taagacggcc   780
cctaccggaa agcggataga cgaccacttt ccaaaaagaa agaaggctcg gaccgaagag   840
gactccaagc cttccaccct gtcagacgcc gaagctggac ccagcggatc ccagcagctg   900
caaatcccag cccaaccagc ctcaagttttg gagctgata caatgtctgc gggaggtggc   960
ggcccattgg gcgacaataa ccaaggtgcc gatggagtgg gcaatgcctc gggagattgg  1020
```

```
cattgcgatt ccacgtggat gggggacaga gtcgtcacca agtccacccg aacctgggtg    1080
ctgcccagct acaacaacca ccagtaccga gagatcaaaa gcggctccgt cgacggaagc    1140
aacgccaacg cctactttgg atacagcacc ccctgggggt actttgactt taaccgcttc    1200
cacagccact ggagcccccg agactggcaa agactcatca acaactactg gggcttcaga    1260
ccccggtccc tcagagtcaa atcttcaac attcaagtca agaggtcac ggtgcaggac      1320 tccaccacca ccatcgccaa caacctcacc tccaccgtcc aagtgtttac ggacgacgac    1380
taccagctgc cctacgtcgt cggcaacggg accgagggat gcctgccggc cttccctccg    1440
caggtcttta cgctgccgca gtacggttac gcgacgctga accgcgacaa cacagaaaat    1500
cccaccgaga ggagcagctt cttctgccta gagtactttc ccagcaagat gctgagaacg    1560
ggcaacaact ttgagtttac ctacaacttt gaggaggtgc ccttccactc cagcttcgct    1620
cccagtcaga acctcttcaa gctggccaac ccgctggtgg accagtactt gtaccgcttc    1680
gtgagcacaa ataacactgg cggagtccag ttcaacaaga acctggccgg agatacgcc    1740 aacacctaca aaaactggtt cccggggccc atgggccgaa cccagggctg aacctgggc    1800 tccggggtca accgcgccag tgtcagcgcc ttcgccacga ccaataggat ggagctcgag    1860
ggcgcgagtt accaggtgcc cccgcagccg aacggcatga ccaacaacct cagggcagc    1920 aacacctatg ccctggagaa cactatgatc ttcaacagcc agccggcgaa cccgggcacc    1980
accgccacgt acctcgaggg caacatgctc atcaccagcg agagcgagac gcagccggtg    2040
aaccgcgtgg cgtacaacgt cggcgggcag atggccacca caaccagag ctccaccact     2100 gccccccgca ccggcacgta caacctccag gaaatcgtgc ccggcagcgt gtggatggag    2160
agggacgtgt acctccaagg acccatctgg gccaagatcc agagacggg ggcgcacttt    2220 cacccctctc cggccatggg cggattcgga ctcaaacacc caccgccat gatgctcatc     2280 aagaacacgc ctgtgcccgg aaatatcacc agcttctcgg acgtgccgt cagcagcttc    2340 atcacccagt acagcaccgg gcaggtcacc gtggagatgg agtgggagct caagaaggaa    2400
aactccaaga ggtggaaccc agagatccag tacacaaaca actacaacga ccccagtttt    2460
gtggactttg ccccggacag caccggggaa tacagaagca ccagacctat cggaaccga     2520 taccttaccc gacccctta a                                               2541
```

<210> SEQ ID NO 32
<211> LENGTH: 2415
<212> TYPE: DNA
<213> ORGANISM: Artificial Sequence
<220> FEATURE:
<223> OTHER INFORMATION: Cap gene expression cassette

<400> SEQUENCE: 32

```
gacctttaat tcaacccaac acaatatatt atagttaaat aagaattatt atcaaatcat     60
ttgtatatta attaaaatac tatactgtaa attacattt atttacaatc actcgacgaa     120
gacttgatca cccgggtcag gtagtaagta tcgataactt tgttttcttt cacatttaca    180
actccgacat acaaatccca ttacggcagt ataaattcgt tcattttgga tattgtttca    240 gtgtctttg ttgatcaccc acccgattgg ttggaagaag ttggtgaagg tcttcgcgag     300
tttttgggcc ttgaagcggg cccaccgaaa ccaaaaccca atcagcagca tcaagatcaa    360
gcccgtggtc ttgtgctgcc tggttataac tatctcggac ccggaaacgg tctcgatcga    420
ggagagcctg tcaacagggc agacgaggtc gcgcgagagc acgacatctc gtacaacgag    480
cagcttgagg cgggagacaa cccctacctc aagtacaacc acgcggacgc cgagtttcag    540
```

```
gagaagctcg ccgacgacac atccttcggg ggaaacctcg gaaaggcagt ctttcaggcc      600
aagaaaaggg ttctcgaacc ttttggcctg gttgaagagg gtgctaagac ggcccctacc      660
ggaaagcgga tagacgacca ctttccaaaa agaaagaagg ctcggaccga agaggactcc      720
aagccttcca cctcgtcaga cgccgaagct ggacccagcg gatcccagca gctgcaaatc      780
ccagcccaac cagcctcaag tttgggagct gatacaatgt ctgcgggagg tggcggccca      840
ttgggcgaca taaccaagg tgccgatgga gtgggcaatg cctcgggaga ttggcattgc      900
gattccacgt ggatggggga cagagtcgtc accaagtcca cccgaacctg ggtgctgccc      960
agctacaaca accaccagta ccgagagatc aaaagcggct ccgtcgacgg aagcaacgcc     1020
aacgcctact ttggatacag cacccctgg gggtactttg actttaaccg cttccacagc     1080
cactggagcc cccgagactg gcaaagactc atcaacaact actggggctt cagacccgg     1140 tccctcagag tcaaaatctt caacattcaa gtcaagagg tcacggtgca ggactccacc     1200
accaccatcg ccaacaacct cacctccacc gtccaagtgt ttacgacga cgactaccag     1260 ctgccctacg tcgtcggcaa cgggaccgag ggatgcctgc cggccttccc tccgcaggtc     1320
tttacgctgc cgcagtacgg ttacgcgacg ctgaaccgcg acaacacaga aaatcccacc     1380
gagaggagca gcttcttctg cctagagtac tttcccagca agatgctgag aacgggcaac     1440
aactttgagt ttacctacaa cttgagggag gtgcccttcc actccagctt cgctcccagt     1500
cagaacctct tcaagctggc caacccgctg gtggaccagt acttgtaccg cttcgtgagc     1560
acaaataaca ctggcggagt ccagttcaac aagaacctgg ccgggagata cgccaacacc     1620
tacaaaaact ggttcccggg gcccatgggc cgaacccagg gctggaacct gggctccggg     1680
gtcaaccgcg ccagtgtcag cgccttcgcc acgaccaata ggatggagct cgagggcgcg     1740
agttaccagg tgccccgca gccgaacggc atgaccaaca cctccaggg cagcaacacc     1800 tatgccctgg agaacactat gatcttcaac agccagccgg cgaacccggg caccaccgcc     1860
acgtacctcg agggcaacat gctcatcacc agcgagagcg agacgcagcc ggtgaaccgc     1920
gtggcgtaca cgtcggcgg gcagatggcc accaacaacc agagctccac cactgccccc     1980
gcgaccggca cgtacaacct ccaggaaatc gtgcccggca cgtgtggat ggagagggac     2040 gtgtacctcc aaggacccat ctgggccaag atcccagaga cggggcgca ctttcacccc     2100 tctccggcca tgggcggatt cggactcaaa cacccaccgc ccatgatgct catcaagaac     2160
acgcctgtgc ccggaaatat caccagcttc tcggacgtgc ccgtcagcag cttcatcacc     2220
cagtacagca ccgggcaggt caccgtggag atggagtggg agctcaagaa ggaaaactcc     2280
aagaggtgga acccagagat ccagtacaca aacaactaca acgaccccca gtttgtggac     2340
tttgccccgg acagcaccgg ggaatacaga agcaccagac tatcggaaac ccgataccttt     2400 acccgacccc tttaa                                                    2415
```

<210> SEQ ID NO 33
<211> LENGTH: 2611
<212> TYPE: DNA
<213> ORGANISM: Artificial Sequence
<220> FEATURE:
<223> OTHER INFORMATION: Cap gene expression cassette

<400> SEQUENCE: 33

```
gacctttaat tcaacccaac acaatatatt atagttaaat aagaattatt atcaaatcat       60
ttgtatatta attaaaatac tatactgtaa attacatttt atttacaatc actcgacgaa      120
```

```
gacttgatca cccgggtagg acaaggtaag tattcattgt aaatctgata ttatttgtat    180 tattataect acctaatttg cagtgcagat aaatatgccg gatggtaatt ttattactgt    240
ttggtccata aacacttgtt taccatttcc tttttacaa gttttaatat gttctgcata     300
tataaaacat tatgtatttt gcagcacctt caacggctcg ggagaagggc ggggaagcct    360
cctaacctgc ggtgacgttg aggaaaatcc gggtccagct gccgacggtt atctacccga    420
ttggctcgag gacaacctct ctgagggcat tcgcgagtgg tgggcgctga aacctggagc    480
cccgaagccc aaagccaacc agcaaaagca ggacgacggc cggggtctgg tgcttcctgg    540
ctacaagtac ctcggaccct tcaacggact cgacaagggg gagcccgtca acgcggcgga    600
cgcagcggcc ctcgagcacg acaaggccta cgaccagcag ctgcaggcgg gtgacaatcc    660
gtacctgcgg tataaccacg ccgacgccga gtttcaggag cgtctgcaag aagatacgtc    720 ttttggggc aacctcgggc gagcagtctt ccaggccaag aagcgggttc tcgaacctct     780
cggtctggtt gaggaaggcg ctaagacggc tcctggaaag aagagaccgg tagagccatc    840
accccagcgt tctccagact cctctacggg catcggcaag aaaggccaac agcccgccag    900
aaaaagactc aattttggtc agactggcga ctcagagtca gttccagacc ctcaacctct    960
cggagaacct ccagcagcgc cctctggtgt gggacctaat acaatggctg caggcggtgg   1020
cgcaccaatg gcagacaata acgaaggcgc cgacggagtg ggtagttcct cgggaaattg   1080
gcattgcgat tccacatggc tgggcgacag agtcatcacc accagcaccc gaacctgggc   1140
cctgcccacc tacaacaacc acctctacaa gcaaatctcc aacgggacat cgggaggagc   1200
caccaacgac aacacctact tcggctacag cacccctgg gggtattttg actttaacag    1260
attccactgc cacttttcac cacgtgactg gcagcgactc atcaacaaca actggggatt   1320
ccggcccaag agactcagct tcaagctctt caacatccag gtcaaggagg tcacgcagaa   1380
tgaaggcacc aagaccatcg ccaataacct caccagcacc atccaggtgt ttacggactc   1440
ggagtaccag ctgccgtacg ttctcggctc tgcccaccag gctgcctgc ctccgttccc    1500 ggcggacgtg ttcatgattc cccagtacgg ctacctaaca ctcaacaacg gtagtcaggc   1560
cgtgggacgc tcctccttct actgcctgga atactttcct tcgcagatgc tgagaaccgg   1620
caacaacttc cagtttacct acaccttcga ggacgtgcct ttccacagca gctacgccca   1680
cagccagagc ttggaccggc tgatgaatcc tctgattgac cagtacctgt actacttgtc   1740
tcggactcaa acaacaggag gcacggcaaa tacgcagact ctgggcttca gccaaggtgg   1800
gcctaataca atggccaatc aggcaaagaa ctggctgcca ggaccctgtt accgccaaca   1860
acgcgtctca acgacaaccg ggcaaaacaa caatagcaac tttgcctgga ctgctgggac   1920
caaataccat ctgaatggaa gaaattcatt ggctaatcct ggcatcgcta tggcaacaca   1980
caaagacgac gaggagcgtt ttttcccag taacgggatc ctgattttg gcaaacaaaa    2040 tgctgccaga gacaatgcgg attacagcga tgtcatgctc accagcgagg aagaaatcaa   2100
aaccactaac cctgtggcta cagaggaata cggtatcgtg cagataact tgcagcagca     2160 aaacacggct cctcaaattg aactgtcaa cagccagggg gccttacccg tatggtctg      2220 gcagaaccgg gacgtgtacc tgcagggtcc catctgggcc aagattcctc acacggacgg   2280
caacttccac ccgtctccgc tgatgggcgg ctttggcctg aaacatcctc gcctcagat     2340 cctgatcaag aacacgcctg tacctgcgga tcctccgacc accttcaacc agtcaaagct   2400
gaactctttc atcacgcaat acagcaccgg acaggtcagc gtggaaattg aatgggagct   2460
gcagaaggaa aacagcaagc gctggaaccc cgagatccag tacacctcca actactacaa   2520
```

| atctacaagt gtggactttg ctgttaatac agaaggcgtg tactctgaac cccgcccat | 2580 |
| tggcacccgt tacctcaccc gtaatctgta a | 2611 |

<210> SEQ ID NO 34
<211> LENGTH: 2583
<212> TYPE: DNA
<213> ORGANISM: Artificial Sequence
<220> FEATURE:
<223> OTHER INFORMATION: Cap gene expression cassette

<400> SEQUENCE: 34

| gacctttaat tcaacccaac acaatatatt atagttaaat aagaattatt atcaaatcat | 60 |
| ttgtatatta attaaaatac tatactgtaa attacatttt atttacaatc actcgacgaa | 120 |
| gacttgatca cccggggggac aaggtaagta ttcattgtaa atctgatatt atttgtatta | 180 |
| ttatacctac ctaatttgca gtgcaggccg ccatggtaag tatcgataac tttgttttct | 240 |
| ttcacattta caactccgac atacaaattg taatttatt actgtttggt ccataaacac | 300 |
| ttgtttacca tttccttttt tacaagtttt aatatttct gcatatataa aacattattt | 360 |
| attttgcagg ctgccgacgg ttatctaccc gattggctcg aggacaacct ctctgagggc | 420 |
| attcgcgagt ggtgggcgct gaaacctgga gccccgaagc ccaaagccaa ccagcaaaag | 480 |
| caggacgacg gccggggtct ggtgcttcct ggctacaagt acctcggacc cttcaacgga | 540 |
| ctcgacaagg gggagcccgt caacgcggcg gacgcagcgg ccctcgagca cgacaaggcc | 600 |
| tacgaccagc agctgcaggc gggtgacaat ccgtacctgc ggtataacca cgccgacgcc | 660 |
| gagtttcagg agcgtctgca agaagatacg tcttttgggg gcaacctcgg gcgagcagtc | 720 |
| ttccaggcca agaagcgggt tctcgaacct ctcggtctgg ttgaggaagg cgctaagacg | 780 |
| gctcctggaa agaagagacc ggtagagcca tcaccccagc gttctccaga ctcctctacg | 840 |
| ggcatcggca agaaaggcca acagcccgcc agaaaaagac tcaattttgg tcagactggc | 900 |
| gactcagagt cagttccaga ccctcaacct ctcggagaac ctccagcagc gccctctggt | 960 |
| gtgggaccta atacaatggc tgcaggcggt ggcgcaccaa tggcagacaa taacgaaggc | 1020 |
| gccgacggag tgggtagttc ctcgggaaat tggcattgcg attccacatg gctgggcgac | 1080 |
| agagtcatca ccaccagcac ccgaacctgg gccctgccca cctacaacaa ccacctctac | 1140 |
| aagcaaatct ccaacgggac atcggagga gccaccaacg acaacaccta cttcggctac | 1200 |
| agcaccccct gggggtattt tgactttaac agattccact gccacttttc accacgtgac | 1260 |
| tggcagcgac tcatcaacaa caactgggga ttccggccca agagactcag cttcaagctc | 1320 |
| ttcaacatcc aggtcaagga ggtcacgcag aatgaaggca ccaagaccat cgccaataac | 1380 |
| ctcaccagca ccatccaggt gtttacggac tcggagtacc agctgccgta cgttctcggc | 1440 |
| tctgcccacc agggctgcct gcctccgttc ccggcggacg tgttcatgat tccccagtac | 1500 |
| ggctacctaa cactcaacaa cggtagtcag gccgtgggac gctcctcctt ctactgcctg | 1560 |
| gaatactttc cttcgcagat gctgagaacc ggcaacaact tccagtttac ttacaccttc | 1620 |
| gaggacgtgc ctttccacag cagctacgcc cacagccaga gcttggaccg gctgatgaat | 1680 |
| cctctgattg accagtacct gtactacttg tctcggactc aaacaacagg aggcacggca | 1740 |
| aatacgcaga ctctgggctt cagccaaggt gggcctaata caatggccaa tcaggcaaag | 1800 |
| aactggctgc caggaccctg ttaccgccaa caacgcgtct caacgacaac cgggcaaaac | 1860 |
| aacaatagca actttgcctg gactgctggg accaaatacc atctgaatgg aagaaattca | 1920 |

| | |
|---|---:|
| ttggctaatc ctggcatcgc tatggcaaca cacaaagacg acgaggagcg ttttttttccc | 1980 |
| agtaacggga tcctgatttt tggcaaacaa aatgctgcca gagacaatgc ggattacagc | 2040 |
| gatgtcatgc tcaccagcga ggaagaaatc aaaaccacta accctgtggc tacagaggaa | 2100 |
| tacggtatcg tggcagataa cttgcagcag caaaacacgg ctcctcaaat tggaactgtc | 2160 |
| aacagccagg gggccttacc cggtatggtc tggcagaacc gggacgtgta cctgcagggt | 2220 |
| cccatctggg ccaagattcc tcacacggac ggcaacttcc accgtctccc gctgatgggc | 2280 |
| ggctttggcc tgaaacatcc tccgcctcag atcctgatca agaacacgcc tgtacctgcg | 2340 |
| gatcctccga ccaccttcaa ccagtcaaag ctgaactctt tcatcacgca atacagcacc | 2400 |
| ggacaggtca gcgtggaaat tgaatgggag ctgcagaagg aaaacagcaa gcgctggaac | 2460 |
| cccgagatcc agtacacctc caactactac aaatctacaa gtgtggactt tgctgttaat | 2520 |
| acagaaggcg tgtactctga accccgcccc attggcaccc gttacctcac ccgtaatctg | 2580 |
| taa | 2583 |

<210> SEQ ID NO 35
<211> LENGTH: 2457
<212> TYPE: DNA
<213> ORGANISM: Artificial Sequence
<220> FEATURE:
<223> OTHER INFORMATION: Cap gene expression cassette

<400> SEQUENCE: 35

| | |
|---|---:|
| gacctttaat tcaacccaac acaatatatt atagttaaat aagaattatt atcaaatcat | 60 |
| ttgtatatta attaaaatac tatactgtaa attcactttt atttacaatc actcgacgaa | 120 |
| gacttgatca cccgggtcag gtagtaagta tcgataactt tgttttcttt cacatttaca | 180 |
| actccgacat acaaatccca ttacggcagt ataaattcgt tcattttgga tattgtttca | 240 |
| gtggctgccg acggttatct acccgattgg ctcgaggaca acctctctga gggcattcgc | 300 |
| gagtggtggg cgctgaaacc tggagccccg aagcccaaag ccaaccagca aaagcaggac | 360 |
| gacggccggg gtctggtgct tcctggctac aagtacctcg gacccttcaa cggactcgac | 420 |
| aaggggggagc ccgtcaacgc ggcggacgca gcggcccctcg agcacgacaa ggcctacgac | 480 |
| cagcagctgc aggcgggtga caatccgtac ctgcggtata accacgccga cgccgagttt | 540 |
| caggagcgtc tgcaagaaga tacgtctttt ggggggcaacc tcgggcgagc agtcttccag | 600 |
| gccaagaagc gggttctcga acctctcggt ctggttgagg aaggcgctaa gacggctcct | 660 |
| ggaaagaaga gaccggtaga gccatcaccc cagcgttctc cagactcctc tacgggcatc | 720 |
| ggcaagaaag gccaacagcc cgccagaaaa agactcaatt ttggtcagac tggcgactca | 780 |
| gagtcagttc cagaccctca acctctcgga gaacctccag cagcgccctc tggtgtggga | 840 |
| cctaatacaa tggctgcagg cggtggcgca ccaatggcag acaataacga aggcgccgac | 900 |
| ggagtgggta gttcctcggg aaattggcat tgcgattcca catggctggg cgacagagtc | 960 |
| atcaccacca gcacccgaac ctgggccctg cccacctaca acaaccacct ctacaagcaa | 1020 |
| atctccaacg gacatcggg aggagccacc aacgacaaca cctacttcgg ctacagcacc | 1080 |
| ccctgggggt atttgacttt aacagattc cactgccact tttcaccacg tgactggcag | 1140 |
| cgactcatca acaacaactg gggattccgg cccaagagac tcagcttcaa gctcttcaac | 1200 |
| atccaggtca aggaggtcac gcagaatgaa ggcaccaaga ccatcgccaa taacctcacc | 1260 |
| agcaccatcc aggtgtttac ggactcggag taccagctgc cgtacgttct cggctctgcc | 1320 |
| caccagggct gcctgcctcc gttcccggcg gacgtgttca tgattcccca gtacggctac | 1380 |

```
ctaacactca acaacggtag tcaggccgtg ggacgctcct ccttctactg cctggaatac    1440
tttccttcgc agatgctgag aaccggcaac aacttccagt ttacttacac cttcgaggac    1500 gtgccttttcc acagcagcta cgcccacagc cagagcttgg accggctgat gaatcctctg    1560
attgaccagt acctgtacta cttgtctcgg actcaaacaa caggaggcac ggcaaatacg    1620
cagactctgg gcttcagcca aggtgggcct aatacaatgg ccaatcaggc aaagaactgg    1680
ctgccaggac cctgttaccg ccaacaacgc gtctcaacga caaccgggca aaacaacaat    1740
agcaactttg cctggactgc tgggaccaaa taccatctga atggaagaaa ttcattggct    1800
aatcctggca tcgctatggc aacacacaaa gacgacgagg agcgtttttt tcccagtaac    1860
gggatcctga ttttttggcaa acaaaatgct gccagagaca atgcggatta cagcgatgtc    1920
atgctcacca gcgaggaaga aatcaaaacc actaaccctg tggctacaga ggaatacggt    1980
atcgtggcag ataacttgca gcagcaaaac acggctcctc aaattggaac tgtcaacagc    2040 caggggggcct acccggtat ggtctggcag aaccgggacg tgtacctgca gggtcccatc    2100
tgggccaaga ttcctcacac ggacggcaac ttccacccgt ctccgctgat gggcggcttt    2160
ggcctgaaac atcctccgcc tcagatcctg atcaagaaca cgcctgtacc tgcggatcct    2220
ccgaccacct tcaaccagtc aaagctgaac tctttcatca cgcaatacag caccggacag    2280
gtcagcgtgg aaattgaatg ggagctgcag aaggaaaaca gcaagcgctg gaaccccgag    2340
atccagtaca cctccaacta ctacaaatct acaagtgtgg actttgctgt taatacagaa    2400
ggcgtgtact ctgaaccccg ccccattggc acccgttacc tcacccgtaa tctgtaa       2457
```

<210> SEQ ID NO 36
<211> LENGTH: 18
<212> TYPE: PRT
<213> ORGANISM: Thosea asigna virus

<400> SEQUENCE: 36

Glu Gly Arg Gly Ser Leu Leu Thr Cys Gly Asp Val Glu Glu Asn Pro
1               5                   10                  15

Gly Pro

<210> SEQ ID NO 37
<211> LENGTH: 19
<212> TYPE: PRT
<213> ORGANISM: Porcine teschovirus

<400> SEQUENCE: 37

Ala Thr Asn Phe Ser Leu Leu Lys Gln Ala Gly Asp Val Glu Glu Asn
1               5                   10                  15

Pro Gly Pro

<210> SEQ ID NO 38
<211> LENGTH: 20
<212> TYPE: PRT
<213> ORGANISM: Equine rhinitis A virus

<400> SEQUENCE: 38

Gln Cys Thr Asn Tyr Ala Leu Leu Lys Leu Ala Gly Asp Val Glu Ser
1               5                   10                  15

Asn Pro Gly Pro
            20

<210> SEQ ID NO 39

```
<211> LENGTH: 22
<212> TYPE: PRT
<213> ORGANISM: Foot-and-mouth disease virus

<400> SEQUENCE: 39

Val Lys Gln Thr Leu Asn Phe Asp Leu Leu Lys Leu Ala Gly Asp Val
1               5                   10                  15

Glu Ser Asn Pro Gly Pro
            20
```

EXPRESSION CASSETTE FOR EXPRESSING GENE COMPRISING OVERLAPPING OPEN READING FRAMES IN INSECT CELL AND APPLICATION THEREOF

CROSS-REFERENCE TO RELATED APPLICATION

This application is a 371 of international application of PCT application serial no. PCT/CN2021/120828, filed on Sep. 27, 2021, which claims the priority benefit of China application no. 202111105263.5, filed on Sep. 18, 2021. The entirety of each of the above mentioned patent applications is hereby incorporated by reference herein and made a part of this specification.

TECHNICAL FIELD

The disclosure relates to the technical field of genetic engineering, and more particularly relates to an expression cassette for expressing a gene including overlapping open reading frames in an insect cell and an application thereof.

DESCRIPTION OF RELATED ART

The adeno-associated virus (AAV) belongs to the Parvoviridae family in the Dependovirus genus, is the simplest single-stranded DNA virus found so far, and requires a helper virus (usually adenovirus) to participate in replication. The recombinant adeno-associated virus (rAAV) is currently one of the most promising vectors in the field of gene therapy due to characteristics such as wide host range, low immunogenicity, high safety, and long-term stable expression of exogenous genes in animals. With the approval of the first recombinant adeno-associated virus (rAAV)-mediated gene therapy drug, the demand for large-scale manufacturing technology of AAV vectors is increasing (Yla-Herttuala S., 2012, Mol Ther, 20:1831-1832).

At present, there are two main rAAV production systems: one is a conventional production system using mammalian cells (such as 293 cells, COS cells, HeLa cells, and KB cells); and the other one is a production system using insect cells. In the mammalian cell production system, the yield of rAAV particles from a single cell is low, and there is a high risk of contamination in culture, which limits the large-scale production and application of rAAV in the mammalian cells. The cap gene in the recombinant adeno-associated virus genome encodes a viral VP capsid protein, which includes three structural proteins, respectively being VP1, VP2, and VP3. The stoichiometric ratio of VP1, VP2, and VP3 in AAV from a wild-type virus is about 1:1:10, such a stoichiometric ratio is important for the acquisition of recombinant AAV. In a mammalian cell culture system, a stoichiometric ratio of the three AAV capsid proteins of approximately 1:1:10 (VP1, VP2, and VP3) is obtained, which relies on the alternate use of two splicing acceptor sequences in the mammalian cell intron and the use of a suboptimal start codon ACG for VP2. However, due to differences in intron splicing mechanisms in the mammalian cell and the insect cell, expression strategies that emerge in the mammalian cell do not replicate in the insect cell, thereby resulting in the inability of wild-type AAV to package into an appropriate capsid in the insect cell.

In order to overcome the above issue, Urabe et al. developed an insect cell production system by replacing the start codon AUG of VP1 with the suboptimal start codon ACG to construct a single polycistronic mRNA. The polycistronic mRNA may express all three AAV2 VP proteins without splicing (Urabe et al., 2002, Hum Gene Ther, 13: 1935-1943). However, the serotypes of AAV are numerous and increasing day by day, and the transformation method by Urabe et al. is not applicable to all serotypes. For example, AAV5 particles produced in a baculovirus system using ACG as the start codon of the VP1 capsid protein by Urabe et al. has poor infectivity. In the method provided by Chinese patent CN 106544325 A, a different suboptimal start codon CTG is used to enhance the expression of VP1. Although such design improves the infectivity of AAV5 particles, the method lacks flexibility in regulating the relative content of VP1/VP2/VP3. At the same time, the method also appears to lack flexibility necessary for adjusting a serotype-specific sequence. In the method provided by Chinese patent CN 101522903 A, an artificial intron including a polh promoter sequence is inserted into the open reading frame of VP1, and two promoters are used to respectively express VP1 and VP2/VP3. Although such design can also implement the expression of VP1/VP2/VP3 in the same reading frame, the method also cannot effectively regulate the relative amounts of VP1/VP2/VP3, and the relative expression levels of VP1/VP2/VP3 vary greatly in different serotypes, resulting in low production efficiency.

In an AAV insect cell production system, Urabe et al. constructed two independent expression cassettes, Rep78 and Rep52, which are inserted into the same baculovirus vector. Since the low expression of Rep78 is beneficial to the packaging of AAV, Rep52 uses a polh promoter, and Rep78 uses an ΔIE1 promoter that is less active than the polh promoter (Urabe et al., 2002, Hum Gene Ther, 13: 1935-1943). However, some studies have found that the AAV Rep protein expression method developed by Urabe et al. has the issue of unstable baculovirus vector passage. In order to solve the issue, Chinese patent CN 103849629 A discloses a method for producing AAV in an insect cell, which replaces the translation start codon of AAV Rep78 protein with ACG. Although such method can implement the expression of Rep78 and Rep52 proteins in the same reading frame, the method lacks the regulating function on the relative expression of the Rep78 and Rep52 proteins.

Therefore, it is very necessary to develop means and methods for the stable and large-scale production of the recombinant adeno-associated virus in the insect cell.

SUMMARY

In view of the defects of the prior art, the objective of the disclosure is to provide an expression cassette for expressing a gene including overlapping open reading frames in an insect cell and an application thereof. The disclosure selectively retains, deletes, or forms a translation start codon AUG of a VP1 protein encoding sequence during a post-transcriptional processing process by using the regulating function of intron alternative splicing to implement correct stoichiometric expression of VP proteins (VP1/VP2/VP3) in the overlapping open reading frames of a cap gene in the insect cell. Similarly, by using the regulating function of intron alternative splicing, the translation start codon AUG of a Rep78 protein encoding sequence may be selectively retained, deleted, or formed during the post-transcriptional processing process to implement the expression of Rep proteins (Rep78/Rep52) in an appropriate ratio in the overlapping open reading frames of a rep gene in the insect cells. The disclosure aims to solve the issue of stable and large-scale production of recombinant adeno-associated viruses of various serotypes with high packaging efficiency and infectious activity in the insect cell.

In order to achieve the above objective, the disclosure provides an expression cassette for expressing a gene including overlapping open reading frames in an insect cell, which includes from 5' to 3' and operably linked:
a promoter capable of driving transcription in the insect cell;
an artificially constructed sequence;
the overlapping open reading frames missing only a first translation start codon;
wherein the artificially constructed sequence includes a native or engineered intron with splicing activity in the insect cell, the intron includes a translation start codon ATG or the intron is located between any two adjacent nucleotides in ATG;
during a post-transcriptional processing process, through an alternative splicing function of the intron, a translation start codon AUG in the artificially constructed sequence is retained or deleted or a translation start codon AUG is formed in the artificially constructed sequence, thereby implementing regulation of translation and expression of different protein encoding genes in the overlapping open reading frames.

Preferably, the artificially constructed sequence includes from 5' to 3' and operably linked:
a 5' part of the intron;
a translation start codon ATG;
a 3' part of the intron;
a nucleotide sequence encoding a 2A self-cleaving polypeptide.

Preferably, the 2A self-cleaving polypeptide is a T2A peptide, a P2A peptide, an E2A peptide, or an F2A peptide.

Preferably, the artificially constructed sequence includes from 5' to 3' and operably linked:
a 5' part of a first intron;
a translation start codon ATG;
a 5' part of a second intron;
a 3' part of the intron;
wherein there is a stop codon inside the 5' part of the second intron, and a number of nucleotides between the stop codon and the translation start codon ATG is a multiple of 3.

Preferably, a 5'-terminal nucleotide of the intron is GTNN, and a 3'-terminal nucleotide of the intron is NNAG, wherein N is any one of four nucleotides A, T, C, and G.

Preferably, the gene including the overlapping open reading frames is a cap gene of AAV or a rep gene of AAV.

Preferably, the promoter is a polh promoter or a p10 promoter.

Preferably, the gene including the overlapping open reading frames is the cap gene of AAV, and the promoter is the p10 promoter.

Preferably, the gene including the overlapping open reading frames is the rep gene of AAV, and the promoter is the polh promoter.

According to another aspect of the disclosure, there is provided a nucleic acid molecule, which includes a first expression cassette. The first expression cassette is the expression cassette.

Preferably, the nucleic acid molecule further includes a second expression cassette.

The second expression cassette is the expression cassette, and a gene expressed by the second expression cassette is different from a gene expressed by the first expression cassette.

Preferably, the second expression cassette is in an antisense orientation with respect to the first expression cassette.

Preferably, the second expression cassette is in a sense orientation with respect to the first expression cassette.

Preferably, the nucleic acid molecule further includes an exogenous gene and an AAV inverted terminal repeat sequence located at two terminals of the exogenous gene.

Preferably, the exogenous gene is a reporter gene. The reporter gene is at least one of a chloramphenicol acetyltransferase encoding gene, a β-galactosidase encoding gene, a β-glucuronidase encoding gene, a Renilla luciferase encoding gene, an alkaline phosphatase encoding gene, a firefly luciferase encoding gene, a green fluorescent protein encoding gene, and a red fluorescent protein encoding gene.

Preferably, the exogenous gene is a gene encoding a drug polypeptide. The drug polypeptide is at least one of lipoprotein esterase, apolipoprotein, cytokine, interleukin, and interferon.

According to another aspect of the disclosure, there is provided a vector, which includes the expression cassette.

Preferably, the vector is an insect cytocompatible vector.

Preferably, the vector is at least one of a plasmid and a virus.

According to another aspect of the disclosure, there is provided an application of the vector for preparing a recombinant adeno-associated virus in an insect cell.

According to another aspect of the disclosure, there is provided an application of the vector for preparing an AAV capsid in vitro, and the gene including the overlapping open reading frames is the cap gene of AAV.

According to another aspect of the disclosure, there is provided an insect cell, which includes the expression cassette.

Preferably, the expression cassette is integrated into a genome of the insect cell.

Preferably, the insect cell is a *Spodoptera frugiperda* cell, a *Trichoderma* cell, a *Drosophila* cell, or a mosquito cell.

According to another aspect of the disclosure, there is provided a cell culture, which includes the insect cell and a culture medium.

Preferably, the culture medium includes an AAV genome.

According to another aspect of the disclosure, there is provided a recombinant adeno-associated virion, which is obtained by culturing the insect cell under conditions capable of producing the recombinant adeno-associated virion, and then recovering.

In general, compared with the prior art, the above technical solutions conceived by the disclosure have the following beneficial effects:

(1) The expression cassette of the disclosure may be used to express various polypeptides, such as the VP proteins (VP1, VP2, VP3) and the Rep proteins (Rep78, Rep52) of the recombinant adeno-associated virus, encoded by the gene including the overlapping open reading frames in the insect cell without changing the original start codon ATG of the VP1 protein encoding sequence or the Rep78 protein encoding sequence in wild-type AAV. Through artificially designing the intron sequence, the VP proteins (VP1, VP2, VP3) or the Rep proteins (Rep78, Rep52) are regulated to be expressed in an appropriate ratio to achieve stable and large-scale production of the recombinant adeno-associated virus in the insect cell. The disclosure is different from Chinese patent CN 101522903 A that inserts the insect cell intron downstream of the translation start codon in the open reading frame of the VP1 protein, inserts the promoter in the intron, and respectively transcribes and translates the VP1, VP2/VP3, Rep78, and Rep52 proteins using four promoters (two p10 and two polh promoters). The intron alternative splicing regulation strategy provided by the disclosure selectively splices the transcribed mRNA by using the splicing function of the intron to obtain two or more mRNAs in an appropriate ratio, which are respectively translated into the VP1 and VP2/VP3, Rep78 and Rep52 proteins. The method provided by the disclosure can more effectively control the stoichiometric ratio of the VP1, VP2, and VP3 proteins and the relative expression of Rep78/Rep52.

(2) In the disclosure, the intron alternative splicing strategy is used to implement the production of the recombinant adeno-associated virus in the insect cell and is suitable for various AAV serotypes, so that the preparation of rAAV is more flexible and there is a wider application range.

(3) In the disclosure, the cap gene and the rep gene of AAV and the ITR core expression element with the exogenous gene are constructed in the same recombinant baculovirus vector. The vector is used to transfect an insect host cell, which can stably produce the recombinant AAV virion in high yield. Also, through adjusting the intron sequence in the expression cassette of the cap gene, the relative expression levels of VP1 and VP2/VP3 may be adjusted to obtain virions with different VP1 incorporation amounts, thereby regulating the infectious activity of the rAAV virus to meet different requirements.

DETAILED DESCRIPTION OF DISCLOSED EMBODIMENTS

Figure 1:
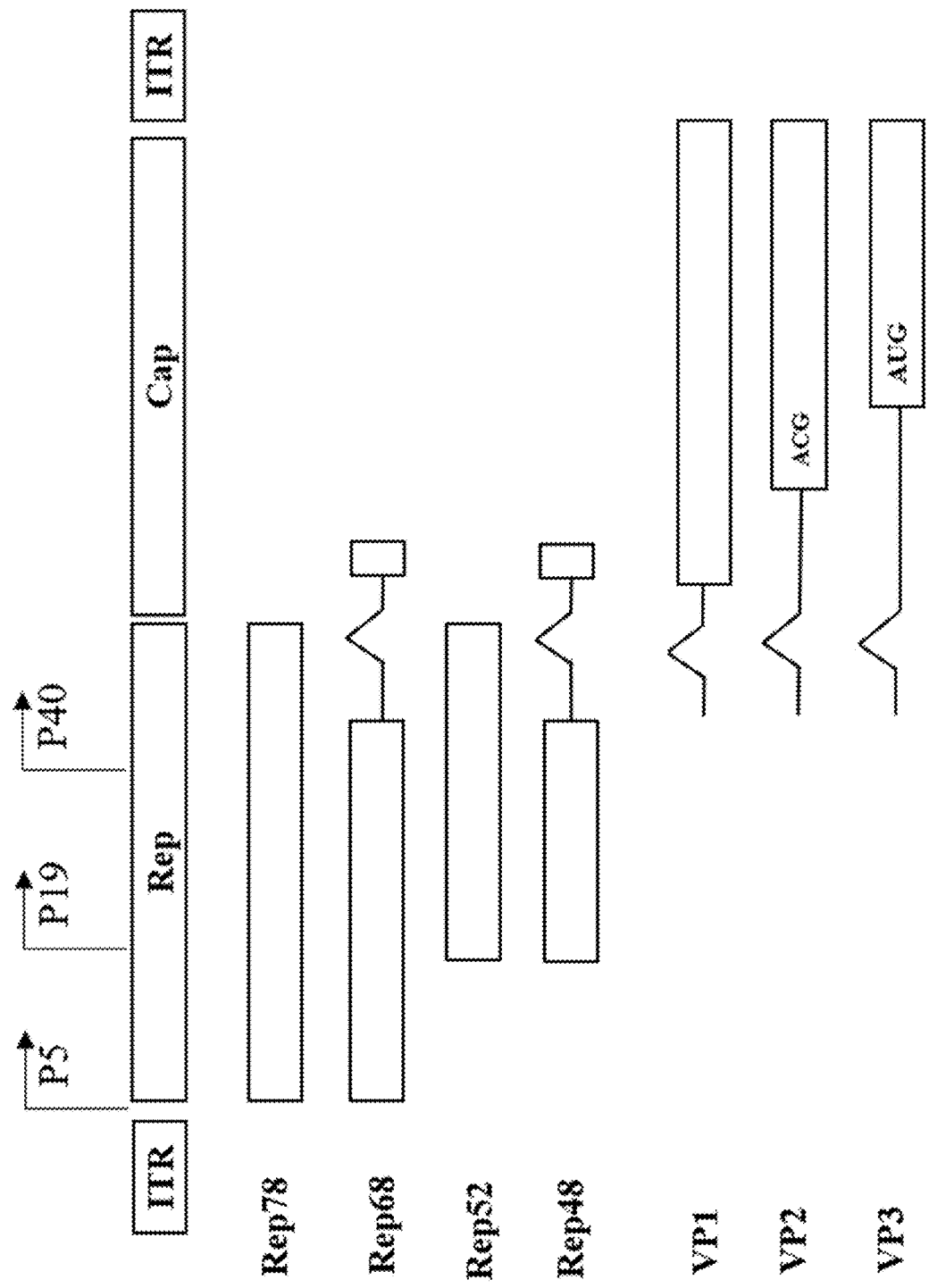
FIG. 1 is a schematic diagram of expression regulation of a cap gene and a rep gene in wild-type AAV of the disclosure.

In order for the objectives, technical solutions, and advantages of the disclosure to be clearer, the disclosure will be further described in detail below with reference to the drawings and the embodiments. It should be understood that the specific embodiments described herein are only used to explain the disclosure, but not to limit the disclosure.

Terminology Explanation

As used herein, the term "operably linked" refers to the linkage of polynucleotide (or polypeptide) sequences in a functional relationship. Two nucleotide sequences are "operably linked" when the two nucleotide sequences are placed in a functional relationship. For example, a transcriptional regulatory sequence (for example, a promoter) is operably linked to a gene encoding sequence if the transcriptional regulatory sequence affects the transcription of the gene encoding sequence.

The term "expression cassette" refers to a nucleic acid construct including an operably linked encoding sequence and regulatory sequence when introduced into a host cell, which respectively cause transcription and/or translation of an RNA or a polypeptide. The expression cassette is understood to include a promoter that allows transcription to start, an open reading frame for a target gene, and a transcription terminator. Typically, a promoter sequence is placed upstream of the target gene at a distance compatible with expression control of the target gene.

The term "open reading frame" (ORF) is a normal nucleotide sequence of a structural gene that has the potential to encode a protein or a polypeptide and has no stop codon to interrupt translation starting with a start codon and ending with a stop codon. On an mRNA strand, a ribosome starts to translate from the start codon, synthesizes a polypeptide strand along a mRNA sequence and continues until the stop codon is encountered, and the elongation reaction of the polypeptide strand is stopped.

The term "vector" refers to a nucleic acid molecule, such as a plasmid vector, a cosmid vector, an artificial chromosome, a phage vector, and other viral vectors designed to transport, transfer, and/or store a genetic material, and express the genetic material and/or integrate the genetic material into a chromosomal DNA of a host cell. The vector usually consists of at least three basic units, that is, a replication origin, a selectable marker, and a multiple cloning site.

The term "intron", also known as a spacer sequence, refers to a segment without an encoding function in a gene or an mRNA molecule, which is an intervening sequence in a eukaryotic cell DNA. An intron sequence is transcribed in an mRNA precursor, removed by splicing, and ultimately absent from a mature mRNA molecule. According to whether the splicing process is spontaneous or processed by a spliceosome, the intron is divided into a self-splicing intron and a spliceosome intron. The self-splicing intron is a special type of intron and is a ribozyme that may be excised by its own function to leave the mRNA. The intron involved in the disclosure is the spliceosome intron. The splicing of such intron requires the help of a spliceosome. There are a splicing donor sequence and a splicing acceptor sequence at two terminals of the intron sequence, which are sequences on two sides of severing and rejoining sites. The spliceosome is a ribonucleoprotein complex dynamically composed of a small nuclear RNA (snRNA) and a protein factor. The spliceosome recognizes a splicing site of the mRNA precursor and catalyzes a splicing reaction, completely splices the intron, and then reconnects upstream and downstream RNA sequences.

The term "AAV serotype": since the discovery of AAV, more than 100 AAV serotypes or mutants have been isolated from adenoviruses, humans, primates, and some mammals, of which AAV1-9 is mainly applied. The main difference between rAAV vectors of different serotypes is differences in capsid proteins. Different AAV serotypes have certain differences in infection efficiency and tissue specificity.

The genome structures of all known adeno-associated virus serotypes are very similar. AAV is a single-stranded DNA virus with a simple genome structure and a full length of about 4.7 kb. As shown in FIG. 1, a genome includes an expression cassette of a rep gene, an expression cassette of a cap gene, and an AAV inverted terminal repeat (ITR) sequence located at two terminals of the genome. ITR is a palindromic structure of 125 nucleotides at the two terminals of the genome, which can form a self-complementary inverted T hairpin structure and is a cis-acting element required for the start of DNA replication and the packaging of a recombinant AAV genome into an infectious virion. As a defective virus, AAV cannot replicate independently in the absence of a helper virus, so AAV can only be integrated into a chromosome of a host cell at a specific point and is in a latent state. In the presence of the helper virus, the increased expression level of the rep gene may rescue the AAV genome integrated in the chromosome of the host cell, which is massively replicated to obtain AAV DNA. A single-stranded rAAV genome is packaged into the infectious virion under the function of a VP capsid protein. The cap gene encodes a structural VP capsid protein, which includes 3 overlapping open reading frames, respectively encoding three subunits, VP1, VP2, and VP3. VP1, VP2, and VP3 include different start codons and share one stop codon, and VP1 and VP2 share a VP3 sequence. An N-terminal of VP1 has a conserved phospholipase A2 sequence. The sequence is related to the escape of a virus from a body and is critical for infectivity. The VP2 protein is not essential for assembly or infection. A core of the VP3 protein consists of a conserved 3-barrel motif, which determines differences in receptors that different serotypes of AAV interact with the host cell. The correct ratio of the three proteins in wild-type AAV is 3:3:54, which is approximately 1:1:10. The rep gene encodes four overlapping multifunctional proteins Rep78, Rep68, Rep52, and Rep40. The Rep78 and Rep68 proteins participate in the replication and integration of AAV and may be combined with a specific sequence in the ITR. The Rep52 and Rep40 proteins have helicase and ATPase activities, and participate in the assembly of a virus while participating in the replication of a single-stranded genome. Whether in a mammalian cell or an insect cell, unspliced mRNA encoding the Rep78 and Rep52 proteins is sufficient for the requirements for preparing rAAV.

The nucleic acid molecule mentioned in the disclosure may be a DNA molecule or an RNA molecule. It is known to persons skilled in the art that an RNA sequence is substantially similar to or has a certain degree of sequence identity with a DNA sequence, and thymine (T) in the DNA sequence may be considered equivalent to uracil (U) in the RNA sequence.

The intron mentioned in the disclosure may be a native intron or an engineered intron and has splicing activity in the insect cell, but the source is not limited to the insect cell.

An expression cassette for expressing a gene including overlapping open reading frames in an insect cell provided by the disclosure includes from 5' to 3' and operably linked:
 a promoter capable of driving transcription in the insect cell;
 an artificially constructed sequence;
 the overlapping open reading frames missing only a first translation start codon;
 wherein the artificially constructed sequence includes a native or engineered intron with splicing activity in the insect cell, the intron includes a translation start codon ATG or the intron is located between any two adjacent nucleotides in ATG;
 during a post-transcriptional processing process, through an alternative splicing function of the intron, a translation start codon AUG in the artificially constructed sequence is retained or deleted or a translation start codon AUG is formed in the artificially constructed sequence, thereby implementing regulation of translation and expression of different protein encoding genes in the overlapping open reading frames.

In some embodiments, by using the alternative splicing function of the intron, the expression cassette including the intron may be used for correct expression of a AAV VP capsid protein or predominant expression of a Rep protein in the insect cell, wherein the overlapping open reading frames in the cap gene encode AAV capsid proteins VP1, VP2, and VP3, and the overlapping open reading frames in the rep gene encode Rep78 and Rep52 proteins.

In some embodiments, by using the alternative splicing function of the intron, the expression cassette including the intron may be used to express VP capsid proteins of various simian viruses 40 (SV40) in the insect cell. SV40 is a double-stranded DNA virus with a 5.2 kb covalently closed circular genome, which also includes three capsid proteins VP1, VP2, and VP3. The VP3 protein is a truncated form of the VP2 protein, and VP3 and VP2 share a stop codon. A 5' part of a VP1 encoding sequence overlaps with a 3' part of VP2 and VP3 encoding sequences, but does not have the same open reading frame. In the mammalian cell, the expression of the VP proteins is regulated by an intron splicing mechanism. When the expression cassette of the disclosure is used to express the SV40 capsid protein in the insect cell, ORF that only lacks the first translation start codon in the expression cassette is a VP protein encoding sequence that only lacks the translation start codon ATG of the VP2 protein. The regulation of relative expression of the VP2 and VP3 proteins can be implemented by using the intron splicing strategy of the disclosure.

In some embodiments, the gene including the overlapping open reading frames is a cap gene of AAV, the overlapping open reading frames that only lack the first translation start codon is a VP protein encoding sequence that only lacks a translation start codon ATG of a VP1 protein, and the artificially constructed sequence includes from 5' to 3' and operably linked:
 a 5' part of the intron;
 a translation start codon ATG;
 a 3' part of the intron;
 a nucleotide sequence encoding a 2A self-cleaving polypeptide.

Figure 2:
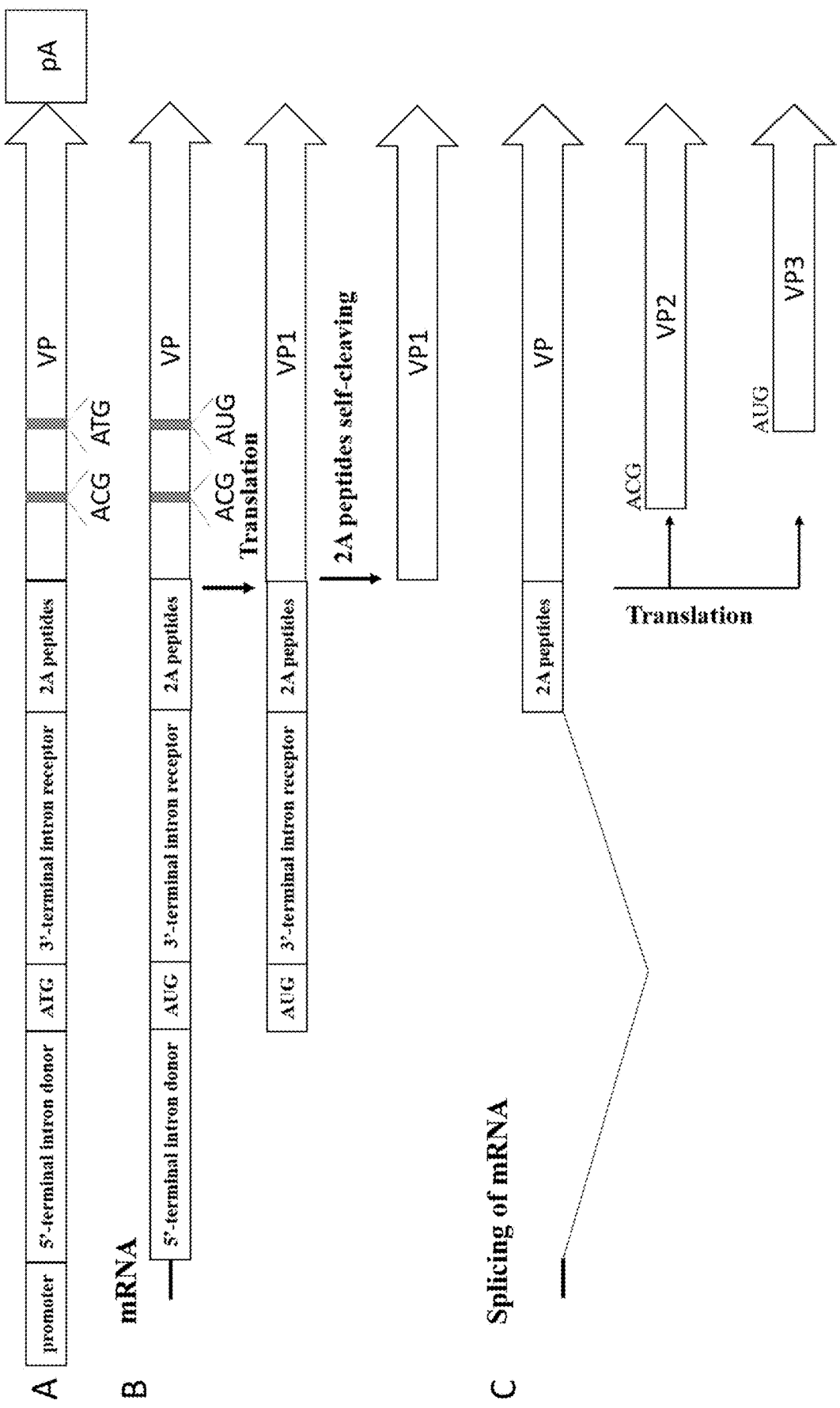
FIG. 2 is a schematic diagram of expression regulation of an expression cassette I of a cap gene in Example 1 of the disclosure, wherein content A is a schematic diagram of a DNA strand of the expression cassette I of the cap gene; content B is a schematic diagram of translation and expression of a VP1 protein when an intron including a first start codon AUG is not spliced during a post-transcriptional processing process; content C is a schematic diagram of translation and expression of VP2 and VP3 proteins after the intron including the first start codon AUG is spliced during the post-transcriptional processing process.

The disclosure mutates an intron splicing site at an N-terminal of the VP1 protein encoding sequence of wild-type AAV, so that a spliceosome in the insect cell cannot recognize the splicing site. The 5' part (a splicing donor sequence or a splicing acceptor sequence) of the intron upstream of the start codon ATG and the 3' part (a splicing acceptor sequence or a splicing donor sequence) of the intron downstream of the ATG form a complete intron splicing site, as shown in FIG. 2. During the post-transcriptional processing process, if the spliceosome in the insect cell recognizes the intron splicing site and catalyzes a splicing reaction, an AUG-start site at the front end of the mRNA is removed. When a ribosome recognizes the start codon of the VP2 protein from 5' to 3', the VP2 protein can be translated and expressed. Since the VP2 start codon is a suboptimal codon ACG, it will cause the leakage of ribosome scanning, so the VP3 protein can be translated and expressed. If the intron splicing site is not recognized and the AUG-start site is not removed, the mRNA is translated from the first AUG and the VP1 protein is expressed. The relative expression levels of the capsid proteins VP1, VP2, and VP3 are controlled through the splicing function with a certain probability of the intron. However, when the VP1 protein is translated and expressed, an additional sequence (that is, a part of the intron sequence) from the first AUG start codon of the mRNA to the N-terminal of the VP1 protein sequence is also translated, which affects the normal expression of the VP1 protein. Therefore, an encoding sequence of a 2A self-cleaving polypeptide is introduced into the expression cassette provided by the disclosure.

The 2A self-cleaving polypeptide is a type of peptide fragment with 18-22 amino acid residues in length, which can induce self-cleavage of a recombinant protein including a 2A peptide in the cell. The peptide has a sequence motif, which often causes the ribosome to fail to connect at the final junction between glycine (G) and proline (P), thereby causing a "cleavage" effect, so that a C-terminal of the 2A self-cleaving polypeptide is disconnected from the N-terminal of the VP1 protein to obtain the normal VP1 protein. According to different virus sources, there are currently four commonly used 2A peptides: T2A, P2A, E2A, and F2A, and the amino acid sequences thereof are respectively shown in SEQ ID No.36 to SEQ ID No.39. The four 2A peptides may all be applied to the technical solution of the disclosure, and the embodiment of the disclosure takes T2A as an example.

In some embodiments, the gene including the overlapping open reading frames is the cap gene of AAV, the overlapping open reading frames that only lack the first translation start codon is the VP protein encoding sequence that only lacks the translation start codon ATG of the VP1 protein, and the artificially constructed sequence includes from 5' to 3' and operably linked:
 a 5' part of a first intron;
 a translation start codon ATG;
 a 5' part of a second intron;
 a 3' part of the intron;

wherein there is a stop codon in the 5' part of the second intron, the stop codon may be TAA, TAG, or TGA, and the number of nucleotides between the stop codon and the translation start codon ATG is a multiple of 3.

Figure 3:
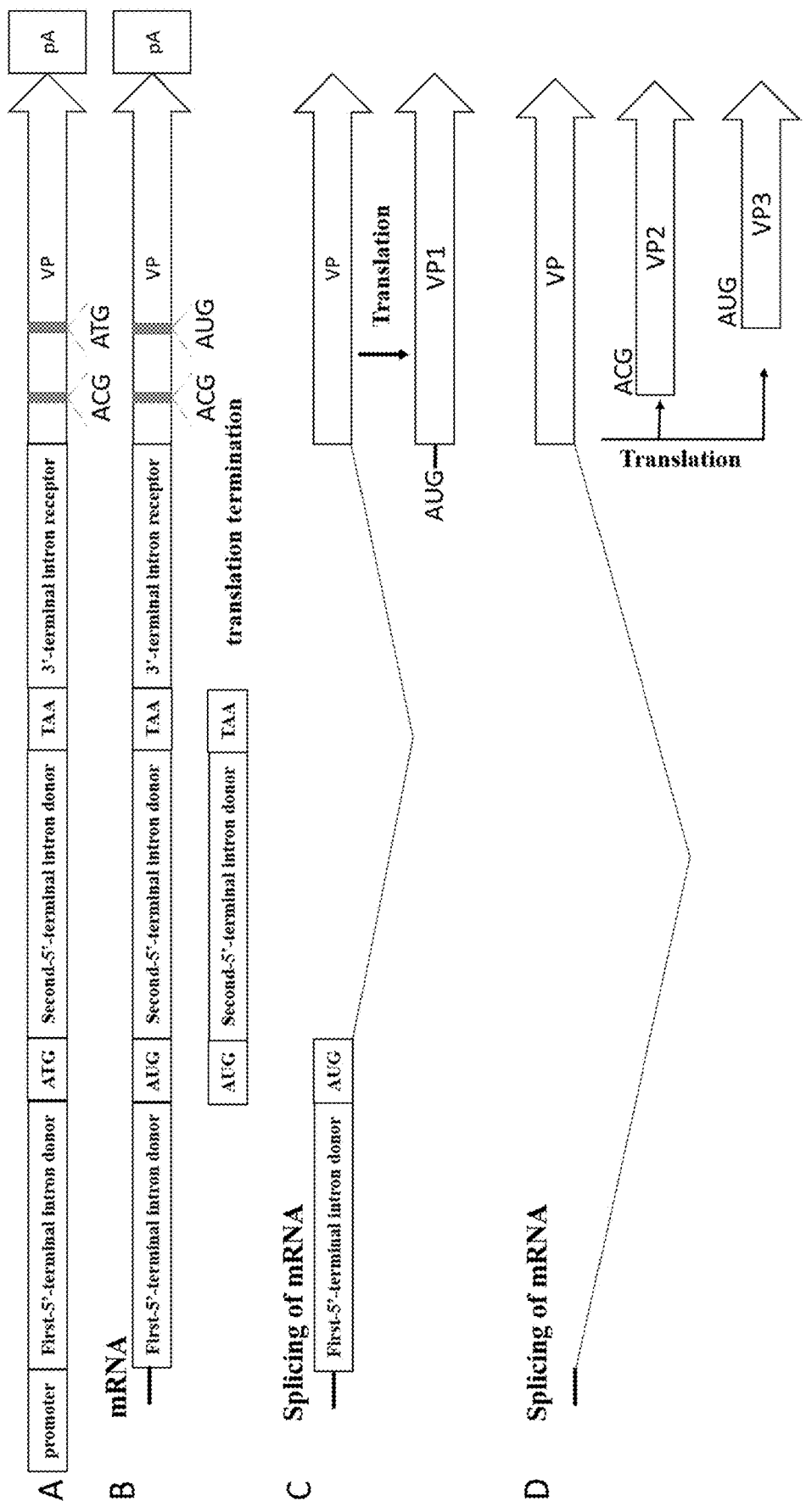
FIG. 3 is a schematic diagram of expression regulation of an expression cassette II of a cap gene in Example 3 of the disclosure, wherein content A is a schematic diagram of a DNA strand of the expression cassette II of the cap gene; content B is a schematic diagram of premature termination of translation of a VP protein when neither a first intron nor a second intron is spliced during a post-transcriptional processing process; content C is a schematic diagram of translation and expression of a VP1 protein after the second intron is spliced during the post-transcriptional processing process; content D is a schematic diagram of translation and expression of VP2 and VP3 proteins after the first intron is spliced during the post-transcriptional processing process.

The disclosure mutates an intron splicing site at an N-terminal of the VP1 protein encoding sequence of wild-type AAV, so that a spliceosome in the insect cell cannot recognize the splicing site. The 5' part of the first intron upstream of the start codon ATG and the 3' part of the intron downstream of the ATG form a complete first intron splicing site, and the 5' part of the second intron downstream of the ATG and the 3' part of the intron form a complete second intron splicing site, as shown in FIG. 3. During the post-transcriptional processing process, if the spliceosome in the insect cell recognizes the first intron splicing site and catalyzes a splicing reaction, an AUG-start site at the front end of the mRNA is removed. When a ribosome recognizes the start codon of the VP2 protein from 5' to 3', the VP2 protein can be translated and expressed. Since the VP2 start codon is a suboptimal codon ACG, it will cause the leakage of ribosome scanning, so the VP3 protein can be translated and expressed. If the spliceosome in the insect cell recognizes the second intron splicing site and catalyzes a splicing reaction, and the AUG-start site is not removed, the mRNA is translated from the first AUG and the VP1 protein is expressed. If the spliceosome in the insect cell neither splices the first intron splicing site nor the second intron splicing site, the mRNA is translated from the first AUG and is stopped at the stop codon inside the 5' part of the second intron, the translation is stopped prematurely, and the VP1, VP2, and VP3 proteins are not translated. The relative expression levels of the capsid proteins VP1, VP2, and VP3 are controlled through the splicing function with different probabilities of different introns.

In some embodiments, the gene including the overlapping open reading frames is the cap gene of AAV, the overlapping open reading frames that only lack the first translation start codon is the VP protein encoding sequence that only lacks the translation start codon ATG of the VP1 protein, and the artificially constructed sequence includes from 5' to 3' and operably linked:
an adenine nucleotide (A), the intron, a thymine nucleotide (T), and a guanine nucleotide (G);
or an adenine nucleotide (A), a thymine nucleotide (T), the intron, and a guanine nucleotide (G).

Figure 4:
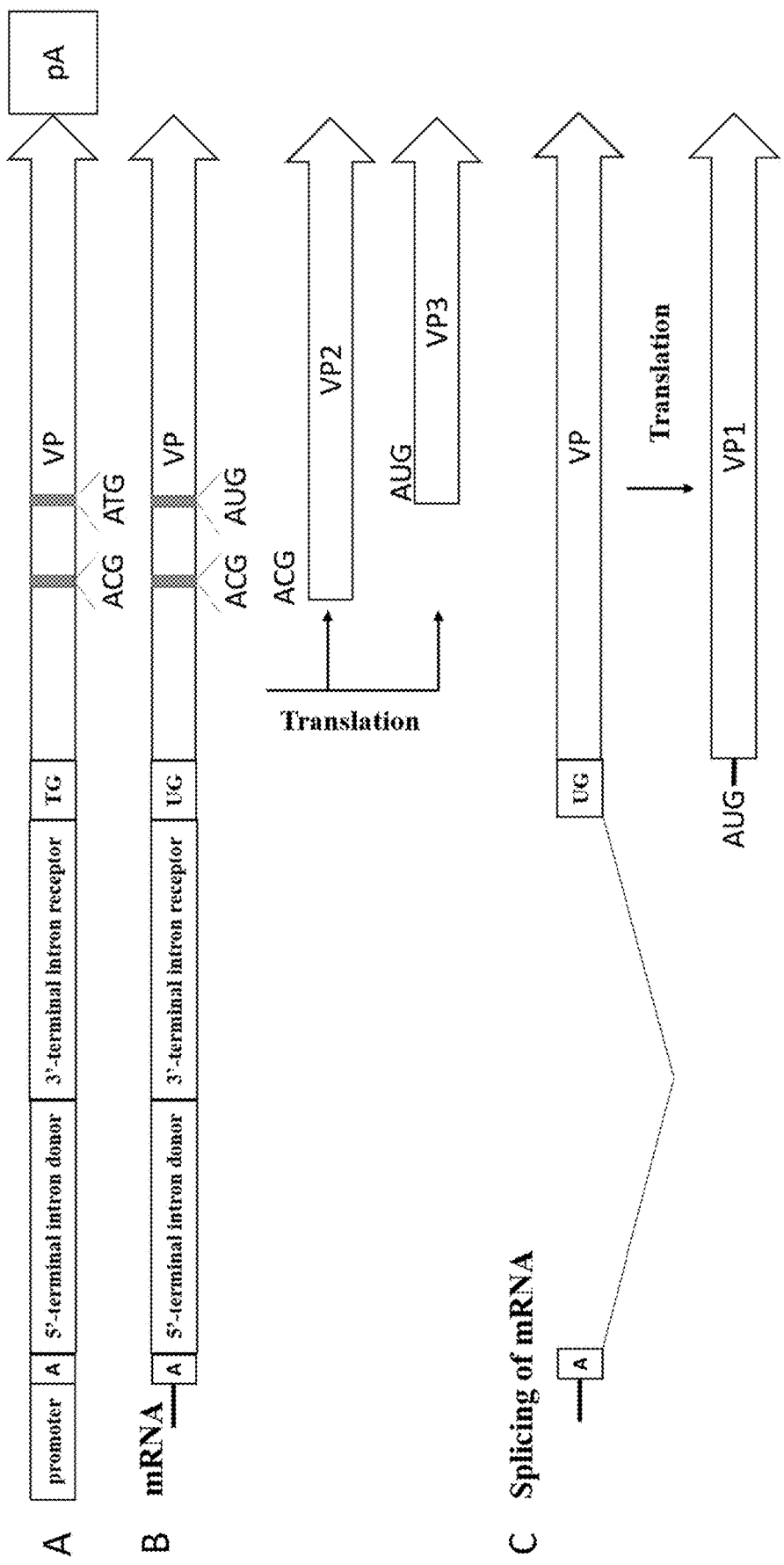
FIG. 4 is a schematic diagram of expression regulation of an expression cassette III of a cap gene in Example 5 of the disclosure, wherein content A is a schematic diagram of a DNA strand of the expression cassette III of the cap gene; content B is a schematic diagram of translation and expression of VP2 and VP3 proteins when an intron is not pruned during the post-transcriptional processing process; content C is a schematic diagram of translation and expression of a VP1 protein after the intron is pruned during the post-transcriptional processing process.

The disclosure mutates an intron splicing site at an N-terminal end of the VP1 protein encoding sequence of wild-type AAV, so that a spliceosome in the insect cell cannot recognize the splicing site, as shown in FIG. 4 (in the drawing, the intron is inserted between ATs of the ATG as an example). During the post-transcriptional processing process, if the spliceosome in the insect cell recognizes the intron splicing site inserted into the translation start codon AUG of the VP1 protein and catalyzes a splicing reaction, the intron is spliced, a complete AUG translation start site is formed, the mRNA is translated from the first AUG, and the VP1 protein is expressed. If the intron splicing site is not recognized and the intron is not spliced, the complete AUG translation start site cannot be formed. When a ribosome recognizes the start codon of the VP2 protein from 5' to 3', the VP2 protein can be translated and expressed. Since the VP2 start codon is a suboptimal codon ACG, which will cause the leakage of ribosome scanning, the VP3 protein can be translated and expressed. The relative expression levels of the capsid proteins VP1, VP2, and VP3 are controlled through the splicing function with a certain probability of the intron.

In some embodiments, the gene including the overlapping open reading frames is the rep gene of AAV, the overlapping open reading frames that only lack the first translation start codon is the Rep protein encoding sequence that only lacks the translation start codon ATG of the Rep78 protein, and the artificially constructed sequence includes from 5' to 3' and operably linked:
a 5' part of the intron;
a translation start codon ATG;
a 3' part of the intron;
a nucleotide sequence encoding a 2A self-cleaving polypeptide.

Figure 5:
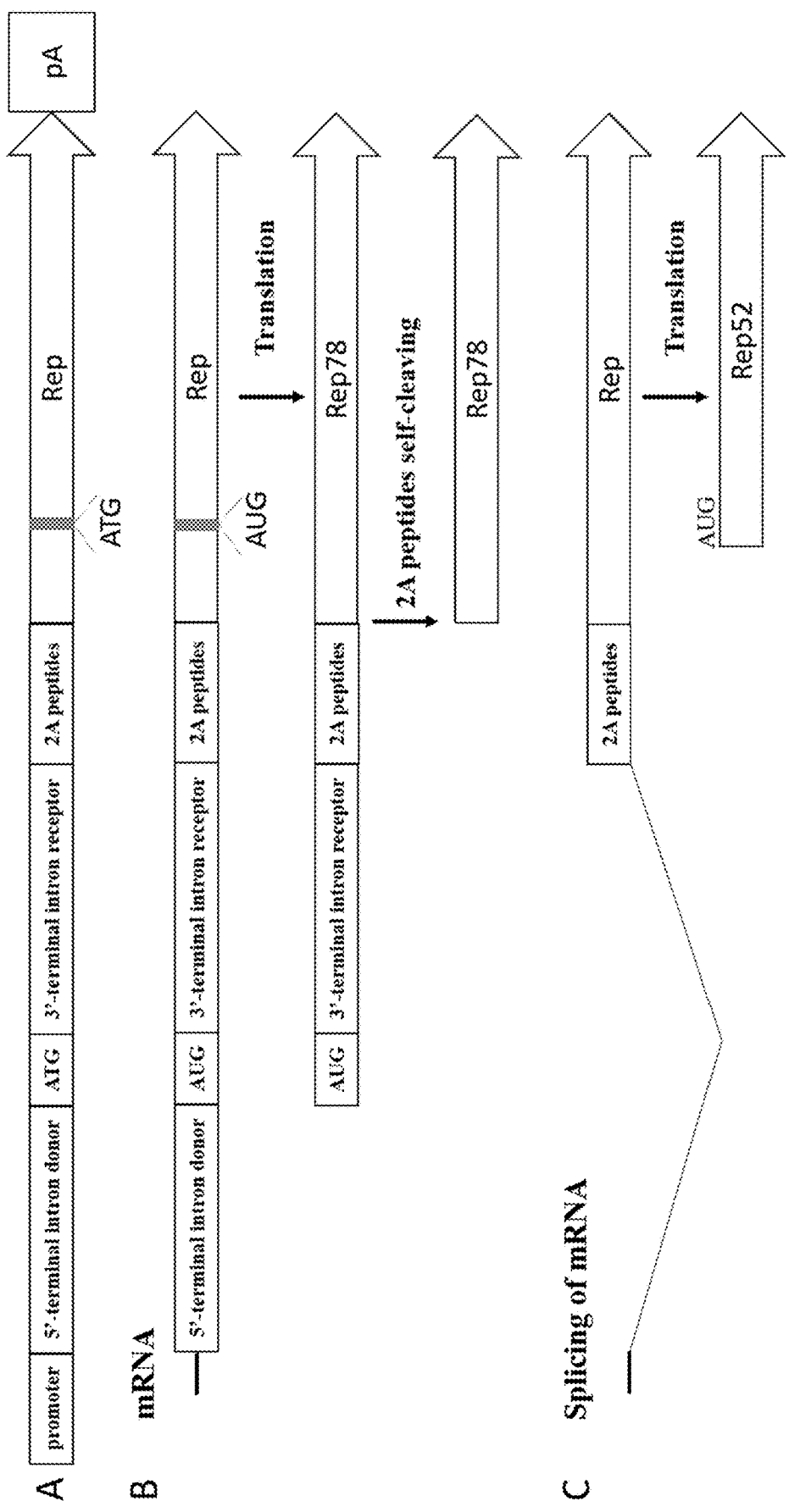
FIG. 5 is a schematic diagram of expression regulation of an expression cassette I of a rep gene in Example 2 of the disclosure, wherein content A is a schematic diagram of a DNA strand of the expression cassette I of the rep gene; content B is a schematic diagram of translation and expression of a Rep78 protein when an intron including a first start codon AUG is not spliced during a post-transcriptional processing process; content C is a schematic diagram of translation and expression of a Rep52 protein after the intron including the first start codon AUG is spliced during the post-transcriptional processing process.

The disclosure mutates one or more possible translation start sites upstream of the translation start codon of the Rep52 protein in the Rep78 protein encoding sequence of wild-type AAV, so that a ribosome in the insect cell cannot recognize the sites. The 5' part of the intron upstream of the codon ATG and the 3' part of the intron downstream of the ATG form a complete intron splicing site, as shown in FIG. 5. During the post-transcriptional processing process, if a spliceosome recognizes the intron splicing site and catalyzes a splicing reaction, an AUG-start site at the front end of the mRNA is removed, the ribosome recognizes the start codon of the Rep52 protein from 5' to 3', and the Rep52 protein can be translated and expressed. If the intron splicing site is not recognized and the AUG-start site is not removed, the mRNA is translated from the first AUG. Since the 2A self-cleaving polypeptide has a self-cleaving function, the C-terminal of the 2A self-cleaving polypeptide is cleaved to release the Rep78 protein. The relative expression levels of the Rep78 protein and the Rep52 protein are controlled through the splicing function with a certain probability of the intron.

In some embodiments, the gene including the overlapping open reading frames is the rep gene of AAV, the overlapping open reading frames that only lack the first translation start codon is the Rep protein encoding sequence that only lacks the translation start codon ATG of the Rep78 protein, and the artificially constructed sequence includes from 5' to 3' and operably linked:
a 5' part of the first intron;
a translation start codon ATG;
a second the 5' part of the intron;
a 3' part of the intron;
wherein there is a stop codon in the 5' part of the second intron, the stop codon may be TAA, TAG, or TGA, and the number of nucleotides between the stop codon and the translation start codon ATG is a multiple of 3.

Figure 6:
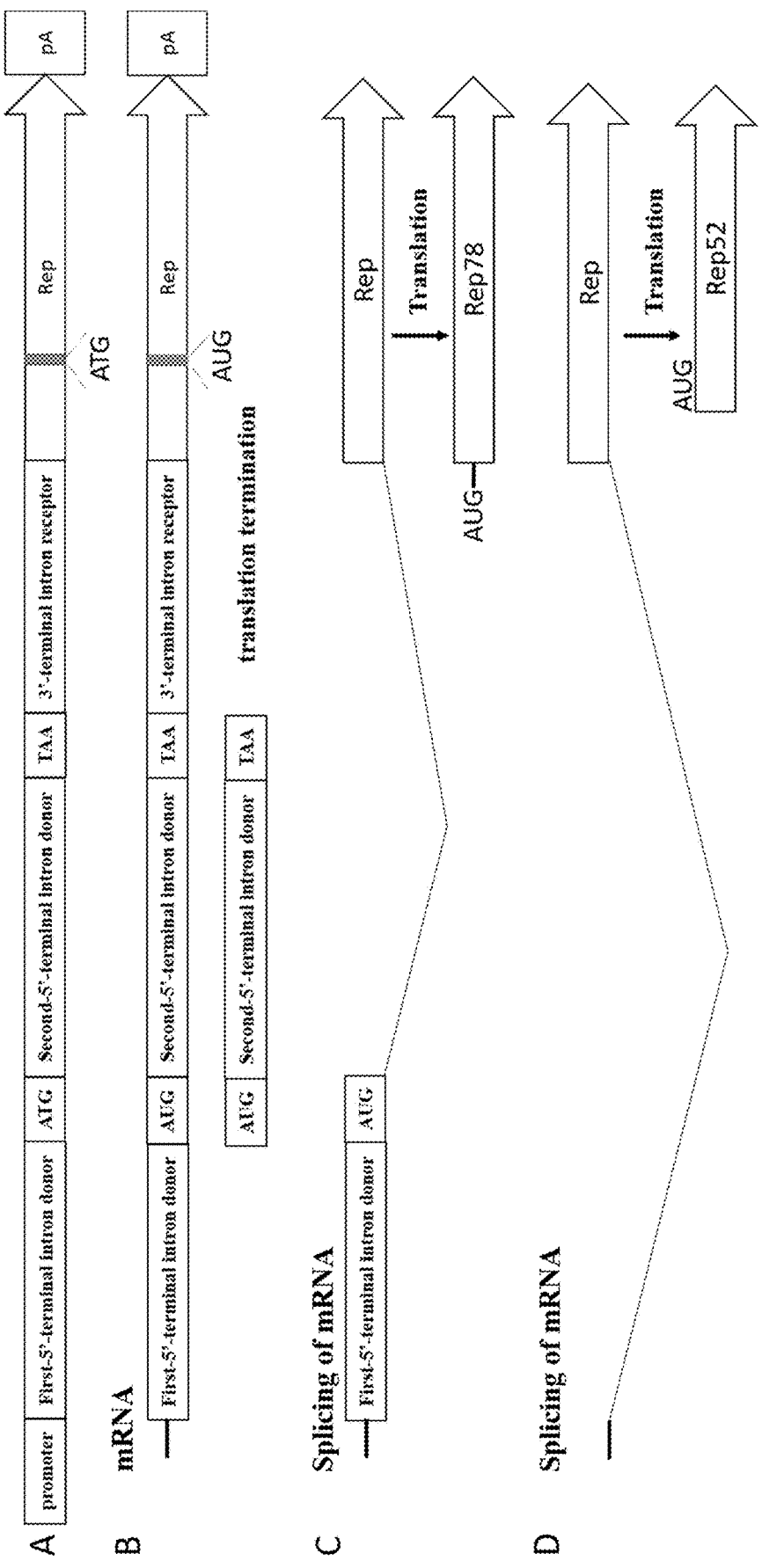
FIG. 6 is a schematic diagram of expression regulation of an expression cassette II of a rep gene in Example 4 of the disclosure, wherein content A is a schematic diagram of a DNA strand of the expression cassette II of the rep gene; content B is a schematic diagram of premature termination of translation of a VP protein when neither a first intron nor a second intron is spliced during a post-transcriptional processing process; content C is a schematic diagram of translation and expression of a Rep78 protein after the second intron is spliced during the post-transcriptional processing process; content D is a schematic diagram of translation and expression of a Rep52 protein after the first intron is spliced during the post-transcriptional processing process.

The disclosure mutates one or more possible translation start sites upstream of the translation start codon of the Rep52 protein in the Rep78 protein encoding sequence of wild-type AAV, so that a ribosome in the insect cell cannot recognize the sites. The 5' part of the first intron upstream of the codon ATG and the 3' part of the intron downstream of the ATG form a complete first intron splicing site, the 5' part of the second intron downstream of the ATG and the 3' part of the intron form a complete second intron splicing site, as shown in FIG. 6. During the post-transcriptional processing process, if a spliceosome in the insect cell recognizes the first intron splicing site and catalyzes a splicing reaction, an AUG-start site at the front end of the mRNA is removed. When the ribosome recognizes the start codon of the Rep52 protein from 5' to 3', the Rep52 protein can be translated and expressed. If the spliceosome in the insect cell recognizes the second intron splicing site and catalyzes a splicing reaction, and the AUG-start site is not removed, the mRNA is translated from the first AUG, and the Rep78 protein is expressed. If the spliceosome in the insect cell neither splices the first intron splicing site nor the second intron splicing site, the mRNA is translated from the first AUG and is stopped at the stop codon inside the 5' part of the second intron, the translation is stopped prematurely, and the Rep78 and Rep52 proteins are not translated. The relative expression levels of the Rep78 protein and the Rep52 protein are controlled through the splicing function with different probabilities of different introns.

In some embodiments, the gene including the overlapping open reading frames is the rep gene of AAV, the overlapping open reading frames that only lack the first translation start codon is the Rep protein encoding sequence that only lacks the translation start codon ATG of the Rep78 protein, and the artificially constructed sequence includes from 5' to 3' and operably linked:

an adenine nucleotide (A), the intron, a thymine nucleotide (T), and a guanine nucleotide (G);

or an adenine nucleotide (A), a thymine nucleotide (T), the intron, and a guanine nucleotide (G).

Figure 7:
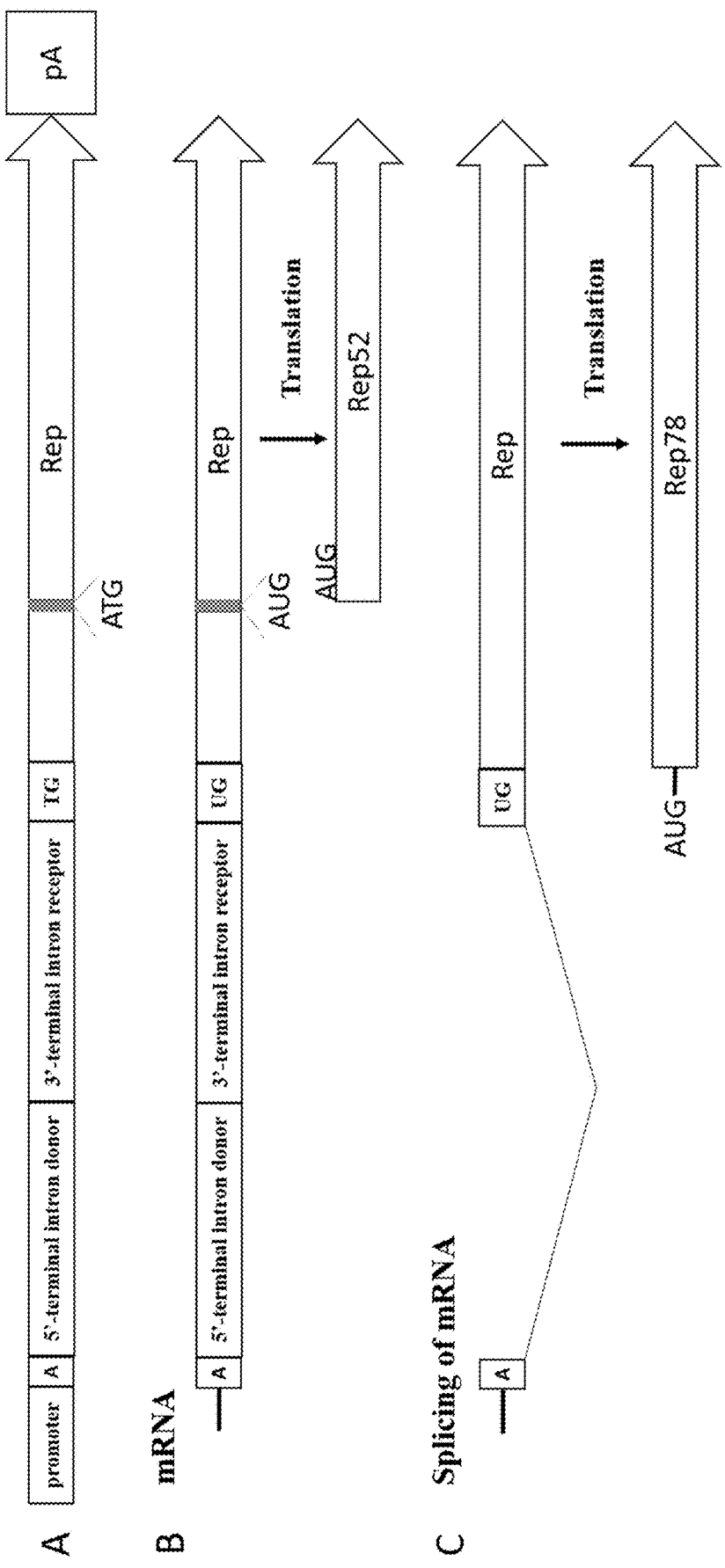
FIG. 7 is a schematic diagram of expression regulation of an expression cassette III of a rep gene in Example 6 of the disclosure, wherein content A is a schematic diagram of a DNA strand of the expression cassette III of the rep gene; content B is a schematic diagram of translation and expression of a Rep52 protein when an intron is not spliced during a post-transcriptional processing process; content C is a schematic representation of translation and expression of a Rep78 protein after the intron is spliced during the post-transcriptional processing process.

The disclosure mutates one or more possible translation start sites upstream of the translation start codon of the Rep52 protein in the Rep78 protein encoding sequence of wild-type AAV, so that a ribosome in the insect cell cannot recognize the sites, as shown in FIG. 7 (in the drawing, the intron is inserted between ATs of the ATG as an example). During the post-transcriptional processing process, if a spliceosome in the insect cell recognizes the intron splicing site inserted into the translation start codon AUG of the Rep78 protein and catalyzes a splicing reaction, the intron is spliced, a complete AUG translation start site is formed, the mRNA is translated from the first AUG, and the Rep78 protein is expressed. If the intron splicing site is not recognized and the intron is not spliced, the complete AUG translation start site cannot be formed, the ribosome recognizes the start codon of the Rep52 protein from 5' to 3', and the Rep52 protein be translated. The relative expression levels of the Rep78 protein and the Rep52 protein are controlled through the splicing function with a certain probability of the intron.

In some embodiments, preferably, a 5'-terminal nucleotide of the intron is GTNN, and a 3'-terminal nucleotide of the intron is NNAG, wherein N represents any one of four nucleotides A, T, C, and G. More specifically, a 5'-terminal nucleotide of the first intron and a 5'-terminal nucleotide of the second intron are both GTNN, and the 3'-terminal nucleotide of the intron is NNAG, which can regulate the VP1, VP2, and VP3 proteins to be translated and expressed closer to a stoichiometric ratio to facilitate packaging into appropriate capsids. Similarly, the translation and expression level of the Rep78 protein is lower than the Rep52 protein to facilitate higher vector yield.

In some embodiments, the nucleotide sequence of the intron is the sequence shown in SEQ ID No.2, SEQ ID No.3, SEQ ID No.4, SEQ ID No.5, SEQ ID No.15, SEQ ID No. 16, SEQ ID No.20, or SEQ ID No.21. As known to persons skilled in the art, the variant of the intron sequence may be used in the technical solution of the disclosure. In certain structures, a sequence having similarity to the nucleotide sequence of the intron of the disclosure may be used, such as a sequence whose 5'-terminal is at least 40%, 50%, 60%, 70%, 80%, or 90% identical to the sequence GTAAGTATCG, or a sequence whose 5'-terminal is at least 40%, 50%, 60%, 70%, 80%, or 90% identical to the sequence GTAAGTATTC; or a sequence whose 3'-terminal is at least 40%, 50%, 60%, 70%, 80%, or 90% identical to the sequence CCTTTTCCTTTTTTTTCAG, a sequence whose 3'-terminal is at least 40%, 50%, 60%, 70%, 80%, or 90% identical to the sequence AAACATTATTTATTTTGCAG, or a sequence whose 3-terminal is at least 40%, 50%, 60%, 70%, 80%, or 90% identical to the sequence CATTTTGGATATTGTTTCAG.

In some embodiments, the VP capsid protein encoded by the cap gene may be the capsid protein of any AAV serotype, such as AAV serotype 2, AAV serotype 5, AAV serotype 8, and AAV serotype 9. The intron sequence and the splicing strategy involved in the disclosure are applicable to the correct expression of the VP capsid proteins of the existing various AAV serotypes.

In some embodiments, the promoter capable of driving transcription of the cap gene and the rep gene in the insect cell may be a polh promoter or a p10 promoter. Preferably, the expression cassette of the cap gene adopts the p10 promoter, and the expression cassette of the rep gene adopts the polh promoter.

The disclosure also provides a nucleic acid molecule including the expression cassette of the cap gene and/or the expression cassette of the rep gene. The nucleic acid may include expression cassettes arranged in tandem, that is, in the same polarity or in an antisense orientation. Therefore, the expression cassette of the cap gene may be in an antisense orientation with respect to the expression cassette of the rep gene or may be in a sense orientation with respect to the expression cassette of the rep gene.

The disclosure also provides a recombinant adeno-associated virus vector, preferably an insect cell-compatible vector, which includes the expression cassette of the cap gene and the expression cassette of the rep gene. The expression cassette of the cap gene is preferably the expression cassette constructed by the disclosure, and the expression cassette of the rep gene is preferably the gene expression cassette constructed by the disclosure. It should be understood that the rAAV vector also includes an exogenous gene and an AAV inverted terminal repeat sequence located at two terminals of the exogenous gene. ITR acts on the replication packaging and the site-directed integration of AAV, helping the vector to form a stable cyclic polymer and chromatin-like structure in the host cell, so that the vector can exist stably in the host cell for a long time, and the exogenous gene can also be continuously and stably expressed. The exogenous gene may be at least one nucleotide sequence encoding a gene of interest (GOI) product. The gene of interest product may be a therapeutic gene product, which is specifically a polypeptide, an RNA molecule (siRNA), or other gene products, such as but not limited to lipoprotein esterase, apolipoprotein, cytokine, interleukin, or interferon; may also be a reporter protein to assess transformation and expression of the vector, such as but not limited to, a fluorescent protein (a green fluorescent protein GFP, a red fluorescent protein RFP), chloramphenicol acetyltransferase, β-galactosidase, β-glucuronidase, Renilla luciferase, firefly luciferase, or alkaline phosphatase.

On the other hand, the disclosure also provides an application of the recombinant adeno-associated virus vector for preparing a recombinant adeno-associated virus in an insect cell. The introduction of the vector into the insect cell can implement the expression of the VP1, VP2, and VP3 proteins in the correct stoichiometric ratio of 1:1:10, thereby packaging to produce the recombinant adeno-associated virus, which has a high packaging rate, and most of the known AAV serotypes (for example, AAV2, AAV5, AAV8, and AAV9) all have better infectivity. At the same time, the expression levels of the Rep78 and Rep52 proteins are controlled within a reasonable range, so that the AAV vector can be stably and massively produced in the insect cell. Also, the recombinant adeno-associated virus vector including the expression cassette of the cap gene may be used to produce an AAV capsid in vitro.

On the other hand, the disclosure also provides an insect cell. The insect cell includes the expression cassette of the cap gene and/or the rep gene of AAV and may also include the expression cassette of the exogenous gene. At least one of the expression cassettes may be integrated into the genome of the host insect cell for stable expression, or the insect cell may transiently carry the nucleic acids including the expression cassettes.

In some embodiments, the insect cell may be any insect cell, such as but not limited to a *Spodoptera frugiperda* cell, a *Trichoderma* cell, a *Drosophila* cell, or a mosquito cell, preferably a *Spodoptera frugiperda* cell sf9.

In another aspect, the disclosure also provides a cell culture, which includes the insect cell and a culture medium.

In some embodiments, the culture medium includes an AAV genome.

On the other hand, the disclosure also provides a recombinant adeno-associated virion, which is obtained by culturing the insect cell under conditions capable of producing the recombinant adeno-associated virion, and then recovering.

The above technical solutions are described in detail below with reference to specific examples.

Example 1 Construction of a Recombinant Baculovirus Vector Including an Expression Cassette I of a Cap Gene of AAV Serotype 9

(1) Construction of the expression cassette I of the cap gene: see FIG. 2, the expression cassette I of the cap gene sequentially includes a p10 promoter, an intron, a nucleotide sequence encoding a T2A peptide, and a nucleotide sequence encoding a VP protein of AAV serotype 9 lacking only a translation start codon ATG of a VP1 protein from 5' to 3'. The nucleotide sequence of the p10 promoter is shown in SEQ ID No.1. In the expression cassette I of the cap gene, the example specifically provides 4 introns whose nucleotide sequences are respectively shown in SEQ ID No.2 to SEQ ID No.5, and the introns all include the translation initiation start codon ATG. The nucleotide sequence encoding the T2A peptide is shown in SEQ ID No.6. The nucleotide sequence encoding the VP protein of AAV serotype 9 is shown in SEQ ID No. 7, and an amino-terminal thereof has at least one nucleotide mutation, which is used to eliminate possible cleavage sites in the encoding sequence. The sequences were connected through artificial direct synthesis or overlap extension PCR amplification to respectively obtain constructs 9K-1, 9K-2, 9K-3, and 9K-4 whose nucleotide sequences are respectively shown in SEQ ID No.8 to SEQ ID No.11.

(2) Construction of a recombinant baculovirus vector: the construct 9K-1 was cloned into a pFastBac vector to prepare a transfer plasmid. The plasmid was transformed into a DH10Bac strain, and the recombinant baculovirus vector Ac1 was obtained through Tn7 transposition. Similarly, a recombinant baculovirus vector Ac2 including 9K-2, a recombinant baculovirus vector Ac3 including 9K-3, and a recombinant baculovirus vector Ac4 including 9K-4 were obtained.

Example 2 Construction of a Recombinant Baculovirus Vector Including an Expression Cassette I of a Rep Gene of AAV Serotype 2

(1) Construction of the expression cassette I of the rep gene: see FIG. 5, the expression cassette I of the rep gene sequentially includes a polh promoter, an intron, a nucleotide sequence encoding a T2A peptide, and a nucleotide sequence encoding a Rep protein of AAV serotype 2 lacking only a translation start codon ATG of a Rep78 protein from 5' to 3'. The nucleotide sequence of the polh promoter is shown in SEQ ID No.12. The nucleotide sequence of the intron in the expression cassette of the rep gene of the example is shown in SEQ ID No. 5, and the intron includes the translation start codon ATG. The nucleotide sequence encoding the T2A peptide is shown in SEQ ID No.6. The nucleotide sequence encoding the Rep protein of AAV serotype 2 is shown in SEQ ID No. 13 and includes multiple nucleotide mutations between the Rep78 translation start codon and the Rep52 translation start codon to eliminate possible translation start sites within the region. The sequences were connected through artificial direct synthesis or overlap extension PCR amplification to obtain a construct 2R-1 whose nucleotide sequence is shown in SEQ ID No.14.

(2) Construction of a recombinant baculovirus vector: the same as Step (2) in Example 1, a recombinant baculovirus vector Ac5 including 2R-1 was obtained.

Example 3 Construction of a Recombinant Baculovirus Vector Including an Expression Cassette II of a Cap Gene of AAV Serotype 9

(1) Construction of the expression cassette II of the cap gene: see FIG. 3, the expression cassette II of the cap gene sequentially includes a p10 promoter, an artificially constructed sequence, and a nucleotide sequence encoding a VP protein of AAV serotype 9 lacking only a translation start codon ATG of a VP1 protein from 5' to 3'. The nucleotide sequence of the p10 promoter is shown in SEQ ID No.1. In the expression cassette II of the cap gene, the example specifically provides 2 artificially constructed sequences whose nucleotide sequences are respectively shown in SEQ ID No. 15 and SEQ ID No. 16, and the artificially constructed sequences both include the translation start codon ATG and two intron splicing sites. The nucleotide sequence encoding the VP protein of AAV serotype 9 is shown in SEQ ID No. 7 whose amino-terminal has at least one nucleotide mutation, which is used to eliminate possible cleavage sites in the encoding sequence. The sequences were connected through artificial direct synthesis or overlap extension PCR amplification to respectively obtain constructs 9K-5 and 9K-6 whose nucleotide sequences are respectively shown in SEQ ID No. 17 and SEQ ID No. 18.

(2) Construction of a recombinant baculovirus vector: the same as Step (2) in Example 1, a recombinant baculovirus vector Ac6 including 9K-5 and a recombinant baculovirus vector Ac7 including 9K-6 were respectively obtained.

Example 4 Construction of a Recombinant Baculovirus Vector Including an Expression Cassette II of a Rep Gene of AAV Serotype 2

(1) Construction of the expression cassette II of the rep gene: see FIG. 6, the expression cassette II of the rep gene includes a polh promoter, an artificially constructed sequence, and a nucleotide sequence encoding a Rep protein of AAV serotype 2 lacking only a translation start codon ATG of a Rep78 protein from 5' to 3'. The nucleotide sequence of the polh promoter is shown in SEQ ID No.12. The nucleotide sequence of the artificially constructed sequence in the expression cassette II of the rep gene of the example is shown in SEQ ID No. 16, and the artificially constructed sequence includes the translation start codon ATG and two intron splicing sites. The nucleotide sequence encoding the Rep protein of AAV serotype 2 is shown in SEQ ID No. 13 and includes multiple nucleotide mutations between the Rep78 translation start codon and the Rep52 translation start codon to eliminate possible translation start sites within the region. The sequences were connected through artificial direct synthesis or overlap extension PCR amplification to obtain a construct 2R-2 whose nucleotide sequence is shown in SEQ ID No.19.

(2) Construction of a recombinant baculovirus vector: the same as Step (2) in Example 1, a recombinant baculovirus vector Ac8 including 2R-2 was obtained.

Example 5 Construction of a Recombinant Baculovirus Vector Including an Expression Cassette III of a Cap Gene of AAV Serotype 9

(1) Construction of the expression cassette III of the cap gene: see FIG. 4, the expression cassette III of the cap gene includes a p10 promoter, an adenine nucleotide (A), an intron, a thymine nucleotide (T), a guanine nucleotide (G), and a nucleotide sequence encoding a VP protein of AAV serotype 9 lacking only a translation start codon ATG of a VP1 protein. The nucleotide sequence of the p10 promoter is shown in SEQ ID No.1. In the expression cassette III of the cap gene, the example specifically provides 2 introns whose nucleotide sequences are respectively shown in SEQ ID No. 20 and SEQ ID No. 21. The nucleotide sequence encoding the VP protein of AAV serotype 9 is shown in SEQ ID No. 7 whose amino-terminal has at least one nucleotide mutation, which is used to eliminate possible cleavage sites in the encoding sequence. The sequences were connected through artificial direct synthesis or overlap extension PCR amplification to respectively obtain constructs 9K-7 and 9K-8 whose nucleotide sequences are respectively shown in SEQ ID No. 22 and SEQ ID No. 23.

(2) Construction of a recombinant baculovirus vector: the same as Step (2) in Example 1, a recombinant baculovirus vector Ac9 including 9K-7 and a recombinant baculovirus vector Ac10 including 9K-8 were respectively obtained.

Example 6 Construction of a Recombinant Baculovirus Vector Including an Expression Cassette III of a Rep Gene of AAV Serotype 2

(1) Construction of the expression cassette III of the rep gene: see FIG. 7, the expression cassette III of the rep gene includes a polh promoter, A, an intron, TG, and a nucleotide sequence encoding a Rep protein of AAV serotype 2 lacking only a translation start codon ATG of a Rep78 protein from 5' to 3'. The nucleotide sequence of the polh promoter is shown in SEQ ID No.12. The nucleotide sequence of the intron in the expression cassette III of the rep gene of the example is shown in SEQ ID No.21. The nucleotide sequence encoding the Rep protein of AAV serotype 2 is shown in SEQ ID No. 13 and includes multiple nucleotide mutations between the Rep78 translation start codon and the Rep52 translation start codon to eliminate possible translation start sites within the region. The sequences were connected through artificial direct synthesis or overlap extension PCR amplification to obtain a construct 2R-3 whose nucleotide sequence is shown in SEQ ID No.24.

(2) Construction of a recombinant baculovirus vector: the same as Step (2) in Example 1, a recombinant baculovirus vector Ac11 including 2R-3 was obtained.

Comparative Example Construction of a Recombinant Baculovirus Vector Ac0 and an Expression Cassette of a Rep Gene (1) Construction of an expression cassette of a cap gene: in Comparative Example, the expression cassette of the cap gene was constructed with reference to the method of Urabe et al. (Urabe et al., 2002, Hum Gene Ther, 13: 1935-1943). A promoter of the expression cassette of the cap gene adopts a p10 promoter, the cap gene in the expression cassette encodes a VP protein of AAV serotype 9, and a translation start codon ATG of VP1 in the encoding sequence is mutated to a suboptimal codon ACG. The expression cassette of the cap gene is numbered 9K-0 whose nucleotide sequence is shown in SEQ ID No.25.

(2) Construction of a recombinant baculovirus vector: the same as Step (2) in Example 1, a recombinant baculovirus vector Ac0 including 9K-0 was obtained.

(3) Construction of the expression cassette of the rep gene: the expression cassette of the rep gene was constructed with reference to the method of Chinese patent CN 103849629 A. A promoter of the expression cassette of the rep gene adopts a polh promoter. The rep gene in the expression cassette encodes a Rep protein of AAV serotype 2, and an original translation start codon ATG of a Rep78 protein of AAV was replaced with ACG. The expression cassette of the rep gene is numbered 2R-0.

Example 7 Detection of Expression of VP Proteins (VP1, VP2, VP3) and Rep Proteins (Rep78, Rep52)

The recombinant baculovirus vectors Ac0, Ac1, Ac2, Ac3, Ac4, Ac5, Ac6, Ac7, Ac8, Ac9, Ac10, and Ac11 prepared in Examples 1-6 and Comparative Example were respectively transfected into a host cell line and cultured to obtain a recombinant baculovirus, and the expression of the VP proteins (VP1, VP2, VP3) and the Rep proteins (Rep78, Rep52) were detected. The specific operation steps are as follows:

DNA of the recombinant baculovirus vector was extracted and transfected into a Sf9 insect cell to prepare a recombinant baculovirus BEV. The transfected Sf9 insect cell successfully produced BEV, and further infection of massively replicated BEV resulted in obvious cytopathic effect (CPE) in the Sf9 cells. Culture supernatant of the Sf9 cells with CPE was collected, which included a large amount of BEV, which was the 0th generation BEV (P0). At the same time, the Sf9 cells including a large amount of rAAV were collected. The obtained BEV-P0 infected the Sf9 cells in suspension culture at a multiplicity of infection (MOI=1). After infection for 72 hours, the cell activity dropped to less than 50%. The cell culture medium was centrifuged at 1000 g for 5 min. The culture supernatant and the cell pellet were respectively collected. The supernatant was labeled as the 1st generation BEV-P1. Continue to expand the culture, and the obtained BEV-P1 infected the Sf9 cells in suspension culture at a multiplicity of infection (MOI=1). After infection for 72 hours, the cell activity dropped to less than 50%. The cell culture medium was centrifuged at 1000 g for 5 min. The cell pellet was collected for western blot to examine the expression of the VP proteins (VP1, VP2, VP3) and the Rep proteins (Rep78, Rep52).

Figures 8, 9:
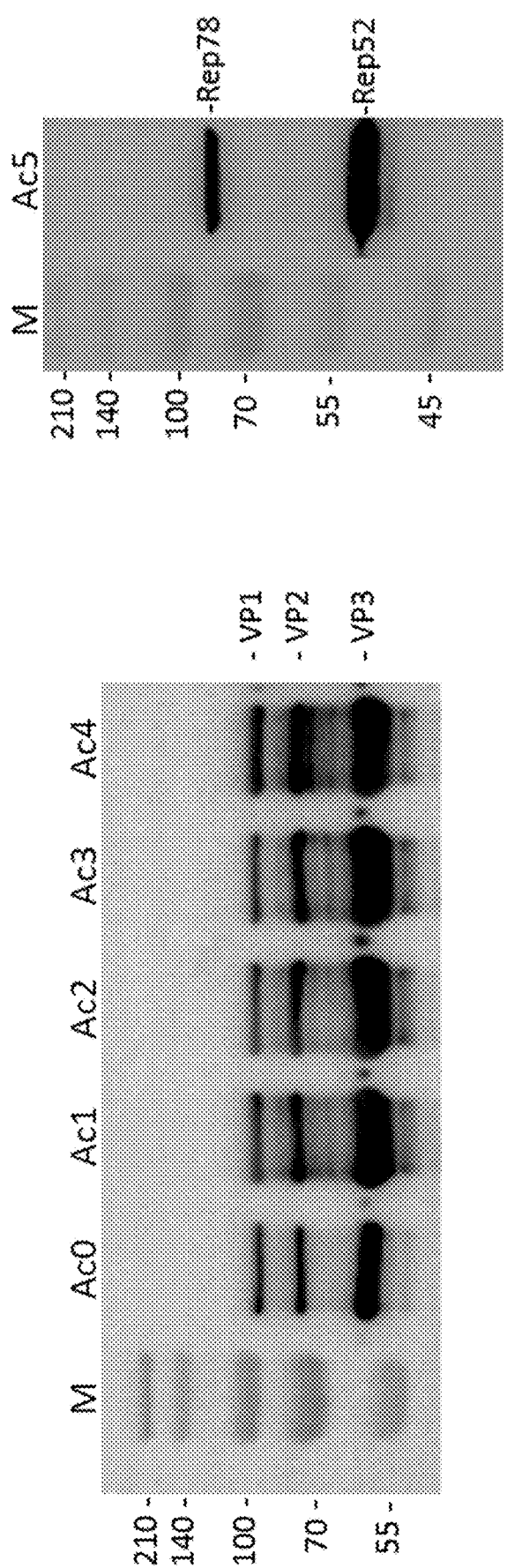
FIG. 8 is a western blot detection diagram of recombinant baculovirus vectors Ac1, Ac2, Ac3, and Ac4 including an expression cassette I of a cap gene in Example 7 of the disclosure and a recombinant baculovirus vector Ac0 expressing a VP protein prepared in Comparative Example.
FIG. 9 is a western blot detection diagram of a recombinant baculovirus vector Ac5 including an expression cassette I of a rep gene expressing a Rep protein in Example 7 of the disclosure.

FIG. 8 is a western blot detection diagram of the VP proteins (VP1, VP2, and VP3) of the recombinant baculovirus vectors Ac1, Ac2, Ac3, and Ac4 including the expression cassette I of the cap gene and the control recombinant baculovirus vector Ac0. It can be seen from the drawing that the recombinant baculovirus vectors can produce VP1, VP2, and VP3 in a relatively appropriate ratio; Ac4 has higher VP1 production than Ac1 to Ac3, and high VP1 incorporation often leads to higher infectious activity. The reason for the higher VP1 production is that the intron included in Ac4 has lower splicing activity than other vectors.

FIG. 9 is a western blot detection diagram of the Rep proteins (Rep78 and Rep52) of the recombinant baculovirus vector Ac5 including the expression cassette I of the rep gene. It can be seen from the drawing that the recombinant baculovirus vector Ac5 can produce the Rep78 and Rep52 proteins, and the expression level of the Rep78 protein is lower than the Rep52 protein.

Figure 10:
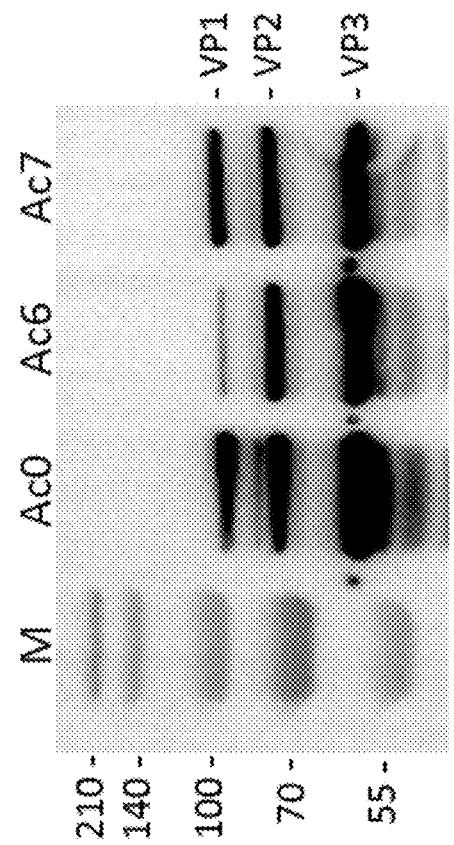
FIG. 10 is a western blot detection diagram of recombinant baculovirus vectors Ac6 and Ac7 including an expression cassette II of a cap gene in Example 7 of the disclosure and a recombinant baculovirus vector Ac0 expressing a VP protein prepared in Comparative Example.

FIG. 10 is a western blot detection diagram of the VP proteins (VP1, VP2, and VP3) of the recombinant baculovirus vectors Ac6 and Ac7 including the expression cassette II of the cap gene and the control recombinant baculovirus vector Ac0. It can be seen from the drawing that Ac0, Ac6, and Ac7 can produce VP1, VP2, and VP3 in a relatively appropriate ratio; Ac7 has higher VP1 production than Ac6, and high VP1 incorporation often leads to higher infectious activity. The reason for the higher VP1 production is that the splicing donor of the second intron and the splicing acceptor of the intron included in Ac7 have higher alternative splicing activity.

Figure 11:
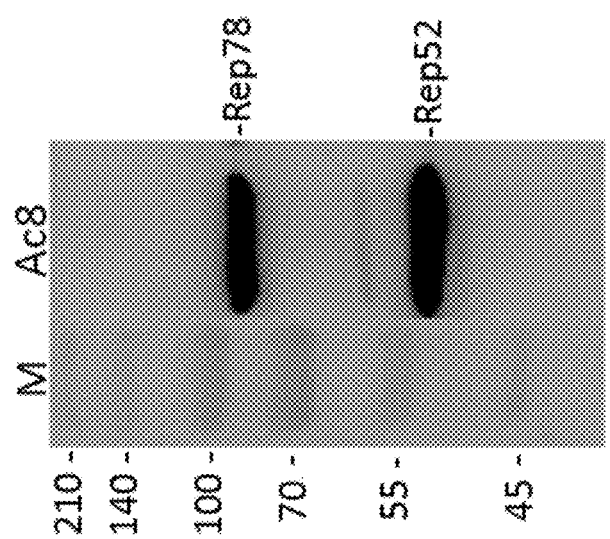
FIG. 11 is a western blot detection diagram of a recombinant baculovirus vector Ac8 including an expression cassette II of a rep gene expressing a Rep protein in Example 7 of the disclosure.

FIG. 11 is a western blot detection diagram of the Rep proteins (Rep78 and Rep52) of the recombinant baculovirus vector Ac8 including the expression cassette II of the rep gene. It can be seen from the drawing that the recombinant baculovirus vector Ac8 can produce the Rep78 and Rep52 proteins.

Figures 12, 13:
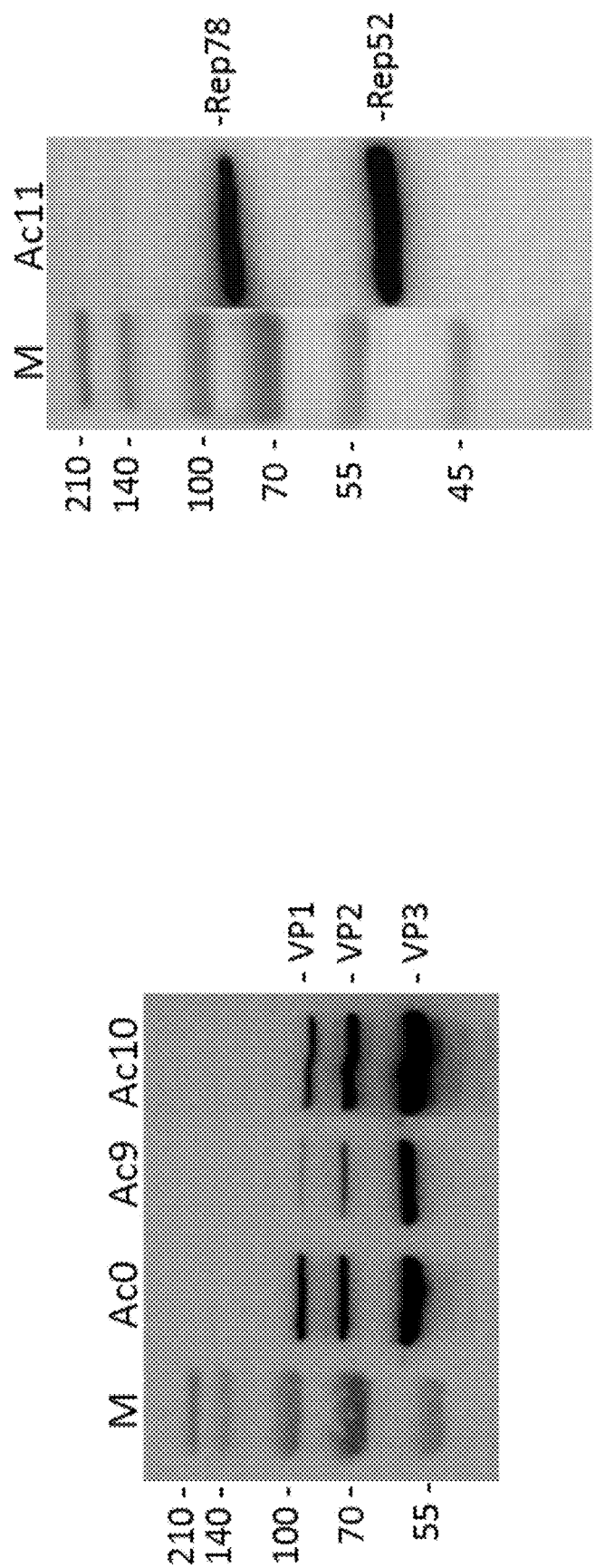
FIG. 12 is a western blot detection diagram of recombinant baculovirus vectors Ac9 and Ac10 including an expression cassette III of a cap gene in Example 7 of the disclosure and a recombinant baculovirus vector Ac0 expressing a VP protein prepared in Comparative Example.
FIG. 13 is a western blot detection diagram of a recombinant baculovirus vector Ac11 including an expression cassette III of a rep gene expressing a Rep protein in Example 7 of the disclosure.

FIG. 12 is a western blot detection diagram of the VP proteins (VP1, VP2, and VP3) of the recombinant baculovirus vectors Ac9 and Ac10 including the expression cassette III of the cap gene and the control recombinant bacmid Ac0. It can be seen from the drawing that Ac0, Ac9, and Ac10 can produce VP1, VP2, and VP3 in a relatively appropriate ratio; Ac10 has higher VP1 production than Ac9, and high VP1 incorporation often leads to higher infectious activity. The reason for the higher VP1 production is that the splicing activity of the intron included in Ac10 is higher than Ac9.

FIG. 13 is a western blot detection diagram of the Rep proteins (Rep78 and Rep52) of the recombinant baculovirus vector Ac11 including the expression cassette III of the rep gene. It can be seen from the drawing that the recombinant baculovirus vector Ac11 can produce the appropriate Rep78 and Rep52 proteins.

Example 8 Construction of a Recombinant AAV Bacmid for Producing an AAV Virus in an Insect Cell With reference to Example 1 in the previous patent application CN 112553257 A of our company, the method for constructing the recombinant AAV bacmid for producing the AAV virus in the insect cell in the example includes the following steps:

(1) Construction of a homologous recombination vector including AAV essential functional elements, expression cassettes of cap and rep genes. Then, the essential functional elements in the homologous recombination vector were inserted into a C-terminus of an essential gene Ac135 (116492 . . . 117391) in a baculovirus genome through Red homologous recombination in *Escherichia coli* to obtain the recombinant baculovirus vector including the expression cassettes of the cap and rep genes, and numbered Bac-Cap-Rep.

(2) Construction of a shuttle vector including an ITR core element (ITR-GOI). The ITR core element is numbered IG-1 whose nucleotide sequence is shown in SEQ ID No.26. In the example, GOI in the ITR core element adopts an expression cassette of a red fluorescent protein mcherry gene, that is, the expression of mcherry is controlled by a miniEf1a promoter, which is convenient for detecting the activity of rAAV. ITR and the expression cassette of the red fluorescent protein were constructed on the shuttle vector pFastDual.

(3) A competent cell including the Bac-Cap-Rep recombinant bacmid was transformed using the shuttle vector constructed in Step (2) above. ITR-GOI was inserted into a Tn7 site in the Bac-Cap-Rep recombinant bacmid using Tn7 recombination. Finally, a recombinant bacmid of a recombinant baculovirus genome including the functional protein components essential for producing rAAV and the ITR core element was obtained and numbered Bac-Cap-Rep-ITR-GOI.

The 9 different recombinant AAV bacmids constructed in the example both include the expression cassette of the cap gene, the expression cassette of the rep gene, and the ITR core element, as shown in Table 1.

TABLE 1

List of constituent elements of 9 different recombinant AAV bacmids constructed in Example 8

| Recombinant AAV bacmid | Functional protein components essential for producing rAAV and ITR core element | | |
|---|---|---|---|
| (Bac-Cap-Rep-ITR-GOI) numbering | Expression cassette of cap gene | Expression cassette of rep gene | ITR core element (ITR-GOI) |
| CRI-0 | 9K-0 | 2R-0 | I-G-1 |
| CRI-1 | 9K-1 | 2R-1 | I-G-1 |
| CRI-2 | 9K-2 | 2R-1 | I-G-1 |
| CRI-3 | 9K-3 | 2R-1 | I-G-1 |
| CRI-4 | 9K-4 | 2R-1 | I-G-1 |
| CRI-5 | 9K-5 | 2R-2 | I-G-1 |
| CRI-6 | 9K-6 | 2R-2 | I-G-1 |
| CRI-7 | 9K-7 | 2R-3 | I-G-1 |
| CRI-8 | 9K-8 | 2R-3 | I-G-1 |

Example 9 Preparation of an AAV Recombinant Baculovirus

The recombinant AAV bacmids CRI-0, CRI-1, CRI-2, CRI-3, CRI-4, CRI-5, CRI-6, CRI-7, and CRI-8 prepared in Example 8 were respectively transfected into a host cell line culture to obtain the AAV recombinant baculovirus.

DNA of the recombinant bacmid was extracted and transfected into a Sf9 insect cell to prepare a recombinant baculovirus BEV and rAAV. The transfected Sf9 insect cell successfully produced BEV, and further infection of massively replicated and proliferated BEV resulted in obvious cytopathic effect (CPE) in the Sf9 cells. Culture supernatant of the Sf9 cells with CPE was collected, which included a large amount of BEV, which was the 0th generation BEV (P0). At the same time, the Sf9 cells including a large amount of rAAV were collected. The obtained BEV-P0 infected the Sf9 cells in suspension culture at a multiplicity of infection (MOI=1). After infection for 72 hours, the cell activity dropped to less than 50%. The cell culture medium was centrifuged at 1000 g for 5 min. The culture supernatant and the cell pellet were respectively collected. The supernatant was labeled as the 1st generation BEV-P1, and the cells were labeled as rAAV packaged with BEV-P0.

Example 10 Purification of a Recombinant AAV Virion and Detection of Packaging Efficiency and Virus Titer Thereof Continue to expand the culture according to the operation of Example 9 until the Sf9 cells in suspension culture are infected with BEV-P2 seed virus according to a multiplicity of infection (MOI=1) for rAAV packaging, and the packaging volume is 300 mL to 400 mL. After infection for 3 days, the cell activity was monitored, and if the activity was less than 50%, the cell pellet and the supernatant were respectively harvested by centrifugation. The harvested cell pellet and supernatant were respectively purified. Nuclease (Benzonase) was added to the supernatant, treated in a water bath at 37° C. for 60 min, and centrifuged at 5000 rpm for 10 min after treatment. The collected cell lysate and the collected supernatant were PEG precipitated, resuspended, and purified by iodixanol density gradient centrifugation (see Aslanidi et al., 2009, Proc. Natl Acad. Sci. USA, 206: 5059-5064 for the method). Finally, the purified virus was resuspended in 80 µL to 190 µL PBS, and 10 µL of the purified virus was run on SDS-PAGE gel for silver staining.

Figure 14A:
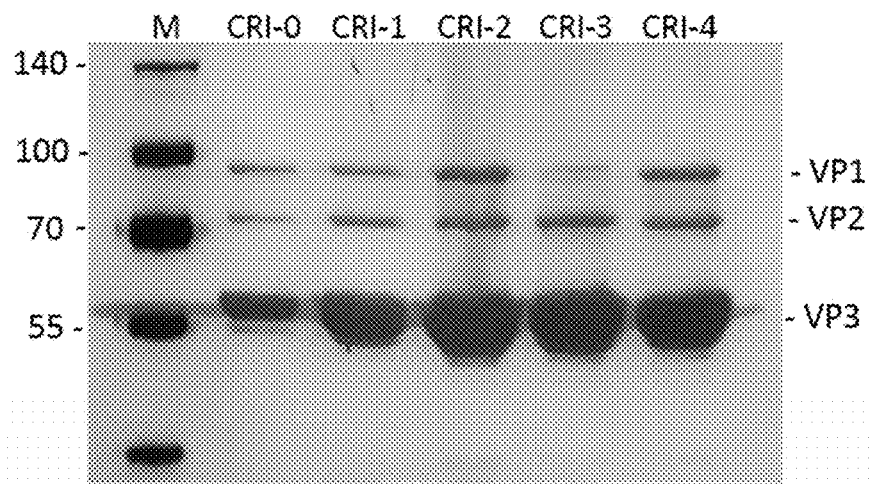
FIG. 14A, FIG. 14B, and FIG. 14C are silver-stained detection images of a purified recombinant AAV virion subjected to SDS-PAGE after a host cell is transfected with recombinant AAV bacmids CRI-0, CRI-1, CRI-2, CRI-3, CRI-4, CRI-5, CRI-6, CRI-7, and CRI-8 in Example 10 of the disclosure and show three capsid proteins VP1/VP2/VP3.
Figure 14B:
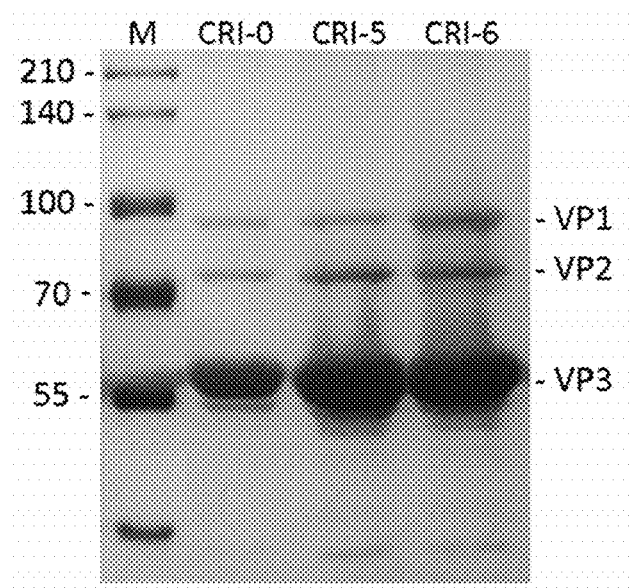
Figure 14C:
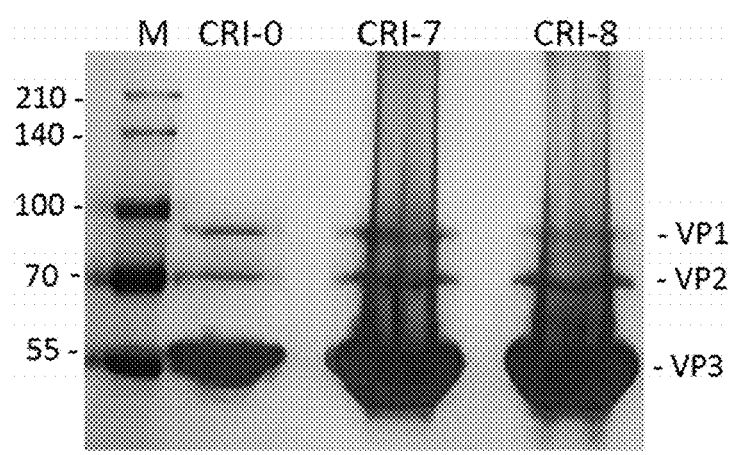

FIGS. 14A, 14B, 14C provide detection of a purified recombinant AAV virion subjected to SDS-PAGE silver staining after transfecting a host cell with the recombinant AAV bacmids CRI-0, CRI-1, CRI-2, CRI-3, CRI-4, CRI-5, CRI-6, CRI-7, and CRI-8. It can be seen from the results that the recombinant AAV bacmid constructed by the disclosure can express the VP1, VP2, and VP3 proteins in a relatively appropriate ratio in the insect cell through the regulating function of intron splicing, thereby packaging into the virions. The CRI-4, CRI-6 and CRI-7 virions respectively have higher VP1 protein incorporation amounts than CRI-3, CRI-5, and CRI-8. The reason for the phenomenon is that the expression level of the VP1 protein is higher. The splicing efficiency of the intron determines the relative expression level of the VP1 protein. Through adjusting the sequence of the intron, we can change the splicing efficiency of the intron, thereby obtaining the virions with different VP1 incorporation amounts.

In the example, Q-PCR was also adopted to detect the packaging rate of the harvested rAAV virus, and the detection of the rAAV packaging rate used a pair of primers (Q-ITR-F: GGAACCCCTAGTGATGGAGTT and Q-ITR-R: CGGCCTCAGTGAGCGA) targeting an ITR sequence. The detection of rAAV infection titer was performed by adopting the detection method in the previous patent application CN 112280801 A of our company. For the specific operation method, reference may be made to the method for plasmid-assisted rAAV infection titer detection in the patent. The detection result is shown in Table 2.

TABLE 2

Detection result table of packaging rate and infection titer of rAAV virions produced using 9 different recombinant AAV bacmids

| Recombinant AAV bacmid numbering | Cell packaging rate (VG/cell) | Virus infection titer (VG/mL) |
|---|---|---|
| CRI-0 | 3.62E+05 | 5.26E+07 |
| CRI-1 | 2.66E+05 | 1.58E+08 |

TABLE 2-continued

Detection result table of packaging rate and infection titer of rAAV virions produced using 9 different recombinant AAV bacmids

| Recombinant AAV bacmid numbering | Cell packaging rate (VG/cell) | Virus infection titer (VG/mL) |
|---|---|---|
| CRI-2 | 5.46E+05 | 2.02E+08 |
| CRI-3 | 7.44E+05 | 6.10E+07 |
| CRI-4 | 5.30E+05 | 8.28E+07 |
| CRI-5 | 7.02E+05 | 4.21E+07 |
| CRI-6 | 2.28E+05 | 1.92E+08 |
| CRI-7 | 3.82E+05 | 2.85E+08 |
| CRI-8 | 5.69E+05 | 7.34E+07 |

Figure 15:
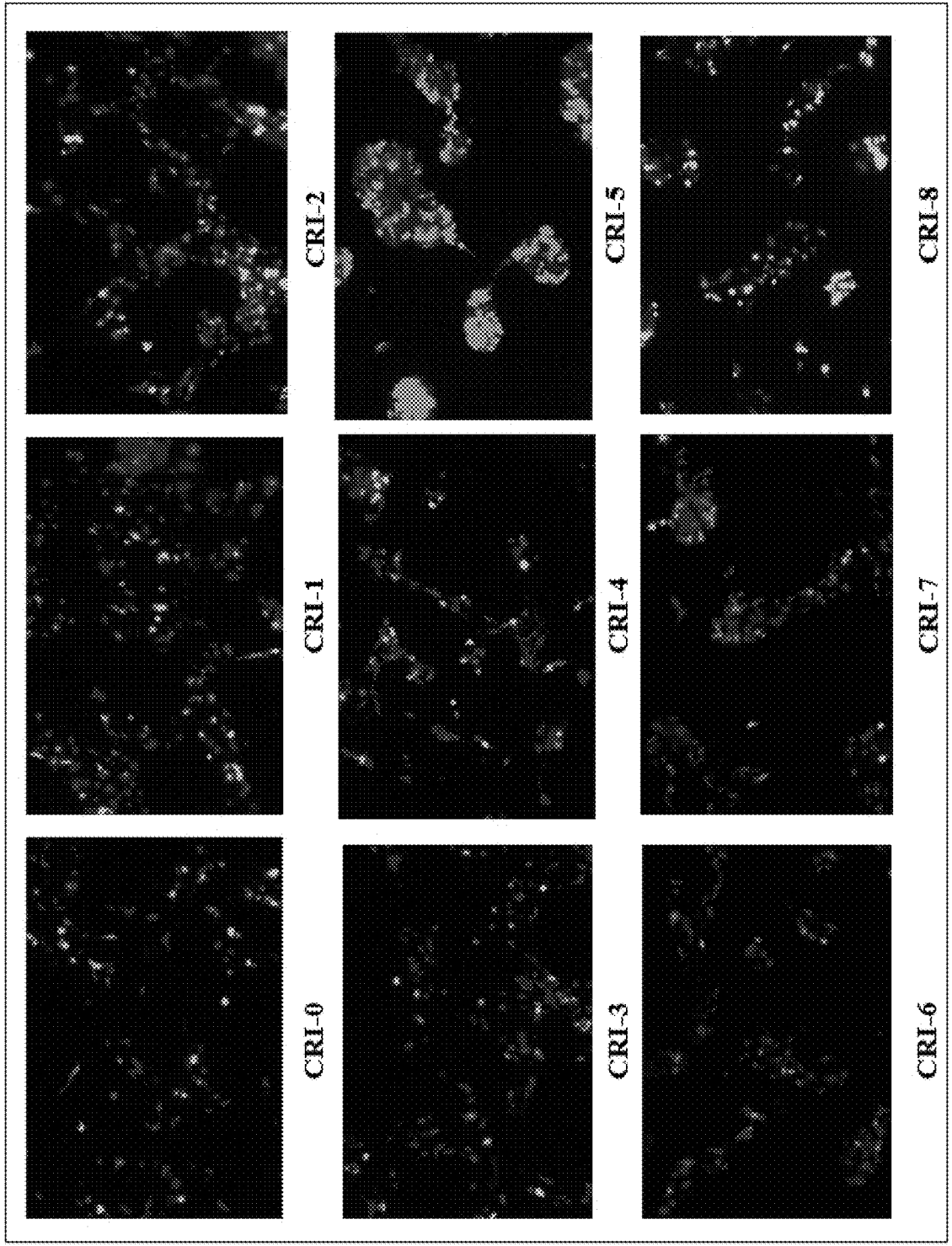
FIG. 15 is an effect image of a purified recombinant AAV virion infecting a 293T cell after a host cell is transfected with recombinant AAV bacmids CRI-0, CRI-1, CRI-2, CRI-3, CRI-4, CRI-5, CRI-6, CRI-7, and CRI-8 in Example 10 of the disclosure.

It can be seen from Table 2 and FIG. 15 that the recombinant AAV bacmids CRI-1 to CRI-8 prepared by the disclosure can be used to transfect the insect cell to package into the recombinant baculovirus, the packaging rate and the virus infection titer are higher, and the same are comparable to or higher than the virion produced by the recombinant AAV bacmid CRI-0 including the control expression cassette of the cap gene. CRI-4, CRI-6, and CRI-7 respectively have higher virus infection titers than CRI-3, CRI-5, and CRI-8, and VP1 incorporation amounts thereof are also higher.

Example 11 Validation of Intron Regulation Function in Different AAV Serotypes

In order to verify that the above intron regulation manner can work in different AAV serotypes, with reference to the method in Example 1, an expression cassette 2K-1 of a cap gene of AAV serotype 2, an expression cassette 5K-1 of a cap gene of AAV serotype 5, and an expression cassette 8K-1 of a cap gene of AAV serotype 8 were respectively constructed; with reference to the method in Example 3, an expression cassette 2K-2 of a cap gene of AAV serotype 2, an expression cassette 5K-2 of a cap gene of AAV serotype 5, and an expression cassette 8K-2 of a cap gene of AAV serotype 8 were respectively constructed; with reference to the method in Example 5, an expression cassette 2K-3 of a cap gene of AAV serotype 2, an expression cassette 5K-3 of a cap gene of AAV serotype 5, and an expression cassette 8K-3 of a cap gene of AAV serotype 8 were constructed. Nucleotide sequences of the constructs 2K-1, 2K-2, 2K-3, 5K-1, 5K-2, 5K-3, 8K-1, 8K-2, and 8K-3 are respectively shown in SEQ ID No.27 to SEQ ID No.35. An expression cassette of a rep gene in the example still adopts AAV serotype 2, because the Rep protein of AAV serotype 2 is suitable for the preparation of rAAV of various serotypes.

Referring to Example 8, 9 different recombinant AAV bacmids were constructed in the example, all of which included the expression cassette of the cap gene, the expression cassette of the rep gene, and the ITR core element, as shown in Table 3.

TABLE 3

List of constituent elements of 9 different recombinant AAV bacmids constructed in Example 11

| Recombinant AAV bacmid | Functional protein components essential for producing rAAV and ITR core element | | |
|---|---|---|---|
| (Bac-Cap-Rep-ITR-GOI) numbering | Expression cassette of cap gene | Expression cassette of rep gene | ITR core element (ITR-GOI) |
| CRI-9  | 2K-1 | 2R-1 | I-G-1 |
| CRI-10 | 2K-2 | 2R-2 | I-G-1 |
| CRI-11 | 2K-3 | 2R-3 | I-G-1 |
| CRI-12 | 5K-1 | 2R-1 | I-G-1 |
| CRI-13 | 5K-2 | 2R-2 | I-G-1 |
| CRI-14 | 5K-3 | 2R-3 | I-G-1 |
| CRI-15 | 8K-1 | 2R-1 | I-G-1 |
| CRI-16 | 8K-2 | 2R-2 | I-G-1 |
| CRI-17 | 8K-3 | 2R-3 | I-G-1 |

Figure 16A:
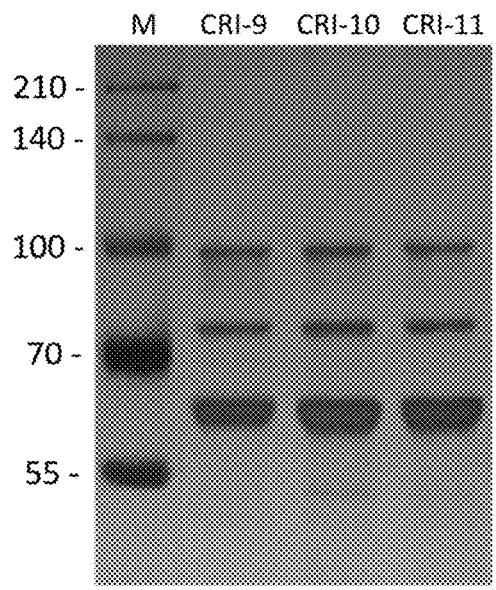
FIG. 16A, FIG. 16B, and FIG. 16C are silver-stained detection images of a purified recombinant AAV virion subjected to SDS-PAGE after a host cell is transfected with recombinant AAV bacmids CRI-9, CRI-10, CRI-11, CRI-12, CRI-13, CRI-14, CRI-15, CRI-16, and CRI-17 in Example 11 of the disclosure and show three capsid proteins VP1/VP2/VP3.
Figure 16B:
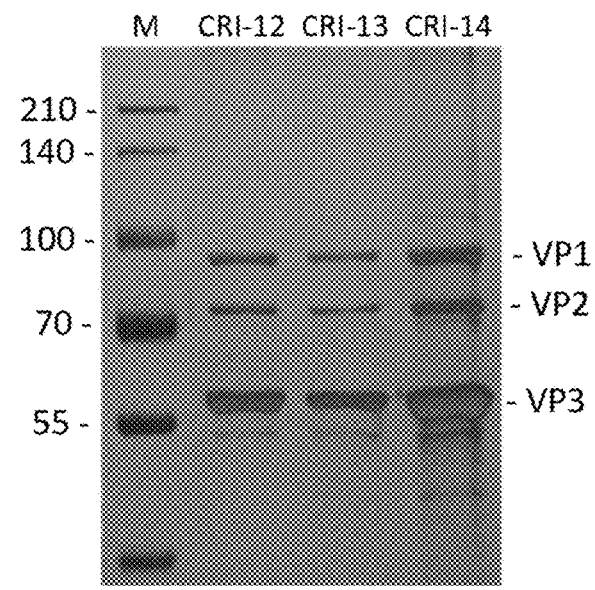
Figure 16C:
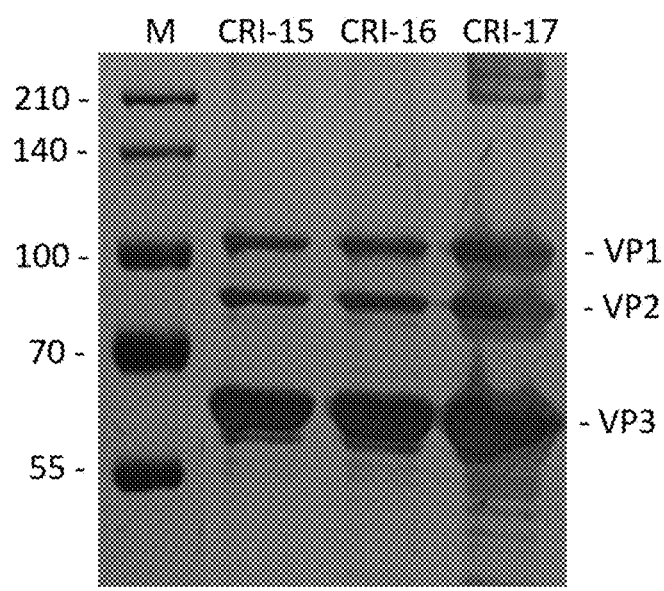

Referring to Example 9 and Example 10, in the example, the recombinant AAV bacmid was transfected into a host cell, and the purified recombinant AAV virion was detected by SDS-PAGE silver staining. The experimental results are shown in FIGS. 16A, 16B, and 16C. The cell packaging rate and the virus infection titer of rAAV produced by the recombinant AAV bacmids of different serotypes were detected, and the detection result is shown in Table 4.

TABLE 4

Detection result table of packaging rate and infection titer of rAAV virions produced using 9 different recombinant AAV bacmids in Example 11

| Recombinant AAV bacmid numbering | Cell packaging rate (VG/cell) | Virus infection titer (VG/mL) |
|---|---|---|
| CRI-9  | 2.26E+06 | 7.86E+07 |
| CRI-10 | 6.53E+05 | 3.25E+08 |
| CRI-11 | 8.54E+05 | 1.75E+08 |
| CRI-12 | 8.72E+05 | 2.56E+08 |
| CRI-13 | 5.43E+05 | 1.32E+08 |
| CRI-14 | 1.62E+06 | 8.56E+07 |
| CRI-15 | 8.94E+05 | 9.12E+07 |
| CRI-16 | 6.24E+05 | 2.45E+08 |
| CRI-17 | 2.95E+05 | 4.21E+08 |

Figure 17:
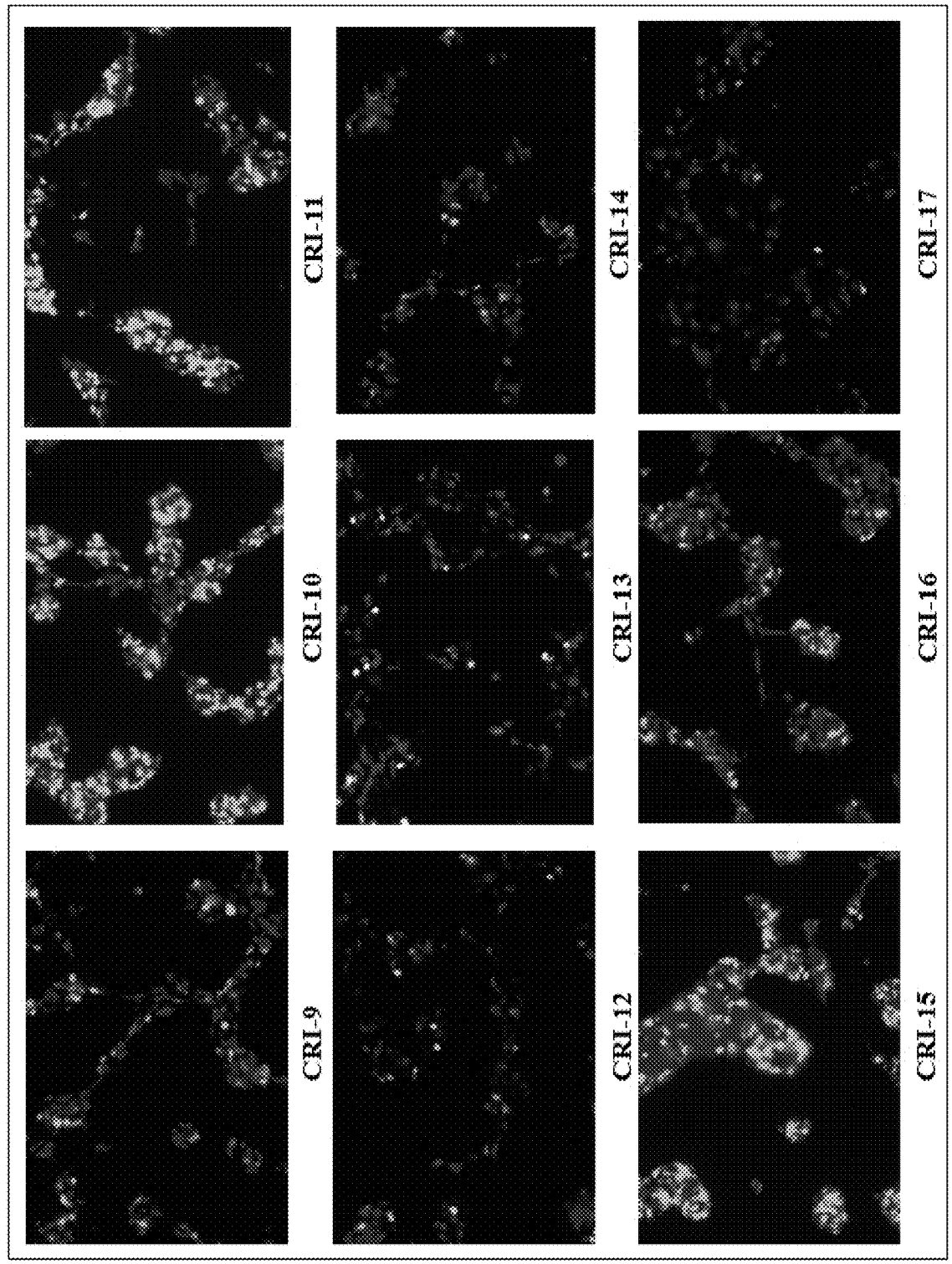
FIG. 17 is an effect image of a purified recombinant AAV virion infecting a 293T cell after a host cell is transfected with recombinant AAV bacmids CRI-9, CRI-10, CRI-11, CRI-12, CRI-13, CRI-14, CRI-15, CRI-16, and CRI-17 in Example 11 of the disclosure.

Combining the results of Table 4 and FIG. 17, it is shown that the disclosure regulates the expression of the VP1, VP2, and VP3 proteins in the insect cell in a relatively appropriate ratio through the intron splicing function, which is suitable for various AAV serotypes and can produce the rAAV virion on a large scale.

Persons skilled in the art can easily understand that the above are only preferred embodiments of the disclosure and are not intended to limit the disclosure. Any modifications, equivalent replacements, improvements, etc. made within the spirit and principle of the disclosure should be included within the protection scope of the disclosure.

What is claimed is:

1. An expression cassette for expressing a gene comprising overlapping open reading frames in an insect cell, comprising from 5' to 3' and operably linked:

a promoter capable of driving transcription in the insect cell;

an artificially constructed sequence comprising a 5' part of a first open reading frame;

a 3' part of the first open reading frame comprising at least one additional open reading frame;

wherein the artificially constructed sequence comprises a native or engineered intron with splicing activity in the insect cell, the intron comprises a translation start codon ATG of the first open reading frame or the intron is located between any two adjacent nucleotides in ATG, so that the 5' part of the first open reading frame lacks a translation start codon, and the intron does not comprise a promoter capable of driving transcription in the insect cell; the at least one additional open reading frame comprises at least one additional translation start codon;

the expression cassette can only transcribe a precursor mRNA in the insect cell, and -during a post-transcriptional processing process, a translation start codon AUG in the artificially constructed sequence is retained or deleted or a translation start codon AUG is formed in the artificially constructed sequence only through an alternative splicing function of the intron, thereby implementing translation and expression of different overlapping open reading frames.

2. The expression cassette according to claim 1, wherein the artificially constructed sequence comprises from 5' to 3' and operably linked:

a 5' part of the intron;

a translation start codon ATG;

a 3' part of the intron;

a nucleotide sequence encoding a 2A self-cleaving polypeptide.

3. The expression cassette according to claim 2, wherein the 2A self-cleaving polypeptide is a T2A peptide, a P2A peptide, an E2A peptide, or an F2A peptide.

4. The expression cassette according to claim 1, wherein the artificially constructed sequence comprises from 5' to 3' and operably linked:

a first-5'-terminal intron donor upstream of a codon ATG;

a second-5'-terminal intron donor downstream of the codon ATG; and a 3'-terminal intron receptor downstream of the codon ATG.

5. The expression cassette according to claim 1, wherein a 5'-terminal nucleotide of the intron is GTNN, and a 3'-terminal nucleotide of the intron is NNAG, wherein N is any one of four nucleotides, A, T, C, and G.

6. The expression cassette according to claim 1, wherein the gene comprising the overlapping open reading frames is a cap gene of AAV or a rep gene of AAV.

7. The expression cassette according to claim 1, wherein the promoter is a polh promoter or a p10 promoter.

8. The expression cassette according to claim 7, wherein the gene comprising the overlapping open reading frames is a cap gene of AAV, and the promoter is the p10 promoter.

9. The expression cassette according to claim 7, wherein the gene comprising the overlapping open reading frames is a rep gene of AAV, and the promoter is the polh promoter.

10. A nucleic acid molecule, comprising the expression cassette according to claim 1.

11. A nucleic acid molecule, comprising: a first expression cassette and a second expression cassette, wherein each of the first expression cassette and the second expression cassette is the expression cassette according to claim 1, and a gene expressed by the second expression cassette is different from a gene expressed by the first expression cassette.

12. The nucleic acid molecule according to claim 11, wherein the second expression cassette is in an antisense orientation with respect to the first expression cassette.

13. The nucleic acid molecule according to claim 11, wherein the second expression cassette is in a sense orientation with respect to the first expression cassette.

14. The nucleic acid molecule according to claim 10, further comprising: an exogenous gene and an AAV inverted terminal repeat sequence located at two terminals of the exogenous gene.

15. The nucleic acid molecule according to claim 14, wherein the exogenous gene is a reporter gene, and the reporter gene is at least one of a chloramphenicol acetyltransferase encoding gene, a β-galactosidase encoding gene, a β-glucuronidase encoding gene, a Renilla luciferase encoding gene, an alkaline phosphatase encoding gene, a firefly luciferase encoding gene, a green fluorescent protein encoding gene, and a red fluorescent protein encoding gene.

16. The nucleic acid molecule according to claim 14, wherein the exogenous gene is a gene encoding a drug polypeptide, and the drug polypeptide is at least one of lipoprotein esterase, apolipoprotein, cytokine, interleukin, and interferon.

17. A vector, comprising the expression cassette according to claim 1.

18. The vector according to claim 17, wherein the vector is an insect cytocompatible vector.

19. An insect cell, comprising the expression cassette according to claim 1.

20. The insect cell according to claim 19, wherein the expression cassette is integrated into a genome of the insect cell.

* * * * *